(12) United States Patent  
Komoto et al.

(10) Patent No.: US 8,599,252 B2  
(45) Date of Patent: Dec. 3, 2013

(54) MOVING OBJECT DETECTION APPARATUS AND MOVING OBJECT DETECTION METHOD

(75) Inventors: Ayako Komoto, Osaka (JP); Kunio Nobori, Osaka (JP); Masahiro Iwasaki, Kyoto (JP)

(73) Assignee: Panasonic Corporation, Osaka (JP)

( * ) Notice: Subject to any disclaimer, the term of this patent is extended or adjusted under 35 U.S.C. 154(b) by 86 days.

(21) Appl. No.: 13/454,577

(22) Filed: Apr. 24, 2012

(65) Prior Publication Data

US 2012/0206597 A1  Aug. 16, 2012

Related U.S. Application Data

(63) Continuation of application No. PCT/JP2011/004173, filed on Jul. 25, 2011.

(30) Foreign Application Priority Data

Jul. 27, 2010  (JP) ................................ 2010-168704

(51) Int. Cl.
*H04N 7/18* (2006.01)
*G06K 9/00* (2006.01)
*G06K 9/34* (2006.01)

(52) U.S. Cl.
USPC ........................... 348/135; 382/103; 382/173

(58) Field of Classification Search
USPC ................... 348/135; 382/103, 173
See application file for complete search history.

(56) References Cited

U.S. PATENT DOCUMENTS

| | | |
|---|---|---|
| 2011/0002509 A1 | 1/2011 | Nobori et al. |
| 2011/0013840 A1* | 1/2011 | Iwasaki et al. ............... 382/173 |
| 2011/0228987 A1 | 9/2011 | Iwasaki et al. |

FOREIGN PATENT DOCUMENTS

| | | |
|---|---|---|
| JP | 8-214289 | 8/1996 |
| JP | 2006-31114 | 2/2006 |
| JP | 2008-146185 | 6/2008 |
| WO | 2010/050110 | 5/2010 |
| WO | 2010/079556 | 7/2010 |

OTHER PUBLICATIONS

International Search Report issued Nov. 1, 2011 in corresponding International Application No. PCT/JP2011/004173.

P. Anandan, "A Computational Framework and an Algorithm for the Measurement of Visual Motion", International Journal of Computer Vision, vol. 2, Jan. 1989, pp. 283-310.

(Continued)

*Primary Examiner* — Dave Czekaj
*Assistant Examiner* — Tsion B Owens
(74) *Attorney, Agent, or Firm* — Wenderoth, Lind & Ponack, L.L.P.

(57) ABSTRACT

A moving object detection apparatus includes: a stationary measure calculation unit calculating, for each of trajectories, a stationary measure representing likelihood that the trajectory belongs to a stationary object; a distance calculation unit calculating a distance representing similarity between trajectories; and a region detection unit (i) performing a transformation based on the stationary measures and the distances between the trajectories, so that a ratio of a distance between a trajectory on stationary object and a trajectory on moving object, to a distance between trajectories both belonging to stationary object becomes greater than a ratio obtained before the transformation and (ii) detecting the moving object region by separating the trajectory on the moving object from the trajectory on the stationary object, based on a geodesic distance between the trajectories.

32 Claims, 32 Drawing Sheets

(56) References Cited

OTHER PUBLICATIONS

Vladimir Kolmogorov et al., "Computing Visual Correspondence with Occlusions via Graph Cuts", International Conference on Computer Vision, Mar. 7, 2001, pp. 1-37.
Jianbo Shi et al., "Good Features to Track", IEEE Conference on Computer Vision and Pattern Recognition, Jun. 1994, pp. 1-8.
Richard Hartley et al., "Multiple View Geometry in Computer Vision", Second Edition, Cambridge University Press, 2003, pp. 87-131, 239-261, 279-309 and 365-407.
Chang Yuan et al., "Detecting Motion Regions in the Presence of a Strong Parallax from a Moving Camera by Multiview Geometric Constraints", IEEE Transactions on Pattern Analysis and Machine Intelligence, vol. 29, No. 9, Sep. 2007, pp. 1627-1641.
Edsger W. Dijkstra, "A Note on Two Problems in Connexion with Graphs", Numerische Mathematik, vol. 1, Dec. 1959, pp. 269-271.
Pedro F. Felzenszwalb et al., "Efficient Graph-Based Image Segmentation", International Journal of Computer Vision, vol. 59, No. 2, 2004, pp. 1-26.
Carlo Tomasi et al. "Detection and Tracking of Point Features", KLT: An Implementation of the Kanade-Lucas-Tomasi Feature Tracker, http://www.ces.clemson.edu/~stb/klt/, version 1.3.2, Mar. 28, 2006, pp. 1-20.
Kenichi Kanatani, Gazo rikai—3 jigen ninshiki no suuri—(Image Understanding—Mathematical Principle of Three-dimensional Recognition), Morikita Publishing Co., Ltd., May 24, 1990, pp. 78-99 (with partial English translation).
Richard Hartley et al., "Multiple View Geometry in Computer Vision", Second Edition, Cambridge University Press, 2003, pp. 87-131, 239-261, 279-309, 365-389 and 391-407.

* cited by examiner

FIG. 8
| Stereo | Trinocular |
|---|---|
| Epipolar constraint | Trilinear constraint |
| Homography constraint | Structure consistency constraint |
FIG. 9A
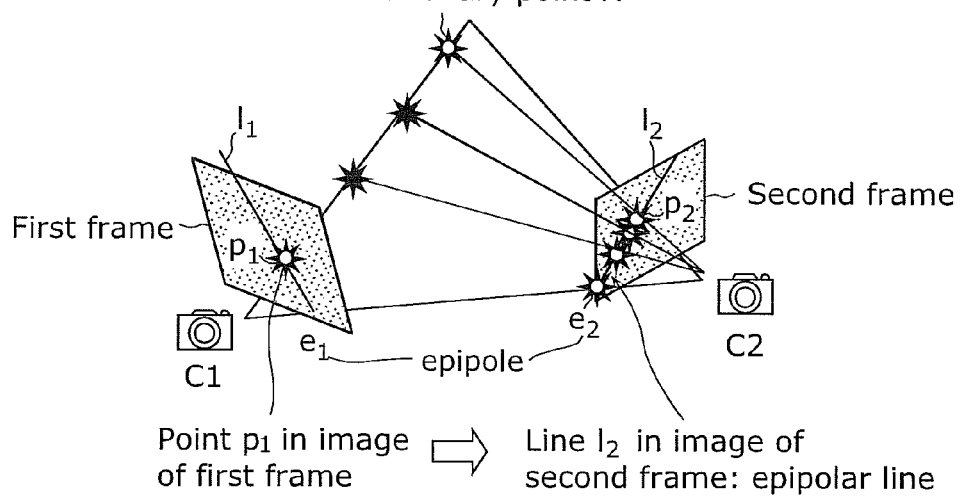
Point $p_1$ in image of first frame ⇒ Line $l_2$ in image of second frame: epipolar line
FIG. 9B
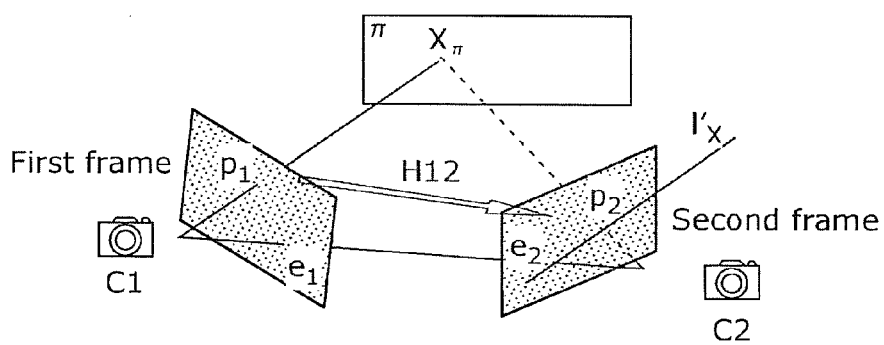

(a) Euclidean distance between trajectories (b) Geodesic distance between trajectories Weighting rule
① Stationary vs Stationary w < 1 (Distance: reduce)
② Stationary vs Moving w > 1 (Distance: increase)
③ Moving vs Moving w = 1 (Distance: no change)

FIG. 36A
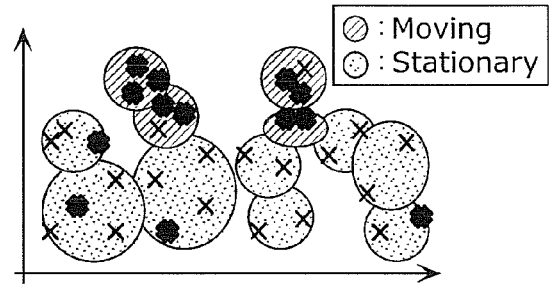
FIG. 36B
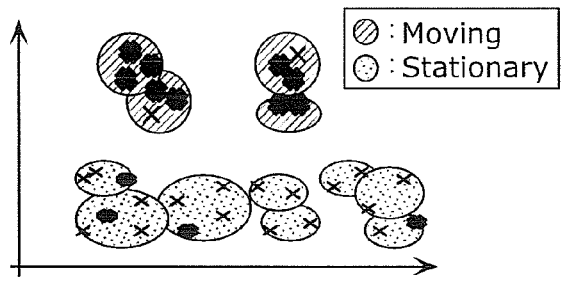
FIG. 36C
Weighting rule
(large camera motion)
① Stationary vs Stationary  $W_B < 1$
② Stationary vs Moving $W_B > 1$
③ Moving vs Moving $W_B = 1$
Weighting rule
(small camera motion)
① Stationary vs Stationary
   $W_S < 1$ ($W_B < W_S$)
② Stationary vs Moving
   $W_S > 1$ ($W_B > W_S$)
③ Moving vs Moving $W_S = 1$
FIG. 36D
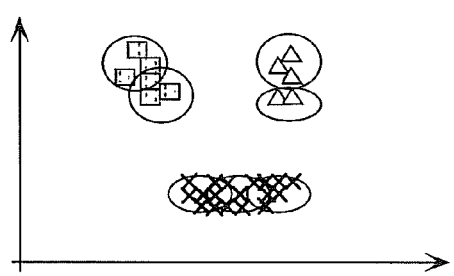
FIG. 36E
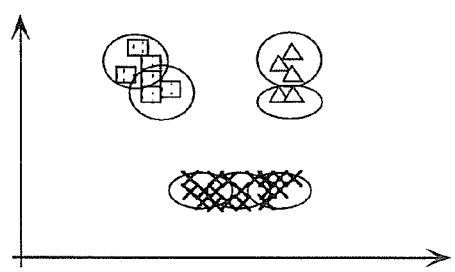

MOVING OBJECT DETECTION APPARATUS AND MOVING OBJECT DETECTION METHOD

CROSS REFERENCE TO RELATED APPLICATION

This is a continuation application of PCT Patent Application No. PCT/JP2011/004173 filed on Jul. 25, 2011, designating the United States of America, which is based on and claims priority of Japanese Patent Application No. 2010-168704 filed on Jul. 27, 2010. The entire disclosures of the above-identified applications, including the specifications, drawings and claims are incorporated herein by reference in their entirety.

TECHNICAL FIELD

Apparatuses and methods consistent with one or more exemplary embodiments of the present disclosure relate generally to a technique for detecting a moving object in an image based on motion information on a video sequence including a plurality of images. In particular, an apparatus and method consistent with the exemplary embodiments described herein relate to a moving object detection apparatus which extracts an image region including a moving object by using a stationary measure to weight a distance between trajectories of the moving object, such as a pedestrian, that moves while changing contour shape, the stationary measure representing a likelihood that the trajectory of the object is calculated from an image region of a stationary object, instead of an image region of a moving object (hereafter, this likelihood is referred to as the "stationary likelihood").

BACKGROUND ART

Research and development on region extraction technologies have been extensively conducted. With such technology, a moving object is detected by extracting an image region of the moving object (referred to as the moving object region hereafter) from an image including an image of the moving object (the image of the moving object is simply referred to as the "moving object" hereafter). Especially when the moving object is a pedestrian, extraction of an image region of the pedestrian is a basic technology commonly used for: focus control and image quality improvement by a digital video camera or a digital still camera; a safe driving support system for automobiles; and human-robot collision avoidance control performed by a robot or collision warning given by the robot.

Common examples of the technology for extracting the moving object region from the image include the following two methods. One is a method of determining the moving object region by evaluating similarity between a previously-prepared moving object model and a moving-object-region candidate in the image. The other is a method of determining the moving object region by segmenting the image into subregions, calculating the amount of characteristics for each of the subregions, and then integrating the subregions similar based on the amounts of characteristics.

Representative examples of the former method include the following method. Firstly, moving-object-region candidates are extracted from the image. After this, similarity between a previously-prepared moving object model and each of the candidates is evaluated, and the region with high similarity is extracted as the moving image region. Moreover, for the case where the region of the moving object, such as a pedestrian, that moves with deformation is extracted, there is a method whereby a moving object model that considers the change in shape is used. For example, Patent Literature 1 discloses a method of extracting a silhouette image of a moving object from images as moving-object-region candidates. With this method, similarity between a parameterized model corresponding to the change in shape of the moving object and the extracted silhouette image is evaluated so as to estimate a region with high similarity and a parameter of the model. Thus, the parameterized model can be applied to the image of the moving object such as a pedestrian that moves with deformation in a cyclic manner, and therefore the moving object region can be extracted.

Representative examples of the latter method include the following method. An image is temporarily segmented into subregions, and the amount of characteristics is calculated based on a pixel luminance value for each of the subregions. Then, similarity in the amount of characteristics is evaluated between the subregions, and the highly-similar subregions are integrated into one moving object region. For example, Patent Literature 2 discloses a method whereby: an image is temporarily segmented into rectangular subregions; the amount of characteristics is calculated based on luminance and motion information for each of the subregions; and then the moving object region can be extracted by integrating the subregions based on order of similarity in the amount of characteristics.

CITATION LIST

Patent Literature

Patent Literature 1: Japanese Unexamined Patent Application Publication No. 8-214289
Patent Literature 2: Japanese Unexamined Patent Application Publication No. 2006-031114

SUMMARY OF INVENTION

Technical Problem

However, the conventional region extraction method does not allow an accurate extraction of a moving object in a scene where, for example, a plurality of persons are walking, and there is a significant change in shape of such pedestrians due to changes in posture, size, etc.

According to the model-based region extraction method as disclosed in Patent Literature 1, moving-object-region candidates needs to be extracted from the image. Here, when the candidates are not appropriately extracted, it is impossible to correctly apply the parameterized moving object model to these candidates. Especially in the scene as described above, since the shapes of the moving objects or pedestrians change significantly due to variable posture and size, it is difficult to extract the moving-object-region candidates appropriately. Moreover, even if the moving-object-region candidates could be appropriately extracted, this kind of method still has a problem as follows.

For example, when the moving object is a pedestrian or the like, various postures, locations, and sizes of the moving object causes significant changes to objects in the image. That is to say, a huge number of parameters are required to parameterize such moving objects to obtain an appropriate model. Moreover, in the case of images captured with a moving camera, appearances of the background image also change significantly. This may lead to an incorrect matching of the model to moving-object-region candidates. As a result, the moving object cannot be detected accurately. For example, one moving object may be detected as several moving objects, or conversely, a region having no moving objects, i.e., having no extraction targets, may be extracted as the moving object.

According to the region extraction method disclosed in Patent Literature 2, the region in the image is extracted based on a difference of characteristics between the subregions instead of creating a model as disclosed in Patent Literature 1. With this method, subregions that do not have similar characteristics such as luminance value or motion information are extracted as different image regions. However, when the moving object is a pedestrian or the like, the luminance value varies according to pixel location. Even the subregions on the same moving object have different movement, for example, as subregions on the different ends of articulated region. Thus, the moving object cannot be detected accurately because the subregions on the same moving object may be extracted as regions on different moving objects.

Moreover, when the images are captured by a moving camera, similarity between the adjacent subregions is relatively high due to the motion of the camera. Thus, extraction of the moving object region may result in failure.

One non-limiting and exemplary embodiment provides a moving object detection apparatus capable of accurately detecting a moving object from an image even when the moving object is a pedestrian or the like that moves with deformation, and the image is captured by a moving camera.

Solution to Problem

One or more exemplary embodiments of the present disclosure may overcome the above disadvantage and other disadvantages not described herein. However, it is understood that one or more exemplary embodiments of the present disclosure are not required to overcome or may not overcome the disadvantage described above and other disadvantages not described herein.

According to an exemplary embodiment of the present disclosure, a moving object detection apparatus detects a moving object region using trajectories which correspond to a region in a video, the moving object detection apparatus including: a stationary measure calculation unit which calculates, for each of the trajectories, a stationary measure representing likelihood that the trajectory belongs to a stationary object, the trajectory indicating a motion of blocks between two or more pictures included in the video, and each of the blocks being included in a picture and having one or more pixels; a distance calculation unit which calculates a distance between each pair of trajectories, the distance representing similarity between the trajectories; and a region detection unit which (i) performs a transformation based on the distances between the trajectories and the stationary measures of the trajectories, so that a ratio of a distance between two trajectories that one belongs to stationary object and another belongs to moving object, to the distance between trajectories both belonging to stationary object, becomes greater than the ratio obtained before the transformation, and (ii) detects the trajectories belonging to the moving object as the moving object region by separating the trajectories on moving object from those on stationary object, based on the transformed distances between trajectories.

With this configuration, transformation is performed based on the stationary measure of the trajectory. This makes it easy to separate the trajectories on moving object from trajectories on stationary object. Accordingly even moving objects with changing shape such as pedestrians are in the image, and the image is captured by a moving camera, moving objects can be detected accurately.

It should be noted that an exemplary embodiment can be implemented not only as a moving object detection apparatus including the characteristic units as described above, but also as a moving object detection method having, as steps, the characteristic processing units included in the moving object detection apparatus. Also, an exemplary embodiment can be implemented as a computer program causing a computer to execute the characteristic steps included in the moving object detection method. It should be obvious that such a computer program can be distributed via a computer-readable recording medium such as a Compact Disc-Read Only Memory (CD-ROM) or via a communication network such as the Internet.

Advantageous Effects of Invention

An exemplary embodiment of the present disclosure is capable of accurately detecting a moving object, such as a pedestrian, that moves with deformation, even when an image including the moving object is captured by a moving camera.

BRIEF DESCRIPTION OF DRAWINGS

These and other advantages and features of exemplary embodiments of the present disclosure will become apparent from the following description thereof taken in conjunction with the accompanying Drawings that illustrate general and specific exemplary embodiments of the present disclosure. In the Drawings:

FIG. 8 is a diagram showing classification of geometric constraints on a camera;

FIG. 9A is a diagram explaining an epipolar constraint;

FIG. 9B is a diagram explaining a homography constraint;

FIG. 36A is a conceptual diagram showing a subclass distribution in a higher-dimensional space when camera motion is large;

FIG. 36B is a conceptual diagram showing a subclass distribution in the higher-dimensional space when camera motion is small;

FIG. 36C is a diagram showing a weighting rule applied to an inter-subclass geodesic distance;

FIG. 36D is a conceptual diagram showing a subclass distribution in the higher-dimensional space after the inter-subclass geodesic distance is weighted, when camera motion is large;

FIG. 36E is a conceptual diagram showing a subclass distribution in the higher-dimensional space after the inter-subclass geodesic distance is weighted, when camera motion is small;

DESCRIPTION OF EMBODIMENT

Figure 1:
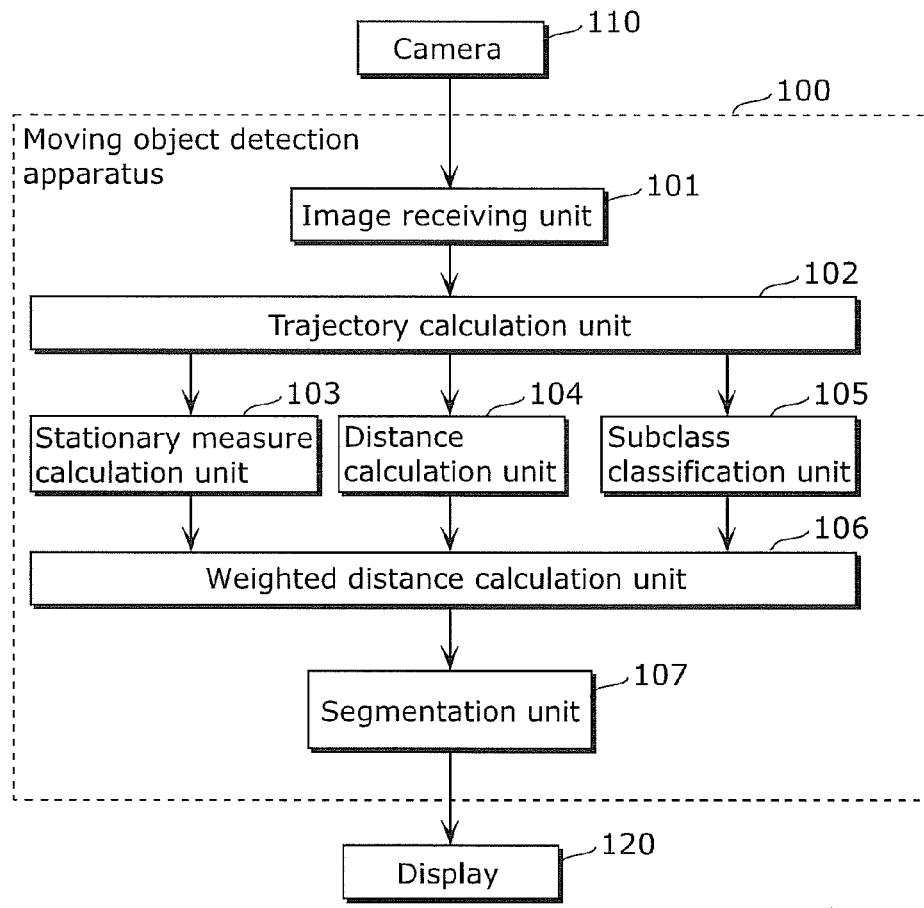
FIG. 1 is a diagram showing a configuration of a moving object detection apparatus in Embodiment.

Embodiment of the present disclosure is described, with reference to the drawings. It should be noted that Embodiment below describes only a preferred specific example. Note that numerical values, components, connection states of the components, steps, a sequence of the steps, and so forth described in Embodiment below are only examples, and are not intended to limit the present disclosure. The present disclosure is determined only by the scope of the claims. Thus, among the components described in Embodiment below, the components that are not described in independent claims indicating top concepts in the present disclosure are not necessarily required to achieve the object in the present disclosure. However, these components are described to implement a more preferred embodiment.

According to an exemplary embodiment of the present disclosure, a moving object detection apparatus detects a moving object region using a plurality of trajectories which correspond to a region included in a video, the moving object detection apparatus including: a stationary measure calculation unit which calculates, for each of the trajectories, a stationary measure representing likelihood that the trajectory belongs to a stationary object, the trajectory indicating a motion of blocks between two or more pictures included in the video, and each of the blocks being included in a picture and having one or more pixels; a distance calculation unit which calculates a distance between each pair of trajectories, the distance representing similarity between the trajectories; and a region detection unit which (i) performs a transformation based on the stationary measures of the trajectories and the distances between the trajectories, so that a ratio of a distance between a trajectory belonging to stationary object and another trajectory belonging to moving object to a distance between trajectories both belonging to stationary object becomes greater than the ratio obtained before the transformation and (ii) detects the trajectories belonging to the moving object as the moving object region by separating the trajectories on moving object from those on stationary object, based on the transformed distances between trajectories.

For example, the distance calculation unit may calculate, based on the distances between the trajectories, a geodesic distance that is a distance of a path to reach one of the pair of trajectories from the other of the pair of trajectories via a trajectory other than the pair of trajectories as a relay point. Moreover, for example, the region detection unit may (i) perform a transformation based on the stationary measures of the trajectories and the geodesic distances between the trajectories, so that a ratio of a geodesic distance between a trajectory belonging to any stationary object and a trajectory belonging to any moving object to a geodesic distance between trajectories both belonging to any stationary object is greater than a ratio obtained before the transformation and (ii) detect the moving object region corresponding to the trajectory belonging to the moving object by separating the trajectory belonging to the moving object from the trajectory belonging to the stationary object based on each of the transformed geodesic distances.

With this configuration, transformation is performed based on the stationary measure of the trajectory. This makes it easy to separate the trajectory of the moving object from the trajectory of the stationary object. Accordingly, even when an image including a moving object, such as a pedestrian, that moves with deformation, is captured by a moving camera, the moving object can be detected with accuracy.

For example, the stationary measure calculation unit may estimate, using the trajectories, a geometric constraint that holds when the trajectory belongs to the stationary object, and calculate, as the stationary measure, a degree at which the trajectory satisfies the estimated geometric constraint.

Moreover, for example, the stationary measure calculation unit may estimate, using the trajectories, the geometric constraint as one of an epipolar constraint, a homography constraint, a trilinear constraint, and a structure consistency constraint, and calculate, as the stationary measure, a degree at which the trajectory satisfies the estimated geometric constraint.

Furthermore, the region detection unit may include: a weighted distance calculation unit which (i) calculates a geodesic distance between each pair of trajectories based on the distance between the trajectories and (ii) calculates a weighted geodesic distance by assigning a weight based on the stationary measures of the trajectories to the calculated geodesic distance, so that a ratio of a geodesic distance between a trajectory belonging to any stationary object and a trajectory belonging to any moving object to a geodesic distance between trajectories both belonging to any stationary object is greater than a ratio obtained before the weight assignment; and a segmentation unit which segments the picture into a stationary object region and the moving object region by classifying, into different classes, the trajectories between which the weighted geodesic distance calculated by the weighted distance calculation unit is greater than or equal to a predetermined threshold.

Even in the case of the moving object, such as a pedestrian, that changes its posture, location, and size over time in the video sequence captured by a moving camera, an evaluation value representing the stationary likelihood of the trajectory is used for weighting the geodesic distance between the trajectories. Accordingly, the moving object in the image can be detected with reliability.

For example, the distance calculation unit may calculate a geodesic distance between each pair of trajectories, the geodesic distance representing similarity between the trajectories. Moreover, for example, the weighted distance calculation unit may calculate the weighted geodesic distance by assigning a weight based on the stationary measures to the geodesic distance calculated by the distance calculation unit, so that a ratio of a geodesic distance between a trajectory belonging to any stationary object and a trajectory belonging to any moving object to a geodesic distance between trajectories both belonging to any stationary object is greater than a ratio obtained before the weight assignment.

The weighted geodesic distance is calculated by assigning the weight based on the stationary measures to the geodesic distance between the trajectories. Thus, as post-processing performed after the geodesic distance calculation, the geodesic distance reflecting the stationary likelihood can be easily calculated.

Moreover, the distance calculation unit may calculate a linear distance (point-to-point distance) between each pair of trajectories, the linear distance representing similarity between the trajectories. Moreover, for example, the weighted distance calculation unit may (i) calculate a weighted linear distance by assigning a weight based on the stationary measures of the trajectories to the linear distance calculated by the distance calculation unit, so that a ratio of a linear distance between a trajectory belonging to any stationary object and a trajectory belonging to any moving object to a linear distance between trajectories both belonging to any stationary object is greater than a ratio obtained before the weight assignment, and (ii) calculate the weighted geodesic distance from the calculated weighted linear distance.

With this, only by weighting the linear distance, that is, only by calculating the weighted linear distance as the preprocessing performed by the weighted distance calculation unit, the geodesic distance reflecting the stationary likelihood can be easily calculated.

Furthermore, the region detection unit may include: a weighted distance calculation unit which calculates a geodesic distance between each pair of trajectories based on the distance between the trajectories; and a segmentation unit which segments the picture into a stationary object region and the moving object region, by separating the trajectory belonging to the moving object from the trajectory belonging to the stationary object based on a result of comparing the geodesic distance calculated by the weighted distance calculation unit with a weighted geodesic distance threshold that is obtained by assigning a weight based on the stationary measures to a geodesic distance threshold used for determining whether or not to classify the trajectory belonging to the stationary object and the trajectory belonging to the moving object into different classes.

With this configuration, the weighted distance is calculated by weighting the threshold, instead of weighting the distance. This can reduce the time required to calculate the weighted distance and the amount of memory for storing the weighted distance.

To be more specific, the segmentation unit may perform the weight assignment so that the weight assigned to the geodesic distance threshold of when each of the stationary measures of the pair of trajectories indicates "stationary" is greater than the weight assigned to the geodesic distance threshold of when the stationary measures of the pair of trajectories indicate "moving" and "stationary", respectively.

Moreover, the moving object detection apparatus may further includes a subclass classification unit which classifies the plurality of trajectories into a plurality of subclasses each of which is a subset including similar trajectories out of the trajectories, wherein the weighted distance calculation unit calculates a weighted inter-subclass geodesic distance assigned with the weight based on the stationary measures, on the basis of the stationary measures of the trajectories, the distances between the trajectories, and a result of the classification into the subclasses, and the segmentation segments the picture into the stationary object region and the moving object region, by separating a subclass belonging to the moving object from a subclass belonging to the stationary object based on the weighted inter-subclass geodesic distance calculated by the weighted distance calculation unit.

With this configuration, each of the subclasses is classified as a stationary object region or a moving object region. Each of the subclasses is a subset of similar trajectories. Therefore, the moving object region can be detected with more accuracy.

For example, the distance calculation unit may calculate a geodesic distance between each pair of trajectories, the geodesic distance representing similarity between the trajectories. Moreover, for example, the weighted distance calculation unit may calculate the weighted inter-subclass geodesic distance by assigning, to a representative value of inter-subclass geodesic distances, a weight based on a representative value of the stationary measures of the trajectories included in the subclass.

With this configuration, the weight is assigned to the representative value of the geodesic distances between the subclasses. Thus, the geodesic distance between the subclasses that reflects the stationary likelihood can be easily calculated.

Moreover, the distance calculation unit may calculate a linear distance between each pair of trajectories, the linear distance representing similarity between the trajectories, and the weighted distance calculation unit may assign, to a representative value of inter-subclass linear distances, a weight based on a representative value of the stationary measures of the trajectories included in the subclass and calculate the weighted inter-subclass geodesic distance based on the weighted representative value of the inter-subclass linear distances.

With this configuration, after the weight is assigned to the representative value of the linear distances between the subclasses, the geodesic distance between the subclasses is calculated. Thus, the geodesic distance between the subclasses that reflects the stationary likelihood can be easily calculated.

Furthermore, when representative values of the stationary measures of the trajectories included in a pair of subclasses indicate "moving" and "stationary", respectively, the weighted distance calculation unit may set the weight to be assigned to the inter-subclass geodesic distance at a value greater than 1.

Moreover, when both of representative values of the stationary measures of the trajectories included in the pair of the subclasses indicate "stationary", the weighted distance calculation unit may set the weight to be assigned to the inter-subclass geodesic distance at a value smaller than 1.

Furthermore, when both of the representative values of the stationary measures of the trajectories included in the pair of subclasses indicate "moving", the weighted distance calculation unit may set the weight to be assigned to the inter-subclass geodesic distance at 1.

With this simple weighting rule, the moving object region and the stationary object region can be separated according to the simple weight setting.

Moreover, the subclass classification unit may classify each of the trajectories into one of the subclasses, based on the similarity between the trajectories.

Furthermore, the subclass classification unit may classify each of the trajectories into one of the subclasses, based on similarity in luminance between blocks respectively belonging to the trajectories.

Moreover, the subclass classification unit may include: a second distance calculation unit which calculates a geodesic distance between each pair of trajectories; and a clustering unit which performs a dimensionality reduction on the geodesic distance between the trajectories calculated by the second distance calculation unit, and classifies the trajectories into the subclasses based on the lower-dimensional geodesic distance between the trajectories.

Since the dimensionality reduction is performed on the geodesic distance, clustering is executed in the nonlinear space without requiring an enormous amount of calculation. Therefore, especially in the case of the picture including a moving object such as a pedestrian that moves with deformation, clustering can be performed with stability.

Furthermore, the subclass classification unit may classify each of the trajectories into one of the subclasses by: obtaining the geodesic distance by calculating a shortest path from the trajectory to another trajectory after (i) selecting a distance smaller than or equal to a predetermined distance threshold from among the distances between the trajectory and the other trajectory and (ii) performing nonlinear processing to change an unselected distance into an infinite distance; and classifying, into one subclass, a set of trajectories between each pair of which the geodesic distance is finite.

Here, the pair of trajectories between which the geodesic distance is infinite is considered to be discontinuous. Thus, based on this discontinuous point, the trajectories can be classified into the subclasses.

Moreover, the stationary measure calculation unit may estimate a geometric constraint from a trajectory used for estimating the geometric constraint that holds when the trajectory belongs to the stationary object, and calculate, based on the estimated geodesic distance, the stationary measures of the trajectories to be used by the distance calculation unit to calculate the distance.

The geometric constraint is estimated from the trajectory used for estimating the geometric constraint. Thus, the geometric constraint can be obtained with more stability and more accuracy. This allows the moving object to be detected with more stability and more accuracy.

For example, the moving object detection apparatus may further include a camera motion obtaining unit which obtains motion information on a camera capturing the video sequence, wherein the weighted distance calculation unit adjusts a weight to be assigned to the stationary measure based on a magnitude indicated by the motion information on the camera.

To be more specific, when the magnitude indicated by the motion information on the camera is greater, the weighted distance calculation unit may increase the weight to be assigned to the distance between the trajectory belonging to the stationary object and the trajectory belonging to the moving object.

Since the motion information on the camera is obtained, the stationary measure can be accurately calculated. This allows the moving object to be detected with accuracy.

Moreover, the moving object detection apparatus may further include a camera motion obtaining unit which obtains motion information on a camera capturing the video sequence, wherein, when representative values of the stationary measures in a pair of subclasses indicate "moving" and "stationary", respectively, the weighted distance calculation unit performs a weight assignment on an inter-subclass geodesic distance between the pair of subclasses, and a relationship expressed as WB>WS>1 is satisfied, where WB represents a weight of a case where a value of the motion information on the camera is greater than or equal to a predetermined threshold and WS represents a weight of a case where the value of the motion information on the camera is smaller than the predetermined threshold.

Furthermore, the moving object detection apparatus may further include a camera motion obtaining unit which obtains motion information on a camera capturing the video sequence, wherein, when both of representative values of the stationary measures in a pair of subclasses indicate "stationary", the weighted distance calculation unit performs a weight assignment on an inter-subclass geodesic distance between the pair of subclasses, and a relationship expressed as WB<WS<1 is satisfied, where WB represents a weight of a case where a value of the motion information on the camera is greater than or equal to a predetermined threshold and WS represents a weight of a case where the value of the motion information on the camera is smaller than the predetermined threshold.

With this configuration, the weight can be appropriately changed according to the magnitude of the camera motion. This allows the moving object to be detected with accuracy.

For example, the camera motion obtaining unit may obtain the motion information on the camera from an operation control signal of the camera.

Since the motion information on the camera is obtained from the operation control signal of the camera, the accurate motion information on the camera can be obtained even when the camera motion is large. This allows the moving object region to be detected with accuracy.

Moreover, the camera motion obtaining unit may obtain the motion information on the camera from an in-car sensor.

For example, it may be even better when car operation information such as a wheel speed or a steering angle is obtained electronically. In the case of using an in-car camera, when the motion information on the camera can be obtained from an in-car sensor, the motion information on the camera can be obtained with stability and, thus, the moving object region can be detected with accuracy. Note that since the in-car camera is often fixed, location information on the camera can be obtained from the Global Positioning System (GPS).

Moreover, the weighted distance calculation unit may further compare the stationary measure of the trajectory with a stationary measure threshold and determine, as a result of the comparison, that the trajectory having the stationary measure smaller than or equal to the stationary measure threshold belongs to the stationary object and that the trajectory having the stationary measure greater than the stationary measure threshold belongs to the moving object.

Furthermore, the weighted distance calculation unit may include a threshold receiving unit which receives a stationary measure threshold, and may compare the stationary measure of the trajectory with the stationary measure threshold received by the threshold receiving unit and determine, as a result of the comparison, that the trajectory having the stationary measure smaller than or equal to the stationary measure threshold belongs to the stationary object and that the trajectory having the stationary measure greater than the stationary measure threshold belongs to the moving object. Moreover, for example, the region detection unit may cause a display unit to display the detected moving object region.

With this, the stationary measure threshold can be changed while verifying the result of the detection of the moving object region. Thus, an optimum stationary measure threshold can be determined in a shorter time.

Moreover, the stationary measure calculation unit may further cause a display unit to display each of the blocks included in the picture in a display manner corresponding to the calculated stationary measure.

The stationary measure threshold is highly dependent on the distribution of the stationary measure values. This means that when the stationary measure values and the distribution thereof in the image can be verified, the stationary measure threshold can be adjusted without having to perform the segmentation to the end. Thus, an optimum stationary measure threshold can be determined in a shorter time.

It should be noted that a moving object detection apparatus in an exemplary embodiment can be implemented not only as hardware configured with processing units, but also as: a moving object detection method having, as steps, processes performed by the processing units; a computer program causing a computer to execute the steps included in the moving object detection method; a computer-readable recording medium such as a CD-ROM having the computer program recorded thereon; and an image processing apparatus or the like that extracts or segments a region of a moving object included in a video sequence.

FIG. 1 is a diagram showing a configuration of a moving object detection apparatus 100 in Embodiment. As shown in FIG. 1, the moving object detection apparatus 100 includes an image receiving unit 101, a trajectory calculation unit 102, a stationary measure calculation unit 103, a distance calculation unit 104, a subclass classification unit 105, a weighted distance calculation unit 106, and a segmentation unit 107. The moving object detection apparatus 100 detects a moving object in a video sequence by performing segmentation to determine the whole or a part of a moving object region. More specifically, the moving object detection apparatus 100 detects a region corresponding to the moving object (i.e., the moving object region), using a plurality of trajectories each of which corresponds to a region in a picture included in the video sequence. In Embodiment, the moving object detection apparatus 100 receives, as an input, the video sequence captured by a camera 110, detects the moving object region in the video sequence, generates a picture based on the detection result, and then outputs the picture. A display 120 displays the picture received from the moving object detection apparatus 100. In the present specification, a picture may also be referred to as an image.

The image receiving unit 101 is a processing unit which receives a plurality of pictures included in the video sequence. For example, the image receiving unit 101 is a camera or a communication interface connected to a camera.

The trajectory calculation unit 102 is a processing unit which calculates co-located points between the pluralities of pictures, based on the pictures received by the image receiving unit 101, and then outputs the co-located points as a plurality of trajectories. To be more specific, the trajectory calculation unit 102 is a processing unit which calculates the plurality of trajectories as follows. The trajectory calculation unit 102 detects movement, for each of blocks, between two temporally adjacent pictures received by the image receiving unit 101, each block having one or more pixels. Then, the trajectory calculation unit 102 concatenates the detected movements of the pictures into the plurality of trajectories. Here, the co-located points between the pictures may be calculated for each of the pixels included in the picture, or one co-located point may be calculated for each set of adjacent pixels (namely, for each of the blocks). Note that the present specification does not make a distinction as to whether a co-located point is calculated for each of the pixels or one co-located point is calculated for each set of pixels. Note also that when a pixel i in a picture has a co-located point in another picture or when a block i in a picture has a co-located point in another picture, each of these co-located points is referred to as the trajectory of the pixel i.

The stationary measure calculation unit 103 is a processing unit which applies a geometric constraint to each of the trajectories calculated by the trajectory calculation unit 102 to calculate a stationary measure representing the stationary likelihood of the trajectory. More specifically, the stationary measure calculation unit 103 calculates the stationary measure representing the stationary likelihood, for each of the trajectories of the blocks between two or more pictures included in the video sequence, the block having one or more pixels. The geometric constraint used to calculate the stationary measure is described in detail later.

The distance calculation unit 104 extracts, from the plurality of trajectories calculated by the trajectory calculation unit 102, an N number of trajectories each of which includes co-located points over a T number of pictures, where T≥2. Then, from the extracted trajectories, the distance calculation unit 104 calculates a distance representing similarity between two trajectories.

It should be noted that, in the present specification, a "distance" between two trajectories indicates not only a distance between two points in a corresponding two-dimensional image space, but also an arithmetic distance between multi-dimensional data pieces as described later. Note also that, generally speaking, a distance varies inversely with similarity. To be more specific, the similarity is higher when the distance between the two data pieces is shorter, whereas the similarity is lower when the distance between the two data pieces is longer.

Moreover, the present specification defines two kinds of distances which are a "linear distance (point-to-point distance)" and a "geodesic distance". It should be noted that the "linear distance" refers to a distance calculated only from the two data pieces and that the "geodesic distance" refers to a distance calculated by going through a point other than the two data pieces as describe later.

It should also be noted that the "linear distance" mentioned in the present specification indicates a distance covering broader concepts including a "linear distance" commonly used. More specifically, the linear distance used in the present specification denotes a measure representing geometric similarity between the trajectories in, for example, location at picture coordinates, speed, or acceleration. As a representative example of the "linear distance, the present specification uses a "Euclidean distance" hereafter. Detailed examples of the above mentioned distances are described later when the distance calculation unit 104 is explained.

Furthermore, it should be noted that, unless otherwise specified, the terms "stationary" and "moving" mentioned in the present specification are described to mean as follows. Based on a world coordinate system fixed on Earth (i.e., on the ground), an object whose location in the world coordinate system does not change over time is described as a stationary object and an object whose location in the world coordinate system changes over time is described as a moving object. However, the meanings of "stationary" and "moving" are not limited as above. For example, suppose that the inside of a moving vehicle is shot by an in-vehicle camera. In this case, based on a world coordinate system fixed in the vehicle, an object whose location in this world coordinate system does not change over time may be described as a stationary object and an object whose location in this world coordinate system changes over time may be described as a moving object.

The subclass classification unit 105 performs clustering on the trajectories calculated by the trajectory calculation unit 102 on the basis of similarity represented by a distance between the trajectories, a speed, or the like, so as to classify the trajectories into a plurality of subclasses. Here, each of the subclasses includes at least one trajectory. To be more specific, the subclass classification unit 105 classifies, into subclasses, the trajectories each of which indicates movement of blocks between the pictures included in the video sequence, each block having one or more pixels. As a result, each of the subclasses includes a set of similar trajectories.

The weighted distance calculation unit 106 calculates a weighted geodesic distance between the subclasses (hereafter, the geodesic distance between the subclasses is referred to as the "inter-subclass geodesic distance" as appropriate) that is weighted according to the stationary measure. The weighted distance calculation unit 106 calculates this weighted geodesic distance based on: the stationary measure outputted from the stationary measure calculation unit 103 and thus attached for each of the trajectories; the distance between the trajectories outputted from the distance calculation unit 104; and label information outputted from the subclass classification unit 105 for each of the trajectories to indicate the subclass to which the trajectory belongs.

More specifically, the weighted distance calculation unit 106 calculates the geodesic distance between the trajectories based on the distance between the trajectories. Then, the weighted distance calculation unit 106 calculates a weighted geodesic distance by assigning a weight based on the stationary measures of the trajectories to the calculated geodesic distance, so that a ratio of a geodesic distance between a trajectory belonging to any stationary object and a trajectory belonging to any moving object to a geodesic distance between trajectories both belonging to any stationary object is greater than a ratio obtained before the weight assignment.

To be more specific, the weighted distance calculation unit 106 first calculates the geodesic distance for each pair of the trajectories, and then calculates a representative geodesic distance between the subclasses. Moreover, the weighted distance calculation unit 106 calculates a representative value of the stationary measures for each of the subclasses. Depending on whether or not the stationary measure of the subclass exceeds a predetermined stationary measure threshold, the weighted distance calculation unit 106 determines whether the subclass belongs to the moving object or the stationary object. Then, using the result of the determination in weighting the representative geodesic distance between the subclasses, the weighted distance calculation unit 106 calculates the geodesic distance between the subclasses. That is, the weighted distance calculation unit 106 compares the stationary measure of the subclass with the stationary measure threshold, and determines as a result of the comparison that the subclass having the stationary measure smaller than or equal to the stationary measure threshold belongs to the stationary object and that the subclass having the stationary measure greater than the stationary measure threshold belongs to the moving object. Conditions of the stationary measure and standards of the weight assignment are described in detail later.

Lastly, the segmentation unit 107 performs region integration on the plurality of subclasses based on the geodesic distances between the subclasses calculated by the weighted distance calculation unit 106. Then, after performing image processing on the final result of the segmentation so that, for example, each specified region is displayed in a different manner, the segmentation unit 107 outputs the result to the display 120 or the like in a displayable format. To be more specific, based on the weighted geodesic distance calculated by the weighted distance calculation unit 106, the segmentation unit 107 separates the trajectories where the weighted geodesic distance is greater than or equal to a predetermined threshold, into different classes. As a result, the segmentation unit 107 separates the stationary object region from the moving object region for each of the pictures.

In the present specification, the phrase "region extraction" is described to include both a technique of detecting an image region where a specific object is present and a technique of segmenting a region of a picture regardless of an object included in the picture. Since the detection technique and the segmentation technique have much in common, the present specification does not distinguish between these techniques.

Moreover, in the present specification, the phrase "moving object detection" is described to include both: a technique of detecting only an image region in which an object moving with respect to a specified coordinate system is present; and a technique of segmenting a region of a picture for each of objects moving relatively differently from each other.

Figure 2:
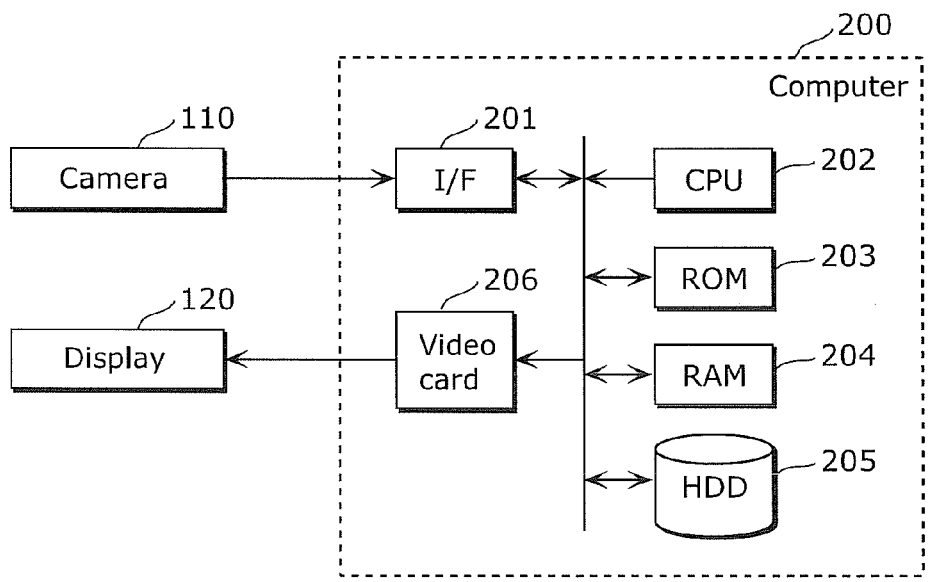
FIG. 2 is a diagram showing a hardware configuration of the moving object detection apparatus configured with a computer.

It should be noted that each of the components included in the moving object detection apparatus 100 (namely, the image receiving unit 101, the trajectory calculation unit 102, the stationary measure calculation unit 103, the distance calculation unit 104, the subclass classification unit 105, the weighted distance calculation unit 106, and the segmentation unit 107) may be implemented as software such as a program executed on a computer or implemented as hardware such as an electronic circuit or an integrated circuit. FIG. 2 is a diagram showing a hardware configuration of the moving object detection apparatus in Embodiment implemented as software. In FIG. 2, the camera 110 captures pictures and outputs the pictures, and a computer 200 obtains the pictures to perform moving object extraction and generates a picture displaying the result of region extraction. The display 120 obtains the picture generated by the computer 200 and displays the picture. The computer 200 includes an interface (I/F) 201, a central processing unit (CPU) 202, a read only memory (ROM) 203, a random access memory (RAM) 204, a hard disk drive (HDD) 205, and a video card 206. A computer program causing the computer 200 to operate is stored in advance in the ROM 203 or the HDD 205. The computer program is read out from the ROM 203 or the HDD 205 by the CPU 202 which is a processor, and is then expanded. The CPU 202 executes each of coded instructions in the computer program expanded by the RAM 204. The I/F 201 stores the pictures captured by the camera 110 into the RAM 204 in accordance with the execution of the program. The video card 206 outputs the generated picture in accordance with the execution of the program, and the display 120 display the picture.

Note that the storage destination of the computer program is not limited to the ROM 203 or the HDD 205 which is a semiconductor. For example, the computer program may be stored in a CD-ROM. Moreover, the computer program may be transmitted via a wired or wireless network or via broadcasting to be stored into the RAM 204 of the computer.

Figure 3:
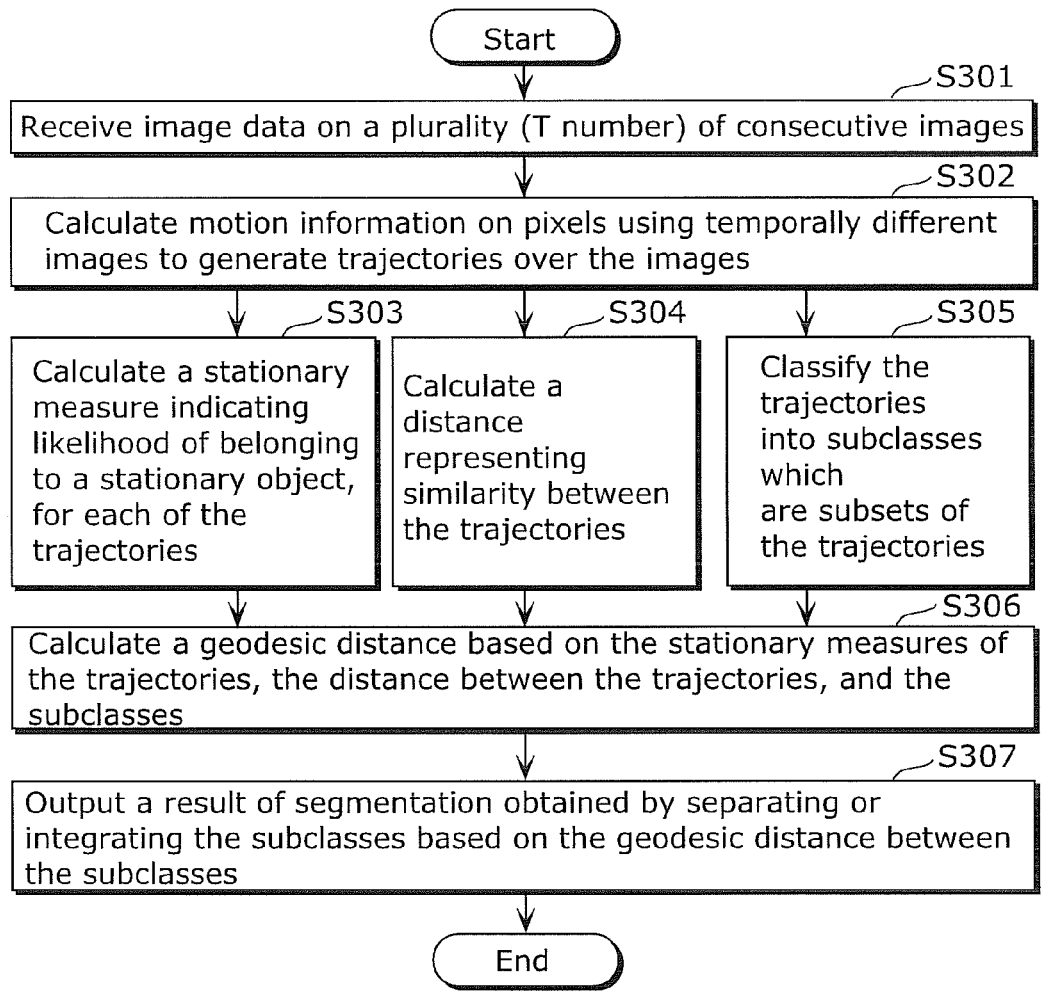
FIG. 3 is a flowchart showing steps of an operation performed by the moving object detection apparatus.

The following is a description on an operation performed by the moving object detection apparatus 100 in Embodiment, with reference to FIG. 3.

FIG. 3 is a flowchart showing the operation performed by the moving object detection apparatus 100 in Embodiment.

In FIG. 3, seven steps from step S301 to step S307 correspond to the processing units 101 to 107 shown in FIG. 1, respectively. To be more specific: the image receiving unit 101 executes an image receiving step S301; the trajectory calculation unit 102 executes a trajectory calculation step S302; the stationary measure calculation unit 103 executes a stationary measure calculation step S303; the distance calculation unit 104 executes a distance calculation step S304; the subclass classification unit 105 executes a subclass classification step S305; the weighted distance calculation unit 106 executes a distance calculation step S306; and the segmentation unit 107 executes a segmentation step S307.

Firstly, the image receiving step S301 is executed by the image receiving unit 101. To be more specific, the image receiving unit 101 receives a plurality of pictures included in a video sequence from the camera 110. In Embodiment, a frame rate of the video sequence obtained from the camera 110 is 30 frames per second.

Figure 4:
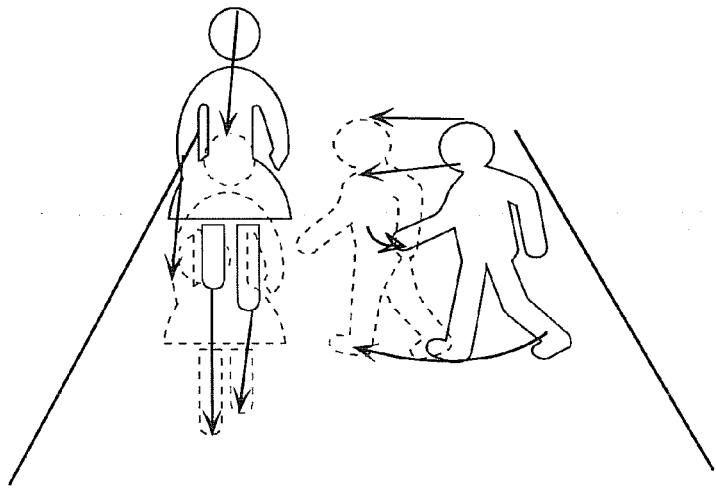
FIG. 4 is a diagram showing an example of a scene of image capturing.
Figure 5A:
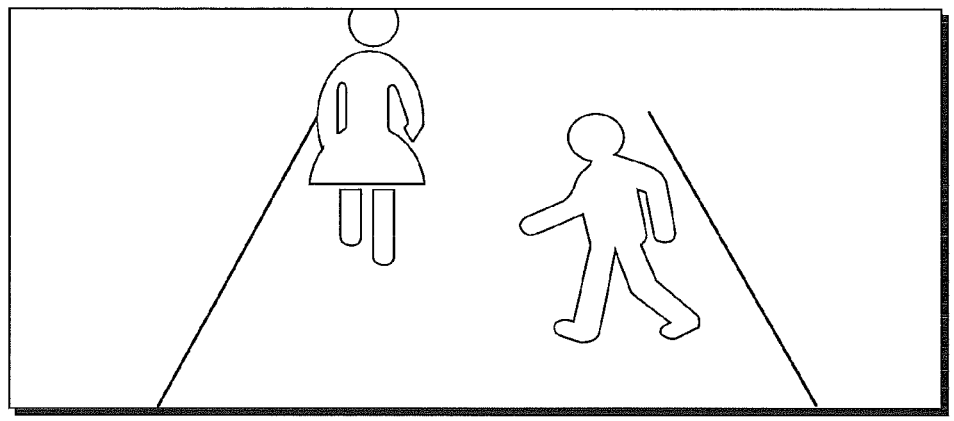
FIG. 5A is a diagram showing an example of a picture of a first frame included in an input video sequence.
Figure 5B:
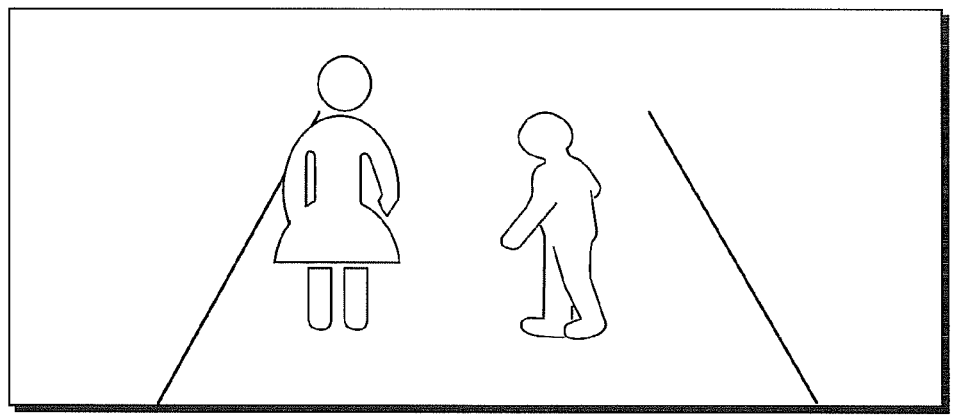
FIG. 5B is a diagram showing an example of a picture of a frame present between the first frame and a T-th frame included in the input video sequence.
Figure 5C:
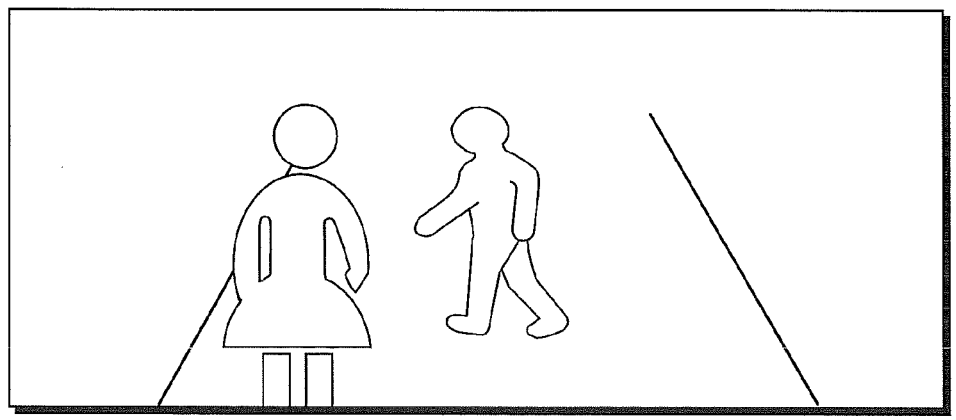
FIG. 5C is a diagram showing an example of a picture of the T-th frame included in the input video sequence.

FIG. 4 is a diagram showing an example of a scene of image capturing. FIG. 5A to FIG. 5C show examples of the plurality of pictures obtained by the camera 110 as a result of capturing the scene shown in FIG. 4. Suppose that a T number of pictures from a first frame to a T-th frame (where T≥2) are received by the image receiving unit 101. In Embodiment, the T number of pictures is determined in advance as 30 frames, i.e., T=30. FIG. 5A shows a picture of the first frame. FIG. 5C shows a picture of the T-th frame. FIG. 5B shows a picture of a frame present between the first frame and the T-th frame.

Next, the trajectory calculation step S302 is executed by the trajectory calculation unit 102. To be more specific, the trajectory calculation unit 102 receives the plurality of pictures from the image receiving unit 101, and detects motion information on pixels (co-located points) between the pictures to generate and output trajectories. As a method of obtaining the motion information on the pixels (the co-located points) between the pictures, co-located pixels in a (T−1) number of pictures corresponding to a second frame to the T-th frame are obtained with respect to all pixels (the number of which is "I") included in the first frame.

In the following, Embodiment describes processing performed on a pixel-by-pixel basis. Suppose here the case where processing is performed on a block-by-block basis, each block having a plurality of pixels. In such a case, data corresponding to a block (a representative value) is obtained by (i) adding pixel values in the block, (ii) calculating a mean of the pixel values in the block, or (iii) calculating a median of the pixel values in the block. Using the obtained representative value, the processing is performed in the same manner as the processing performed on a pixel-by-pixel basis.

For example, suppose that the T numbers of pictures are received in step S301. In this case, using two pictures of a t-th frame and a (t+1)-th frame, the trajectory calculation unit 102 estimates pixel coordinate values $(x_t^i, y_t^i, x_{t+1}^i, \text{and } y_{t+1}^i)$ of the co-located points as a motion vector of a pixel "i". Here, the frames are not necessarily consecutive. For instance, the pixel motion may be calculated using two pictures of the t-th frame and a (t+n)-th frame. Note that "n" is an integer greater than or equal to 1.

In order to calculate the co-located points between the pictures as described above, the method disclosed in, for example, Non Patent Literature 1 or Non Patent Literature 2 may be employed. Each of the disclosed methods calculates a motion vector by calculating an optical flow. In Non Patent Literature 1, the optical flow is calculated based on hierarchical block matching. Since the smoothness between the pixels is a constraint condition, an optical flow is obtained such that the motion vector varies smoothly between adjacent optical flows. Especially when there is no abrupt movement or occlusion, the co-located points can be obtained with efficiency and accuracy. Moreover, an estimated reliability value can be calculated. Thus, as described later, by excluding, in a subsequence process, the co-located point whose reliability value is lower than a threshold, a ratio of error motion vectors to all motion vectors can be reduced. This allows for more accurate moving object detection.

In Non Patent Literature 2, an optical flow is calculated according to a graph-cut-based method. Although the computational cost is high, accurate co-located points in the pictures can be obtained at a high density. Moreover, this method can estimate an occlusion region. Thus, as described later, by excluding, in a subsequence process, the co-located point located in the occlusion region, the ratio of error motion vectors to all motion vectors can be reduced. This allows for more accurate moving object detection. More details are described in Non Patent Literatures 1 and 2 and, therefore, detailed explanations are omitted here.

Non Patent Literature 1: P. Anandan, "A Computational Framework and an Algorithm for the Measurement of Visual Motion", International Journal of Computer Vision, Vol. 2, pp. 283-310, 1989

Non Patent Literature 2: Vladimir Kolmogorov and Ramin Zabih, "Computing Visual Correspondence with Occlusions via Graph Cuts", International Conference on Computer Vision, 2001

Moreover, the trajectory calculation unit 102 may estimate, as the pixel motion, an affine parameter instead of the motion vector. In this case, motion information may be obtained for each of the pixels. Furthermore, when higher-speed processing is desired, a picture may be divided into a grid and the motion information of only pixels at regular intervals on the grid may be obtained. Or, as described above, the picture may be divided into blocks and the motion information may be obtained for each of the blocks.

Moreover, when the motion vector is calculated according to the method disclosed in Non Patent Literature 1, the reliability value is calculated as described and, therefore, only pixels having the motion information with high reliability values may be used. Moreover, when the motion vector is calculated according to the method disclosed in Non Patent Literature 2, occlusions can be estimated as described and, therefore, the motion information of only visible (not occluded) pixels may be used.

Furthermore, in order to calculate the pixel motion, a method of calculating a motion vector based on the assumption of affine motion of blocks may be used instead of the method of calculating the motion vector based on the assumption of the aforementioned translational motion of the blocks. The method of calculating the motion vector based on the assumption of the affine motion can be implemented using a technique disclosed in Non Patent Literature 3.

Non Patent Literature 3: Jianbo Shi and Carlo Tomasi, "Good Features to Track", IEEE Conference on Computer Vision and Pattern Recognition, pp. 593-600, 1994

According to the above method, an affine parameter $A_t^i$ corresponding to a motion around the pixel i of the pictures of the t-th frame and the (t+1)-th frame is estimated. In regard to the pixel i, pixel locations $x_t^i$ and $x_{t+1}^i$ in the pictures of the t-th frame and the (t+1)-th frame have a relationship represented by Expression 1 as follows.

$$x_{t+1}^i = A_t^i x_t^i \qquad \text{Expression 1}$$

According to the above method, especially when the moving object may rotate, the motion of the pixel i can be estimated with high accuracy as compared to the method of calculating the motion vector based on the assumption of a translational motion.

Figure 6A:
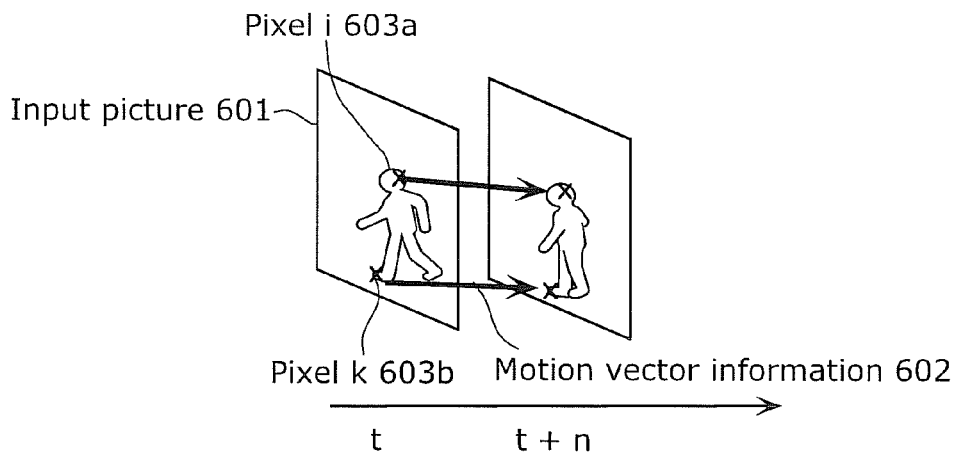
FIG. 6A is a diagram showing examples of motion vectors.

Then, the trajectory calculation unit 102 calculates a trajectory i using the co-located pixel points calculated between the T numbers of temporally-different pictures. Hereafter, the trajectory of the pixel i is referred to as the trajectory i. As shown in FIG. 6A, the trajectory calculation unit 102 tracks motions of a pixel i 603a and a pixel k 603b using motion vector information 602 calculated in step S302 based on the pixel i 603a and the pixel k 603b in a received picture of the t-th frame. As a result, the trajectory calculation unit 102 obtains the co-located points of the pixel i 603a and the pixel k 603b. Here, the trajectory calculation unit 102 calculates a trajectory $x^i$ according to Expression 2, using the coordinate values $(x_1^i, y_1^i)$ of the pixel i in the first frame and the coordinate values $(x_t^i, y_t^i)$ of the co-located point of the pixel i in the t-th frame.

$$x^i = (x_1^i, y_1^i, \ldots, x_t^i, y_t^i, \ldots, x_T^i, y_T^i) \quad \text{Expression 2}$$

In Embodiment, the trajectory $x^i$ corresponds to the co-located points in the T number of pictures from the first frame to the T-th frame.

Figure 6B:
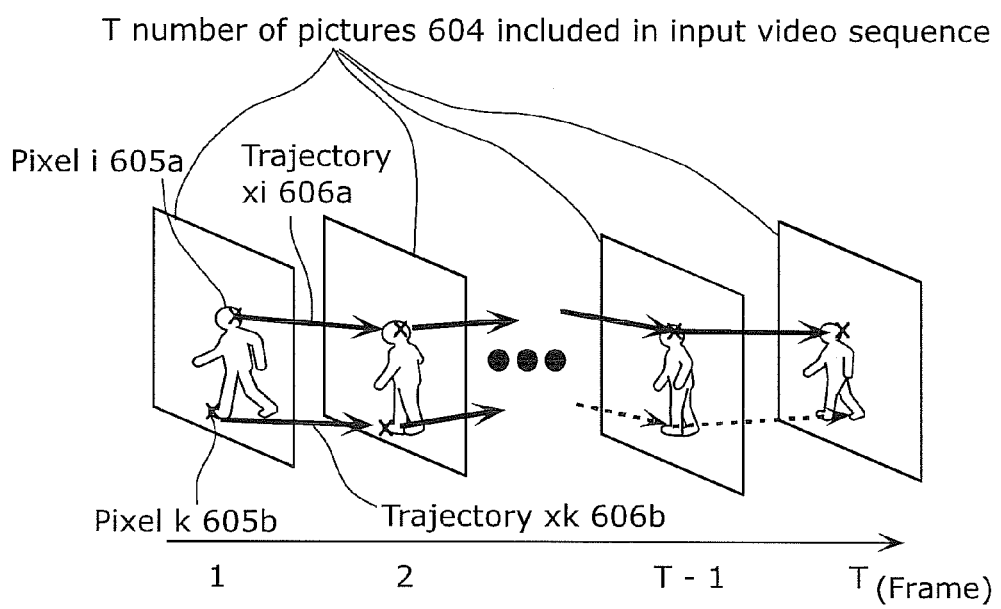
FIG. 6B is a diagram showing examples of trajectories.

FIG. 6B shows examples of trajectories. The video sequence received by the trajectory calculation unit 102 includes the T number of pictures 604. Here, a trajectory $x^i$ 606a is a set of co-located points in the pictures from the second frame to the T-th frame, corresponding to the pixel i 605a included in the first frame.

Similarly, a trajectory $x^k$ 606b is a set of co-located points in the pictures from the second frame to the T-th frame, corresponding to the pixel k 605b included in the first frame. Each of the trajectories $x^i$ 606a and $x^k$ 606b is represented by a vector including, as elements, picture coordinate values in the pictures.

When calculating the co-located points between the pictures, the trajectory calculation unit 102 may calculate the co-located point for each set of adjacent pixels (namely, for each of the blocks) in the picture instead of calculating the co-located point for each of the pixels included in the picture. Note that the present specification does not make a distinction as to whether a co-located point is calculated for each of the pixels or one co-located point is calculated for each set of pixels. Note also that when the pixel i in a picture has a co-located point in another picture or when a block i in a picture has a co-located point in another picture, each of these co-located points is referred to as the trajectory of the pixel i.

Next, the stationary measure calculation step S303 is executed by the stationary measure calculation unit 103. To be more specific, the stationary measure calculation unit 103 calculates the stationary measure for each of the trajectories calculated by the trajectory calculation unit 102. Here, the stationary measure of the trajectory indicates a likelihood that the current trajectory belongs to a stationary object.

After estimating the geometric constraint to be satisfied by the trajectory belonging to the stationary object, the stationary measure calculation unit 103 calculates an error, as the stationary measure, representing a degree at which the trajectory satisfies the calculated geometric constraint. More specifically, when the value of the stationary measure of the trajectory is smaller (i.e., when the error is smaller), the likelihood that the trajectory belongs to the stationary object is higher. On the other hand, when the value of the stationary measure of the trajectory is greater (i.e., when the error is larger), the likelihood that the trajectory belongs to the stationary object is lower.

Figure 7:
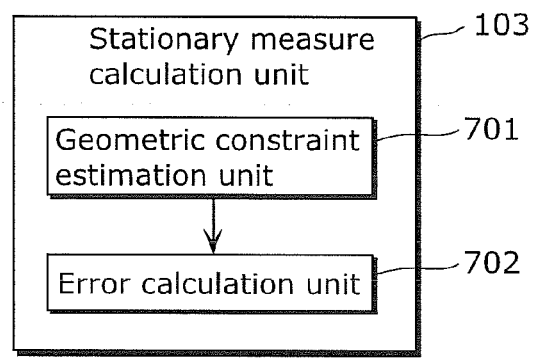
FIG. 7 is a diagram showing a configuration of a stationary measure calculation unit included in the moving object detection apparatus.

FIG. 7 is a diagram showing a configuration of the stationary measure calculation unit 103. The stationary measure calculation unit 103 includes a geometric constraint estimation unit 701 and an error calculation unit 702. The geometric constraint estimation unit 701 estimates the geometric constraint to be satisfied by the co-located points of the stationary object between the frames. The error calculation unit 702 calculates, based on the geometric constraint, a geometric constraint error representing a degree at which the trajectory does not belong to the stationary object, that is, at which the trajectory belongs to the moving object (referred to as the "moving likelihood" hereafter).

The following describes the geometric constraint used by the stationary measure calculation unit 103.

Various kinds of geometric constraints are known as shown in FIG. 8.

Each of "Stereo" and "Trinocular" indicates a condition concerning the number of frames or the number of cameras. More specifically, "Stereo" denotes constrains satisfied between two images. For example, even when one camera is used, a plurality of images captured at different times like a video sequence suffices. Similarly, "Trinocular" denotes constraints satisfied among three images. The plurality of images may be obtained from consecutive different frames. Or, when a plurality of cameras is used, one or more images may be obtained from each of the cameras. Note that, in Embodiment, the images obtained from the consecutive frames are used.

Based on the above rough classification, two representative constraints for each, that is, four constraints in total are shown in FIG. 8.

An epipolar constraint is most commonly used among camera geometric constraints, and has characteristics as follows. Although the epipolar constraint functions well for sparse co-located points, it is preferable for the co-located points to be accurate and for a length of a baseline of camera locations to be longer between frames.

FIG. 9A is a diagram explaining the epipolar constraint.

A stationary point X projected onto a point $p_1^i$ in the image of the first frame is projected, in the image of the second frame, onto a point $p_2^i$ present on a straight line $l_2$ called an epipolar line passing through an epipole $e_2$. On account of this, when the co-located point $p_2^i$ is deviated from the epipolar line $l_2$ by a distance greater than or equal to a certain threshold, it can be determined that the current co-located point belongs to a moving object instead of a stationary object. It should be noted that, although depending on noise such as an error of the co-located point, the certain threshold ranges, in general, from 0 to several pixels.

The epipolar constraint is given by a 3-by-3 fundamental matrix $F_{1,2}$ as follows.

$$p_2^{iT} F_{1,2} p_1^i = 0 \quad \text{Expression 3}$$

$$l_2^i = F_{1,2} p_1^i \quad \text{Expression 4}$$

$$l_1^i = F^T_{1,2} p_2^i \quad \text{Expression 5}$$

Here, "$p_1^i$" represents a pixel location of the pixel i in the image of the first frame, the pixel location being indicated by $(x_1^i, y_1^i, 1)$. Similarly, "$p_2^i$" represents a location of the co-located pixel in the image of the second frame corresponding to $p_1^i$, the location being indicated by $(x_2^i, y_2^i, 1)$. Moreover, "$l_1^i$" and "$l_2^i$" represents epipolar lines.

In general, a fundamental matrix F (the fundamental matrix $F_{1,2}$ in Expression 5) is estimated by repeating, for example, a random sample consensus (RANSAC) algorithm according to an eight-point method, a six-point method, or the like. In particular, when there are many three-dimensional points in the scene, the eight-point method is used by which the fundamental matrix F is estimated by calculating eight co-located points. When there are many two-dimensional points in the scene, the fundamental matrix F can be estimated with more stability according to the six-point method by which an epipole is obtained using a homography matrix.

FIG. 9B is a diagram explaining a homography constraint.

The homography constraint holds when, for example, a object is assumed in a two-dimensional plane or when camera motion is only rotation. The homography constraint may be employed in the case of a small camera motion. With its robustness to noise, the homography constraint is suitable for dense co-located points.

For the point $p_1^i$ in the first frame and the point $p_2^i$ in the second frame at both of which a point Xn in a scene plane n is projected as shown in FIG. 9B, the following transformation expression is established based on a 3-by-3 homography matrix $H_{1,2}$.

$$p_2^i = H_{1,2} p_1^i \quad \text{Expression 6}$$

Here, "$p_1^i$" represents a pixel location of a point $p_1$ in the image of the first frame, the pixel location being indicated by $(x_1^i, y_1^i, 1)$. Similarly, "$p_2^i$" represents a pixel location of a point $p_2$ in the second frame corresponding to the point $p_1$, the pixel location being indicated by $(x_2^i, y_2^i, 1)$. In general, a homography matrix H (the homography matrix $H_{1,2}$ in Expression 6) can be estimated from images according to RANSAC using four or more two-dimensional points.

Thus, when the co-located point is not applicable in the transformation expression, this means that the three-dimensional point Xn is not in the plane. When the scene is assumed to be planar, the stationary measure calculation unit 103 determines that the co-located point that is not applicable in the homography transformation expression belongs to the moving object.

A trilinear constraint is obtained by developing the epipolar constraint for two images to a constraint condition for three images. Suppose here that there are co-located points in three frames corresponding to a stationary point in a certain space and that, thus, there are: a straight line connecting the camera center in the first frame and the co-located point in the image of the first frame; a straight line connecting the camera center in the second frame and the co-located point in the image of the second frame; and a straight line connecting the camera center in the third frame and the co-located point in the image of the third frame. In this case, the trilinear constraint gives a constraint condition such that the above three straight lines intersect at one point. This constraint is expressed by a tensor called a "trifocal tensor". For the stationary point X in the three-dimensional space that is projected on the point $p_1^i$ in the image of the first frame, the point $p_2^i$ in the image of the second frame, and the point $p_3^i$ in the image of the third frame, the following expression is established using a tensor $T_j$ expressed by a 3 by 3 matrix, where j is 1 to 3.

$$\left( p_2^i \times \left( \sum_j p_1^{i(j)} T_j \right) \right)^T \times p_3^i = 0_{3 \times 3} \quad \text{Expression 7}$$

Here, "$p_1^{i(j)}$" represents a j-th component of $p_1^i$. Moreover, "$0_{3\times 3}$" represents a 3 by 3 matrix where all components are 0. In general, $T_j$ can be obtained by solving a linear equation using seven co-located points and performing repeated calculation according to a least-median-of-squares (LMedS) method or the like.

Since the epipolar constraint, the homography constraint, and the trilinear constraint are described in more detail in Non Patent Literature 4, the details are omitted here.

Figure 10:
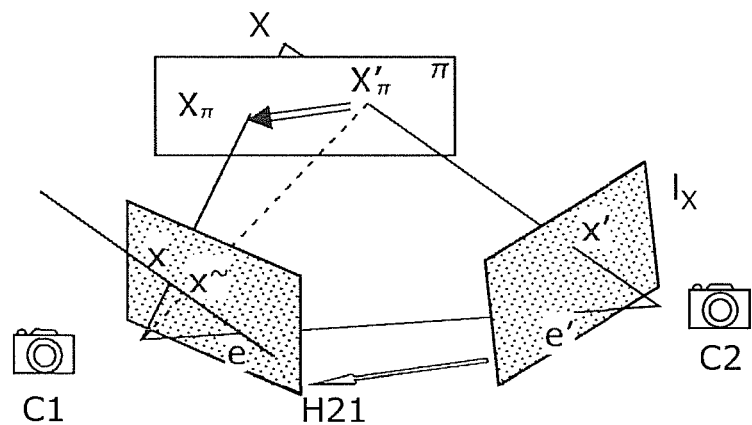
FIG. 10 is a diagram explaining a structure consistency constraint.

FIG. 10 is a diagram explaining a structure consistency constraint.

The structure consistency constraint is obtained by developing the homography constraint into a constraint condition concerning a stationary object using a depth, called a projective depth, relative to a homography plane n. As shown in FIG. 10, a three-dimensional point X projected on a point x in the image of the first frame is projected as a point x' in the image of the second frame. However, even when the point X is a point Xn' in a plane n, the point X is projected on the point x' in the image of the second frame. Here, the point Xn' is projected on a point x˜ in the image of the first frame. When the point X is farther away from the plane n along a straight line connecting the point x' and the point Xn', a distance between the point x˜ and the point x increases. In this case, as shown in FIG. 10, the points x, x˜, and x' and epipoles e and e'definitely exist in a plane formed by a location C1 of the camera 110 in the first frame, a location C2 of the camera 110 in the second frame, and the point X. More specifically, by focusing on a ratio of a distance between the point x and the epipole e to a distance between the point x˜ and the epipole e, a depth expression (i.e., projective depth) relative to the reference plane n can be implemented.

Here, a value $k_{12}^i$ of the projective depth is calculated according to the following expression.

$$k_{12}^i = \frac{(H_{21} p_2^i \times p_1^i)^T (p_1^i \times e_1)}{\| p_1^i \times e_{12} \|^2} \quad \text{Expression 8}$$

In Expression 8, "$p_1^i$" represents a pixel location of a point in the image of the first frame, the pixel location being indicated by $(x_1^i, y_1^i, 1)$. Also, "$e_1$" represents a pixel location of an epipole in the image of the first frame, the pixel location being indicated by (u, v, 1). Moreover, "$H_{21}$" represents the 3-by-3 homography matrix for projecting the point in the image of the second frame on the point in the image of the first frame with regard to a point in the reference plane n. Furthermore, "$p_2^i$" represents a pixel location of a point in the second frame corresponding to the point $p_1^i$, the pixel location being indicated by $(x_2^i, y_2^i, 1)$. In this way, the projective depth $k_{12}^i$ can be obtained for each of the pixels having the co-located points.

In order to estimate the geometric constraint for the stationary object, at least three frames need to be used. When the point X is stationary, a bilinear constraint expression is established as follows via a 4 by 4 matrix $G_{1,2,3}$ for the points in the images and the projective depths.

$$\tilde{P}_{2,3}^{iT} G_{1,2,3} \tilde{P}_{1,2}^i = 0$$

$$\tilde{P}_{1,2}^i = (x_1^i, y_1^i, k_{12}^i), \tilde{P}_{2,3}^i = (x_2^i, y_2^i, k_{23}^i) \quad \text{Expression 9}$$

It should be noted that $p_1^i$ and $p_2^i$ have a relationship as co-located points as described, and that, as with $k_{12}^i$, $k_{23}^i$ represents a projective depth obtained between the image of the second frame and the image of the third frame.

Thus, by estimating the matrix $G_{1,2,3}$ from the images and obtaining a pixel that does not satisfy the constraint expression in the images, whether the pixel belongs to the stationary object or the moving object can be estimated. The matrix $G_{1,2,3}$ can be obtained by performing repeated calculation according to a least-median-of-squares (LMedS) method or the like using 15 co-located points.

Since the structure consistency constraint is described in more detail in Non Patent Literature 5, further detailed explanation is omitted here.

Non Patent Literature 4: Richard Hartley and Andrew Zisserman, "Multiple-View Geometry in Computer Vision", second ed. Cambridge Univ. Press, 2003

Non Patent Literature 5: Chang Yuan, Gerard Medioni, Jinman Kang, and Isaac Cohen, "Detecting Motion Regions in the Presence of a Strong Parallax from a Moving Camera by Multiview Geometric Constraints", IEEE Transactions On Pattern Analysis and Machine Intelligence, Vol. 29, No. 9, September 2007

Examples of the geometric constraint used by the stationary measure calculation unit 103 have described thus far.

The geometric constraint estimation unit 701 estimates the above-mentioned geometric constraint. The geometric constraint to be used may be selected by a user according to the scene and circumstances.

When the homography constrains is used, the homography H is estimated from the images. When the epipole constraint is used, the fundamental matrix F is estimated. When the structure consistency constraint is used, the matrix G is estimated. Then, the geometric constraint estimation unit 701 outputs the result to the error calculation unit 702.

Based on the geometric constraint estimated by the geometric constraint estimation unit 701, the error calculation unit 702 calculates a stationary measure E representing the stationary likelihood of the moving trajectory corresponding to the pixel.

When the point does not satisfy the geometric constraint, the possibility that the point belongs to the stationary object is thought to be low. Therefore, based on the estimated geometric constraint, the error calculation unit 702 calculates, as the stationary measure E, a constraint error representing a degree at which the trajectory of the pixel does not belong to the stationary object, which is, representing the moving likelihood of the trajectory. As the stationary measure E, an evaluation value is used that ideally takes 0 when the trajectory belongs to the stationary object.

In Embodiment, the epipolar constraint is used as the geometric constraint to calculate the stationary measure E. To be more specific, the following Expression 10 is used to calculate the stationary measure E (i) of the pixel i present from the first frame to the T-th frame.

$$E(i) = \sum_{t=1}^{T-1} |p_{t+1}^{iT} F_{t,t+1} p_t^i| \qquad \text{Expression 10}$$

When the homography constraint is used, a value obtained by the following expression may be used as the stationary measure E (i). A reprojection error in an image plane is used as an evaluation value.

$$E(i) = \sum_{t=1}^{T-1} |p_{t+1}^i - H_{t,t+1} p_t^i| \qquad \text{Expression 11}$$

When the structure consistency constraint is used, a value obtained by the following expression may be used as the stationary measure E (i). A value of a bilinear constraint expression is used as an evaluation value.

$$E(i) = \sum_{t=1}^{T-2} |\tilde{P}_{t+1,t+2}^{jT} G_{t,t+1,t+2} \tilde{P}_{t,t+1}^j| \qquad \text{Expression 12}$$

It should be obvious that, besides the examples described here, any types of measure may be used as the stationary measure E representing the stationary likelihood as long as the measure takes on 0 when the trajectory belongs to a stationary object and on a value other than 0 when the trajectory belongs to a moving object. To be more specific, suppose that the measure takes an evaluation value which is ideally 0 when the trajectory belongs to the stationary object and which increases in a positive direction from 0 when the trajectory belongs less to the stationary object, that is, when the trajectory belongs to the moving object moving at a higher speed, for example. In this case, the evaluation value can be used as the stationary measure E.

The present example describes the case where a single geometric constraint is used as the stationary measure E. However, the stationary measure E may include a plurality of geometric constrains and a plurality of geometric constraint errors at the same time. For example, when the homography constraint and the epipole constraint are used at the same time, the following Expression 13 can calculate the stationary measure E. Here, $\lambda_1$ and $\lambda_2$ are used for specifying a balance between the geometric constraint errors. Both $\lambda_1$ and $\lambda_2$ may be 1, for instance. In the case of using only one geometric constraint error, the error sensitivity may be low in some points. However, the plurality of errors can compensate variations in the error sensitivity and, therefore, the stationary measure E can be calculated with more stability.

$$E(i) = \lambda_1 \sum_{t=1}^{T-1} |p_{t+1}^{iT} F_{t,t+1} p_t^i| + \lambda_2 \sum_{t=1}^{T-1} |p_{t+1}^i - H_{t,t+1} p_t^i| \qquad \text{Expression 13}$$

Figure 11A:
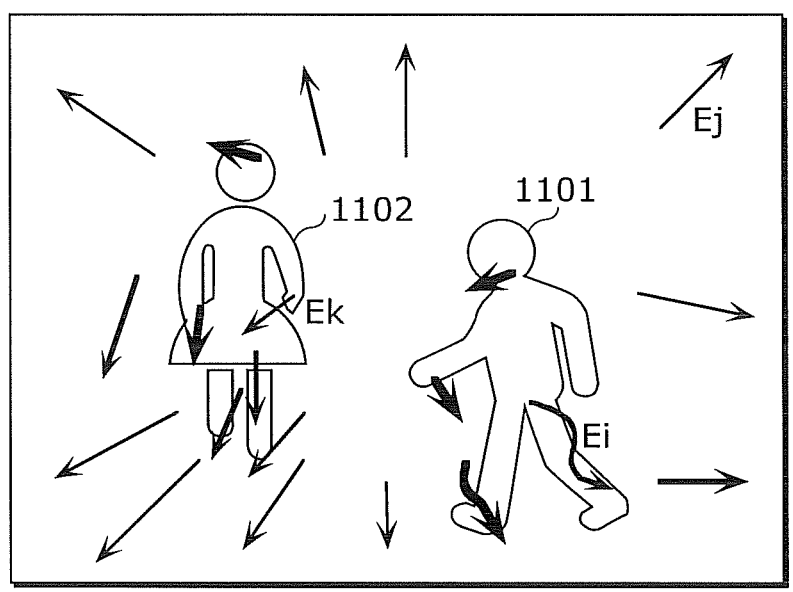
FIG. 11A is a diagram showing examples of trajectories in a picture and magnitudes of corresponding stationary measures.
Figure 11B:
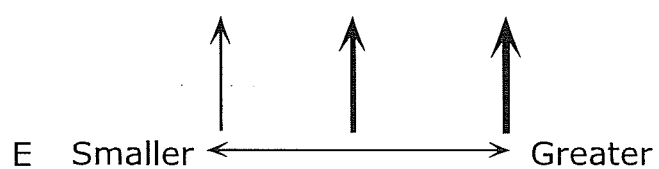
FIG. 11B is a diagram showing a relationship between the magnitude of the stationary measure and the thickness of the arrow.

FIG. 11A shows examples of the stationary measure E representing the stationary likelihood of the trajectory. In this diagram, the magnitude of the stationary measure E representing the stationary likelihood of the trajectory is indicated by the thickness of an arrow. To be more specific, as shown in FIG. 11B, when the arrow is thinner, the stationary measure is smaller, meaning that the stationary likelihood is high. Here, since the camera moves forward, large motion is caused in the trajectory of the background as well. Note that a direction of the arrow indicates a direction of the trajectory.

In many of the examples shown in FIG. 11A, the stationary measure E has a great value when the trajectory belongs to the moving object, and has a small value when the trajectory belongs to the background. For example, a stationary measure Ei of the trajectory belonging to a leg part of a pedestrian 1101 shown on the right in the diagram has a great value (when Kanade-Lucas-Tomasi (KLT) co-located points and the epipolar constraint are used, the stationary measure Ei is approximately 5, for example, although depending on the magnitude of motion). On the other hand, a stationary measure Ej of the trajectory belonging to the background has a small value (when KLT co-located points and the epipolar constraint are used, the stationary measure Ej is approximately 0.5 at the maximum, for example). In this way, when the magnitude of the stationary measure E is greatly different between the trajectory belonging to the moving object and the trajectory belonging to the stationary object, the trajectory belonging to the moving object can be distinguished from the trajectory belonging to the background based on the stationary measures E.

However, there may be a case where the trajectory of the moving object happens to be close to the trajectory of the background and, as a result, the stationary measure E is small. For example, a stationary measure Ek of the trajectory of a pedestrian 1102 shown on the left in the diagram has a small value because this trajectory happens to be similar to the trajectory of the background. Moreover, there may be a case where the stationary measure E of the trajectory of the background has a great value due to an error in the trajectory calculation. In this way, in regard to the stationary measure E representing the stationary likelihood of the trajectory, there may be a case where a difference between the stationary measure (such as Ek) of the trajectory of the moving object and the stationary measure (such as Ej) of the trajectory of the background is small. As a result of such a case, the trajectory belonging to the moving object may be detected as the background.

In order to avoid such a detection error, Embodiment aims to detect the moving object with stability by performing clustering on the trajectories, in consideration of the similarity between the trajectories in addition to the stationary measure representing the stationary likelihood of the trajectory. To be more specific, the stationary measure representing the stationary likelihood of the trajectory is used as a weight in the clustering performed based on the similarity between the trajectories as described later.

Next, the distance calculation step S304 is executed by the distance calculation unit 104. More specifically, the distance calculation unit 104 calculates a distance representing the similarity between the trajectories, using the plurality of trajectories $x^i$ calculated by the trajectory calculation unit 102. To be more specific, the distance calculation unit 104 calculates, in stages, a Euclidean distance f (i, j) and a geodesic distance g (i, j), between the trajectory of the pixel i and the trajectory of the pixel j. Here, each of the Euclidean distance and the geodesic distance represents the similarity between the trajectories. This means that the value of each of the Euclidean distance and the geodesic distance is 0 when the trajectories are completely the same. Conversely, when the similarity between the trajectories is lower, each of the Euclidean distance and the geodesic distance takes on a greater positive value including ∞.

Figure 12:
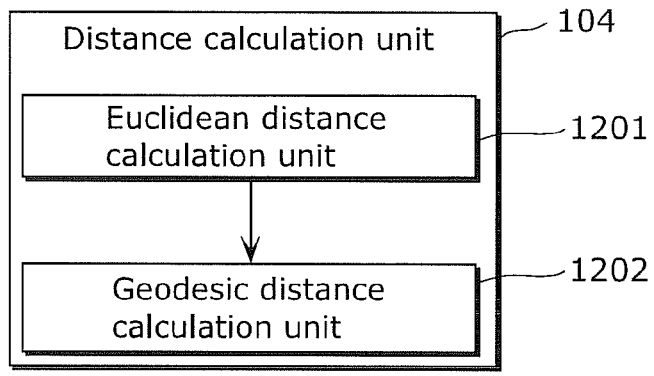
FIG. 12 is a diagram showing a configuration of a distance calculation unit included in the moving object detection apparatus.

The following describes a method by which the distance calculation unit 104 calculates the distance representing the similarity between the trajectories, with reference to FIG. 12.

FIG. 12 is a diagram showing an example of a configuration of the distance calculation unit 104. The distance calculation unit 104 includes a Euclidean distance calculation unit 1201 and a geodesic distance calculation unit 1202.

With the configuration shown in FIG. 12, the Euclidean distance calculation unit 1201 calculates the Euclidean distance f (i, j) between the trajectory of the pixel i and the trajectory of the pixel j according to Expression 14.

$$f(i, j) = \frac{1}{T}\sum_{t=1}^{T} d_{ij}^t \quad \text{Expression 14}$$

$$\left(\text{where } d_{ij}^t = \sqrt{(x_t^i - x_t^j)^2 + (y_t^i - y_t^j)^2}\right)$$

Here, the Euclidean distance f (i, j) calculated by Expression 14 is defined as a distance between every pair of trajectories for convenience in writing. However, note that the value of the Euclidean distance is finite only between an N numbers of trajectories $x^i$.

It should be noted that although the Euclidean distance is calculated according to Expression 14 in Embodiment, the expression is not limited to Expression 14. The Euclidean distance may be any types of measure as long as the measure represents geometric similarity between the trajectories in, for example, location at picture coordinates, speed, acceleration, or rotational speed as with Expression 14. As an example, the following Expression 15 may be used.

$$f(i, j) = \frac{1}{T}\sum_{t=1}^{T} d_{ij}^t + w\sqrt{\frac{1}{T}\sum_{t=1}^{T}(d_{ij}^t - \bar{d})^2} \quad \text{Expression 15}$$

$$\left(\text{where } d_{ij}^t = \sqrt{(x_t^i - x_t^j)^2 + (y_t^i - y_t^j)^2}, \bar{d} = \frac{1}{T}\sum_{t=1}^{T} d_{ij}^t\right)$$

In Expression 15, "w" represents a weight coefficient and is a parameter set by a designer. The Euclidean distance f (i, j) between the trajectories in Expression 15 is calculated by adding a time average of distances between the trajectories at the picture coordinates to a time-varying element of the distances between the trajectories at the picture coordinates. In particular, the time-varying element of the distance between the trajectories indicates similarity in motion between the trajectories. With this element, even when shape variations are present, the similarity between the trajectories can be obtained with more accuracy.

A set of Euclidean distances f (i, j) between the trajectories calculated according to the above procedure is expressed as a Euclidean distance matrix $F_{dist}$.

$$F_{dist} = \{f(i,j)\} \quad \text{Expression 16}$$

Next, the geodesic distance calculation unit 1202 of the distance calculation unit 104 calculates the geodesic distance g (i, j) from the Euclidean distance f (i, j) between the trajectories.

The following describes in detail an operation performed by the geodesic distance calculation unit 1202 to calculate the geodesic distance g (i, j) from the Euclidean distance f (i, j).

Firstly, from the Euclidean distance f (i, j) calculated by the Euclidean distance calculation unit 1201, the geodesic distance calculation unit 1202 calculates a nonlinear distance f' (i, j) expressed by Expression 17 using a predetermined threshold R.

$$f'(i, j) = \begin{cases} f(i, j) & \text{if } f(i, j) < R \\ \infty & \text{otherwise} \end{cases} \quad \text{Expression 17}$$

Next, the geodesic distance calculation unit 1202 calculates the geodesic distance from the nonlinear distance f' (i, j). Here, supposing that a plurality of data points defined in a certain space are present and that connections between the data points and distances between the connected data points are obtained, the "geodesic distance" refers to a shortest distance among the distances of all paths available between two data points.

Thus, in order to obtain the geodesic distance between the i-th trajectory $x^i$ to the j-th trajectory $x^j$, the geodesic distance calculation unit 1202 calculates, as the geodesic distance, a shortest path among all paths to reach the j-th trajectory $x^j$ from the i-th trajectory $x^i$ via any of the other trajectories as a relay point.

For example, suppose that a node distance f' (i, j) directly connecting two points, i.e., the trajectory $x^i$ and the trajectory $x^j$, is already obtained. In this case, in addition to the path directly connecting the two points, the paths connecting the trajectory $x^i$ and the trajectory $x^j$ include a path via another trajectory $x^s$. A distance of this path is expressed as f' (i, s)+f' (s, j). Thus, a plurality of paths are available to connect the two points of the trajectory $x^i$ and the trajectory $x^j$, and the shortest distance among the distances of these paths is calculated as the geodesic distance g (i, j) according to Expression 18.

$$g(i,j)=\min(f'(i,j), f'(i,s)+f'(s,j), \ldots)$$ Expression 18

In Expression 18, "min (x, y, . . . )" represents a function which returns a smaller one of x and y values. Moreover, "s" represents a trajectory $x^s$, and is a relay point to reach the trajectory $x^j$ from the trajectory $x^i$. Here, the relay point s in f' (i, s)+f' (s, j) is not limited to one point.

As an example of the method of searching for the shortest path between the two points to calculate the geodesic distance as described, Dijkstra's algorithm disclosed in Non Patent Literature 6 is well known. Therefore, a detailed explanation on the procedure is omitted here.

Non Patent Literature 6: E. W. Dijkstra, "A note on two problems in connexion with graphs", Numerische Mathematik, pp. 269-271, 1959

According to the procedure described above, the geodesic distance calculation unit 1202 calculates the geodesic distance g (i, j) from the Euclidean distance f (i, j) between the trajectories the duration of which is long. It should be noted that the method of calculating the geodesic distance is not limited to Expression 17 and Expression 18 described above.

The most distinct difference between the Euclidean distance and the geodesic distance is a relationship between: the two data points between which the distance is to be calculated; and another data point. The Euclidean distance is defined only by the two data points regardless of the state of the other data point. On the other hand, the geodesic distance is defined as a distance including the two data points and the other data point present on the path connecting the two data points, meaning that the geodesic distance may be influenced by the state of the other data point.

A set of calculated geodesic distances g (i, j) between the trajectories is expressed as a geodesic distance matrix $G_{dist}$ by Expression 19 below.

$$G_{dist}=\{g(i,j)\}$$ Expression 19

According to the above procedure, the geodesic distance calculation unit 1202 calculates the geodesic distances g (i, j) representing the similarity between the N number of trajectories and outputs the result as the geodesic distance matrix $G_{dist}$.

Figure 13A:
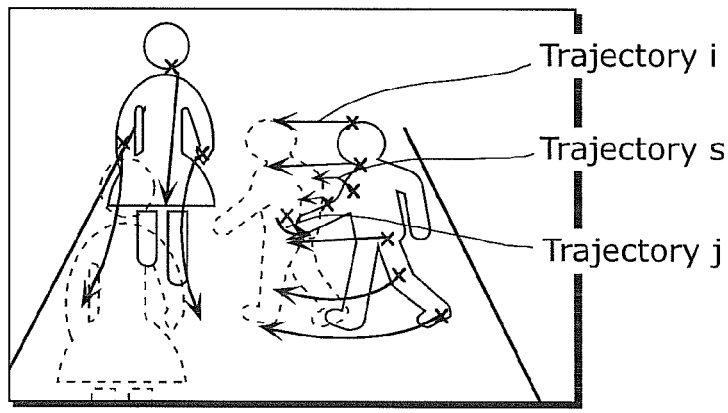
FIG. 13A is a diagram showing examples of trajectories in a picture.
Figure 13B:
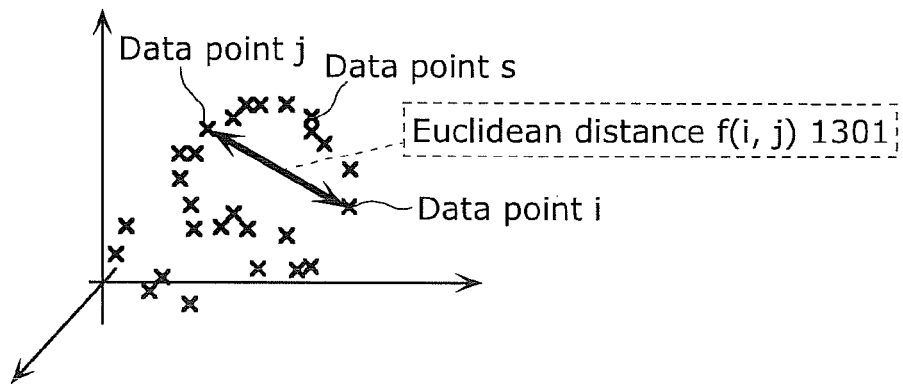
FIG. 13B is a diagram showing a data distribution and a Euclidean distance between trajectories.
Figure 13C:
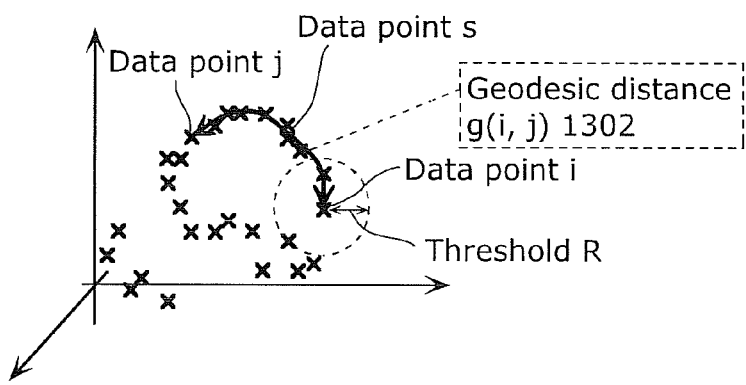
FIG. 13C is a diagram showing a data distribution and a geodesic distance between trajectories.

The above process to calculate the geodesic distance from the Euclidean distances between the trajectories is described, with reference to conceptual diagrams shown in FIG. 13A to FIG. 13C.

FIG. 13A is a diagram showing examples of the trajectories included in the picture. It should be noted that although trajectories are calculated for the background, the trajectories of the background are not illustrated here for the sake of simplicity in the diagram.

FIG. 13B is a diagram showing a data distribution of the trajectories each of which is expressed by Expression 2. Each of data points indicated by "x" in FIG. 13B corresponds to the trajectory $x^i$ of the pixel i expressed by Expression 2. The trajectory $x^i$ is a vector including a (T×2) number of independent variables. On this account, the trajectory originally represents data in a (T×2)-dimensional space at the maximum. However, FIG. 13B shows the points in the three-dimensional space for convenience in illustration.

An arrow 1301 in FIG. 13B indicates the Euclidean distance f (i, j) calculated by Expression 14 between the trajectory $x^i$ and the trajectory $x^j$. To be more specific, a Euclidean distance 1301 between the data point i and the data point j is a distance of a path directly connecting these data points.

On the other hand, an arrow 1302 in FIG. 13C indicates the geodesic distance g (i, j) obtained by Expression 18 between the trajectory $x^i$ and the trajectory $x^j$. As shown in FIG. 13C, a geodesic distance 1302 between the data point i and the data point j is a distance passing through the data point s serving as a relay point.

Figure 14:
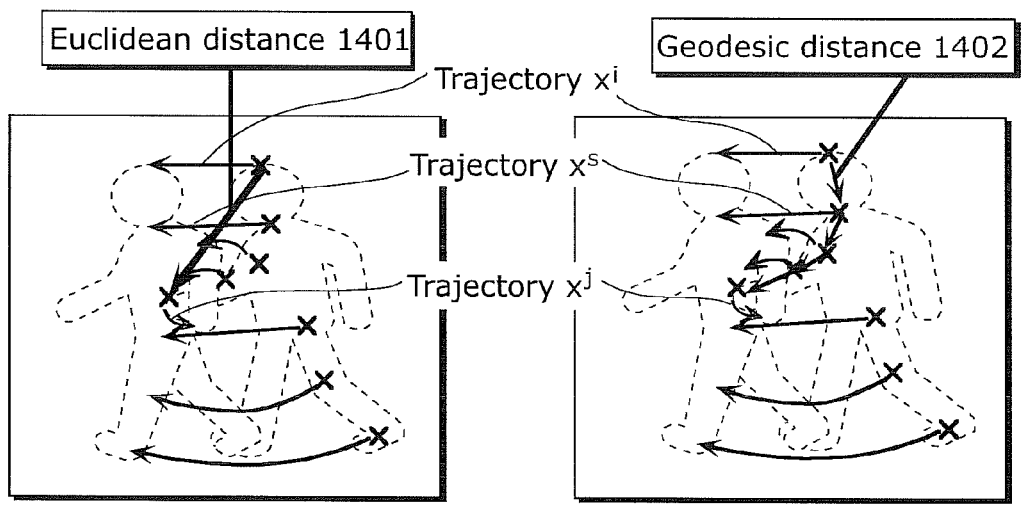
FIG. 14 is a diagram showing a Euclidean distance between trajectories and a geodesic distance between the trajectories.

Next, characteristics of the Euclidean distance f (i, j) and the geodesic distance g (i, j) calculated by Expression 18 are described in detail, with reference to a conceptual diagram shown in (a) and (b) of FIG. 14.

In (a) of FIG. 14, an arrow 1401 indicates the Euclidean distance of the moving object in the picture between the trajectory $x^i$ of a head region and the trajectory $x^j$ of a hand region. As is obvious from this diagram, regardless of the other trajectories, a Euclidean distance 1401 is dependent only on the two trajectories $x^i$ and $x^j$ which are targets of distance calculation.

Moreover, (b) of FIG. 14 shows a geodesic distance 1402 between the trajectory $x^i$ of the head region and the trajectory $x^j$ of the hand region. In this example, as indicated by a thick arrow 1402, a path reaching the trajectory $x^j$ passes through not only the target two trajectories $x^i$ and $x^j$ but also the other trajectories including the trajectory $x^s$. More specifically, the geodesic distance 1402 is a sum of the distances between the trajectories through which the path passes and is thus influenced by the trajectories other than the trajectories $x^i$ and $x^j$.

In other words, the Euclidean distance 1401 shown in (a) FIG. 14 does not reflect the distribution of the other trajectories at all. Therefore, in the case of an articulated moving object such as a pedestrian, the distance between the trajectories takes a value independent on the shape of the object. On the other hand, the geodesic distance 1402 shown in (b) in FIG. 14 reflects the other trajectories. Therefore, in the case of an articulated moving object such as a pedestrian, the distance between the trajectories takes a value dependent on the shape of the object. More specifically, since the articulated connections are included as information in the distance, this distance can also be used for detecting a moving object, such as a pedestrian, that changes its shape.

As described above, the trajectory $x^i$ expressed by Expression 2 is data in the (T×2)-dimensional space at the maximum mathematically. However, as shown in FIG. 13B and FIG. 13C, the trajectories actually calculated from the picture have the property to be localized only in a very small part of the (T×2)-dimensional space. This has been experimentally confirmed by the present inventors as well. As the standard of the distance representing the similarity between the trajectories having the property as described, the geodesic distance (such as the geodesic distance 1402 shown in (b) of FIG. 14) reflecting the density of neighboring data is more appropriate than the Euclidean distance (such as the Euclidean distance 1401 shown in (a) of FIG. 14) calculated as a simple distance between the two data points regardless of the data distribution.

As an example of the method employed by the geodesic distance calculation unit 1202 to calculate the geodesic distance from the Euclidean distance, the method using Expression 17 and Expression 18 has been described. However, note that the method of calculating the geodesic distance is not limited to this.

For example, a K number of predetermined thresholds Nk may be used instead of a K number of predetermined thresholds Rk. Then, the following process may be performed to calculate a nonlinear distance f'k (i, j) from the Euclidean distance f (i, j). That is, instead of the process expressed by Expression 17 to change the Euclidean distance f (i, j) greater than or equal to the predetermined threshold Rk into an infinite distance, the nonlinear distance f'k (i, j) may be calculated by changing, into an infinite distance, the Euclidean distance longer than an Nk-th shortest Euclidean distance among the Euclidean distances f (i, j) between the trajectory $x^i$ and a (I−1) number of other trajectories.

Moreover, instead of the process to change the Euclidean distance into the infinite distance, the nonlinear distance f'k (i, j) may be calculated by changing, into an infinite distance, the Euclidean distance longer than the k-th shortest Euclidean distance.

Next, the subclass classification step S305 is executed by the subclass classification unit 105. To be more specific, the subclass classification unit 105 generates subclasses by performing clustering on the trajectories calculated by the trajectory calculation unit 102 according to a certain measure, such as luminance or similarity between the trajectories.

Figure 15:
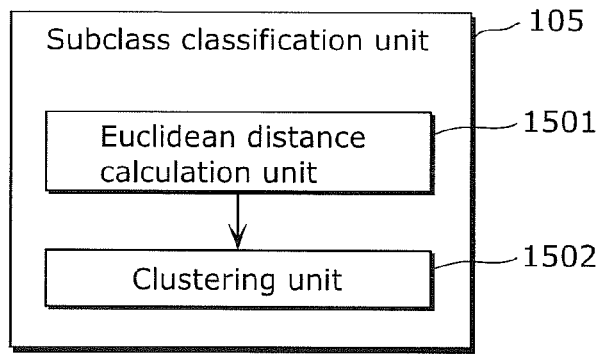
FIG. 15 is a diagram showing a configuration of a subclass classification unit included in the moving object detection apparatus.

In Embodiment, the subclass classification unit 105 includes a Euclidean distance calculation unit 1501 and a clustering unit 1502 as shown in FIG. 15. The Euclidean distance calculation unit 1501 calculates a Euclidean distance between trajectories. The clustering unit 1502 performs clustering based on the Euclidean distance.

A process performed by the Euclidean distance calculation unit 1501 is completely the same as the process performed by the Euclidean distance calculation unit 1201 of the distance calculation unit 104. Therefore, the explanation is not repeated here.

The clustering unit 1502 performs clustering by repeating a process of classifying the trajectory "i" and the trajectory "j" into one class in ascending order of the Euclidean distances f (i, j), using the Euclidean distances f (i, j) between the trajectory "i" and the trajectory "j" calculated by the Euclidean distance calculation unit 1501.

Figure 16A:
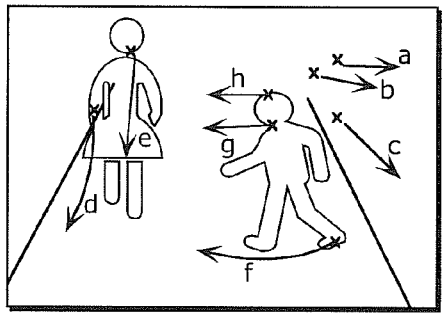
FIG. 16A is a diagram showing examples of trajectories in a picture.

As shown by trajectories "a" to "h" in FIG. 16A, even in the same object, the trajectory is different for each of the regions because of variations in posture. Yet, as long as the object is articulated, it can be assumed that the trajectories close to each other, in particular, have high similarity. Here, the high similarity indicates that the Euclidean distance f (i, j) between the trajectory "i" and the trajectory "j" is short. Moreover, when the Euclidean distance f (i, j) is short, this can be understood that the trajectories "i" and "j" are located at a short distance from each other in a higher-dimensional space including the trajectories.

Figure 16B:
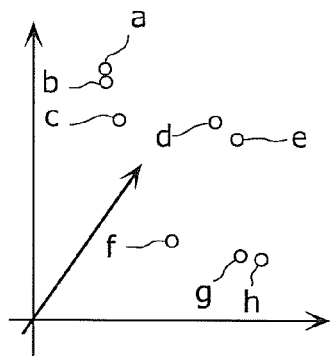
FIG. 16B is a conceptual diagram showing a higher-dimensional space including trajectories.

FIG. 16B is a conceptual diagram showing the higher-dimensional space including the trajectories. Although this conceptual diagram shows a three-dimensional space to simplify the description, the elements of the vector represented by Expression 2 correspond to the dimensions in reality. More specifically, the higher-dimensional space refers to a space where the number of dimensions is 2×T. Furthermore, although FIG. 16A shows the eight trajectories a to h for the sake of simplification, a trajectory obtained on a per-pixel basis or on a per-block basis may be used in practice. Here, a data point in the higher-dimensional space including the trajectories shown in FIG. 16B corresponds to one trajectory represented by Expression 2. That is, the data points are obtained as a result of tracking not only pixels in one picture but also pixels over temporally-different pictures.

Then, clustering is performed on the trajectories based on the continuity of the distribution in the higher-dimensional space including the trajectories. In other words, clustering is performed based on the discontinuity of the distance between the trajectories. As a result, each of the classes can be expected to correspond to an individual object or a part of the object, and object detection and segmentation can be accordingly performed.

Firstly, note that each region obtained as a result of the segmentation is expressed as follows.

$$\theta = \{\theta_1, \ldots \theta_m \ldots \theta_M\} \qquad \text{Expression 20}$$

Here, "M" represents the number of regions and is determined empirically according to a scene to be used.

The subclass classification unit 105 firstly performs a process to assign a same region label $\theta_m$ to the trajectory i and the trajectory j different from each other, in ascending order of the Euclidean distances f (i, j). In this process, when one of the trajectories i and j already belongs to a region $\theta_k$, a pixel to which a region label has not been assigned is classified into the region $\theta_k$ as well. When the trajectory i and the trajectory j belong to different regions, the region labels are integrated. Next, the subclass classification unit 105 determines whether or not the label assignment has been performed on all the trajectories and the number of regions reaches the predetermined M. When this condition is not satisfied, the subclass classification unit 105 repeats the above process to assign the same region label $\theta_m$ to the trajectory i and the trajectory j, in ascending order of the Euclidean distances f (i, j). It should be noted that, when the number of trajectories belonging to a region is smaller than or equal to a threshold $T_{cluster}$, the current region may be processed as an outlier and be discarded not to be used in a subsequent process.

Figure 16C:
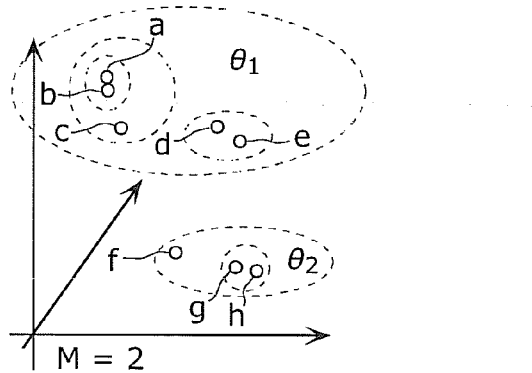
FIG. 16C is a diagram explaining a process of classifying trajectories into subclasses when the number of regions M is 2.
Figure 16D:
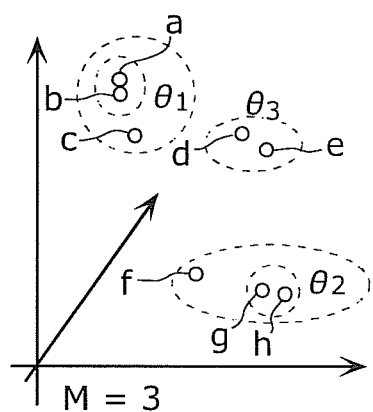
FIG. 16D is a diagram explaining a process of classifying trajectories into subclasses when the number of regions M is 3.

Specific examples of the subclass classification are described, with reference to FIG. 16C and FIG. 16D. For the sake of simplicity, the cases where M=2 (FIG. 16C) and M=3 (FIG. 16D) are explained. When the subclass classification is performed in reality, M having a greater value is to be used such that a region of the moving object is segmented into adequately smaller classes. In the examples shown in FIG. 16A to FIG. 16D, suppose that a distance between the trajectories "a" and "b" is represented as f (a, b). In this case, the following holds: f (a, b)<f (g, h)<f (d, e)<f (b, c)<f (f, g)<f(c, d). Firstly, the case where M=2 is explained with reference to FIG. 16C. Since the distance f (a, b) between the trajectories "a" and "b" is the shortest, the subclass classification unit 105 assigns a same region label $\theta_1$ to the trajectories "a" and "b". Next, since the distance f (g, h) between the trajectories "g" and "h" is the second shortest, the subclass classification unit 105 assigns a same region label $\theta_2$ to the trajectories "g" and "h". Moreover, the subclass classification unit 105 assigns a same region label $\theta_3$ to the trajectories "d" and "e" having the third shortest distance. The next shortest distance is the distance f (b, c) between the trajectories "b" and "c". Here, since the label assignment has already been performed on the trajectory "b", the subclass classification unit 105 assigns, to the trajectory "c", the region label $\theta_1$ assigned to the trajectory "b". The next shortest distance is the distance f (f, g) between the trajectories "f" and "g". As is the case with the distance f (b, c), the subclass classification unit 105 assigns, to the trajectory "f", the region label $\theta_3$ assigned to the trajectory "g". When the condition is set as M=3, it is determined here that the label assignment has been performed on all the trajectories and that M reaches 3. Thus, the process is terminated here.

When the condition is set as M=2, the current subclass classification does not satisfy this condition. As described before, the next shortest distance is the distance between trajectories "c" and "d". Then, the subclass classification unit 105 integrates the region label $\theta_1$ to which the trajectory "c" belongs, and the region label $\theta_3$ to which the trajectory "d" belongs. Moreover, the subclass classification unit 105 assigns the region label $\theta_1$ to the trajectories "a" to "e". Here, it is determined that the label assignment has been performed on all the trajectories and that M reaches 2. Thus, the process is terminated here.

Embodiment allows the segmentation to be performed in consideration of the pixel location and motion similarity, by calculating the distance between the trajectories according to Expression 14 or 15. The specific example shown in FIG. 16C is explained. When the condition is set as M=2, because of relative similarity in movement between the pedestrian on the left and the background, the trajectories are classified into two subclasses, where one is for the pedestrian on the right and the other is for the background and the left pedestrian. Moreover, when the condition is set as M=3, because of a difference in movement between the left pedestrian and the background, the trajectories are classified, in addition to the classification of when M=2, into three classes respectively for the background, the left pedestrian, and the right pedestrian. Similarly, when the value of M is set greater, clustering can be performed on the trajectories until each subclass is so small that no joint of the pedestrian is included.

In this way, the region labels are sequentially assigned to the similar trajectories. Thus, the trajectories contiguous in the higher-dimensional space are determined to belong to one class. Moreover, by setting a point where the distance between the trajectories is longer as a discontinuous point, the classes can be accordingly divided. Then, the trajectories belonging to the corresponding classes can be used for the moving object detection.

In the above description, the subclass classification unit 105 generates the subclasses by performing clustering on the set of trajectories calculated by the trajectory calculation unit 102, using a certain measure, such as luminance or similarity between the trajectories. However, it should be noted that each of the subclasses does not necessarily need to include a plurality of trajectories. To be more specific, the subclass classification may be performed so that each of the subclasses includes one trajectory.

Figure 17:
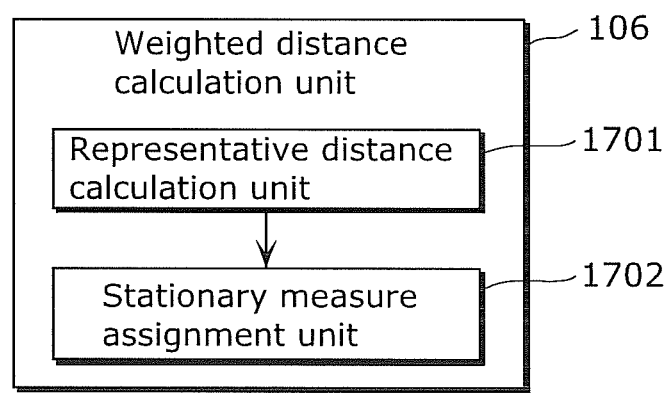
FIG. 17 is a diagram showing a configuration of a weighted distance calculation unit.

Next, the distance calculation step S306 is executed by the weighted distance calculation unit 106. As shown in FIG. 17, the weighted distance calculation unit 106 includes a representative distance calculation unit 1701 and a stationary measure assignment unit 1702.

The representative distance calculation unit 1701 calculates a representative value of the geodesic distances between the subclasses generated by the subclass classification unit 105 (i.e., calculates the representative geodesic distance), based on the geodesic distances and the Euclidean distances calculated by the distance calculation unit 104. Following this, the stationary measure assignment unit 1702 calculates, based on the stationary measure calculated for each pixel by the stationary measure calculation unit 103, a stationary measure representing the stationary likelihood of the trajectories included in the subclass. Then, based on the calculated stationary measure representing the stationary likelihood, the stationary measure assignment unit 1702 assigns the weight to the representative geodesic distance between the subclasses calculated by the representative distance calculation unit 1701. Firstly, an operation performed by the representative distance calculation unit 1701 is described in detail.

Figure 18:
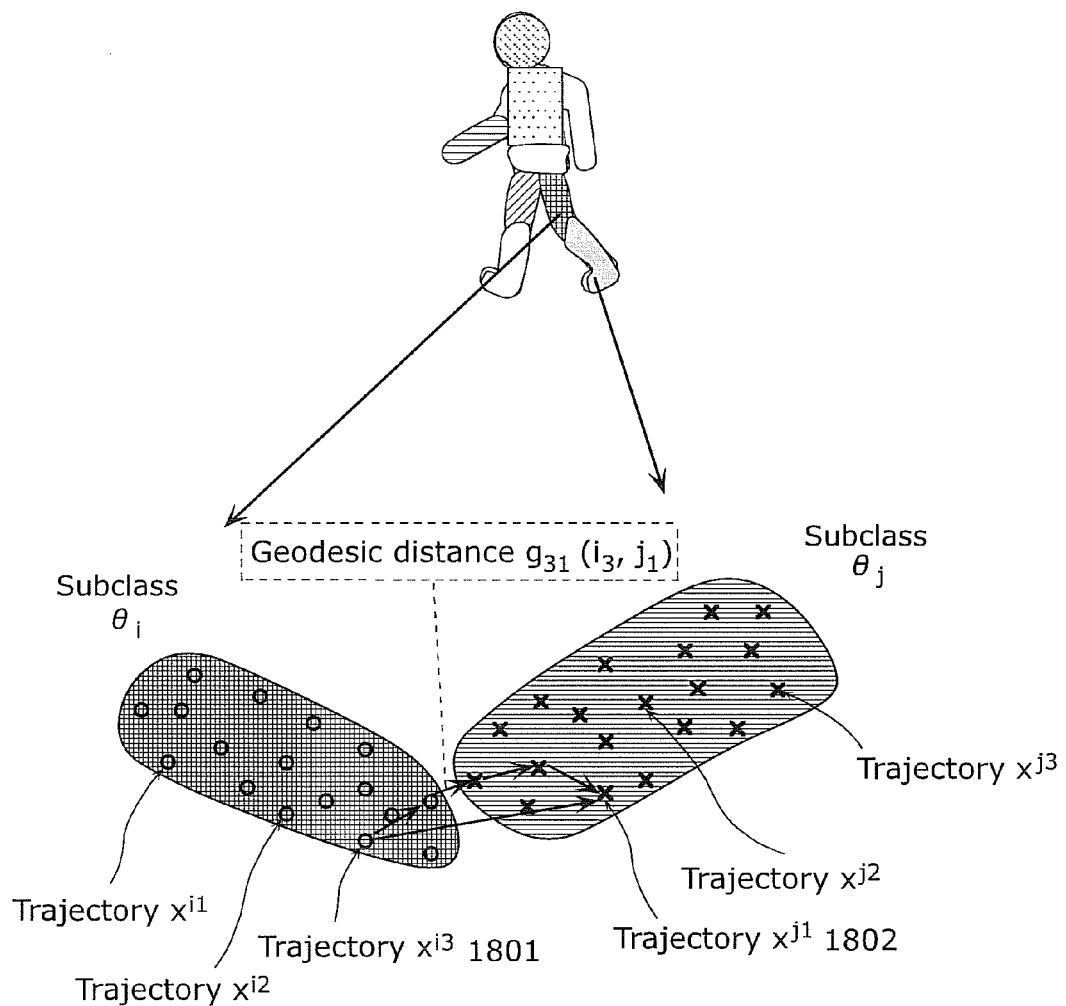
FIG. 18 is a conceptual diagram showing a geodesic distance between the subclasses.

FIG. 18 shows two subclasses $\theta_i$ and $\theta_j$ which are closely located to each other, among the plurality of subclasses generated by the subclass classification unit 105. In the following description, the "subclass" may be referred to as the "class" for the sake of simplicity.

A set of trajectories included in the class $\theta_i$ and a set of trajectory included in the class $\theta_j$ are referred to as I and J, respectively. Moreover, the number of trajectories included in the class $\theta_i$ and the number of trajectories included in the class $\theta_j$ are referred to as Ni and Nj, respectively. In this case, I and J are expressed by Expression 21 and Expression 22, respectively.

$$I = (x^{i1}, x^{i2}, \ldots, x^{int}, \ldots, x^{iNi}) \quad \text{Expression 21}$$

$$J = (x^{j1}, x^{j2}, \ldots, x^{jnj}, \ldots, x^{jNj}) \quad \text{Expression 22}$$

Here, "$x_i$" included in Expressions 21 and 22 is a trajectory expressed by a multidimensional vector as indicated by Expression 2.

Here, note that a distance calculated between a trajectory included in I and a trajectory included in J is defined as an "inter-class distance". Note also that this "distance" conceptually includes both a Euclidean distance and a geodesic distance.

FIG. 18 is a conceptual diagram showing a representative value of the inter-class geodesic distances (i.e., the representative geodesic distance). Suppose that a trajectory $x^{i3}$ 1801 is selected from the class $\theta_i$, and that a trajectory $x^{j1}$ 1802 is selected from the class $\theta_j$. In this case, the geodesic distance between these two trajectories is calculated as $g_{31}$ ($=g(i_3, j_1)$). When the distance is calculated for each of all pairs of trajectories between I and J, a plurality of geodesic distances g represented by Expression 23 are obtained.

$$g(i,j) = (g_{11}, g_{12}, \ldots, g_{NiNj}) \quad \text{Expression 23}$$

The moving object region detection in the present specification focuses on a single set of trajectories in the class, such as I or J, and performs the operation based on a macro distance between the classes. Thus, Embodiment can prevent noise and detection error of the stationary measure that may be caused when the process is performed on a pixel-by-pixel basis. On this account, it is desirable to calculate the representative value of the inter-class distances. More specifically, it is desirable for the representative value of the inter-class distances to approximate the movement or positional relationship between the classes.

As the representative distance satisfying the above desirable condition, a mean value of the geodesic distances between the trajectories in the classes can be used. The mean value is obtained by calculating the geodesic distance for each of all the pairs of trajectories included in the classes and averaging the calculated geodesic distances. In this case, the representative geodesic distance G ($\theta_i, \theta_j$) can be calculated according to the following Expression 24.

$$G(\theta_i, \theta_j) = \frac{1}{N_i N_j} \sum_{\substack{i \subset N_i, \\ j \subset N_j}}^{N_i, N_j} g(i, j) \quad \text{Expression 24}$$

It should be noted that when the geodesic distance taking an infinite value is included (i.e., the distance where g (i, j)=∞), these points are excluded from the mean value calculation of Expression 24.

Alternatively, a maximum value gmax may be calculated after excluding the infinite values from all the distances g (i, j), and then the mean value may be calculated by substituting the maximum value gmax for the distance where g (i, j)=∞. Or, only the geodesic distances may be recalculated so that g (i, j)≠∞.

It should be noted that the representative geodesic distance is not limited to the mean value of the geodesic distances.

For example, a median value of the geodesic distances between the trajectories in the classes may be used as the representative value as follows. The median value is obtained by calculating the geodesic distance for each of all the pairs of trajectories included in the classes and obtaining a median of the calculated geodesic distances. The representative value of the Euclidean distances can be obtained and used in the same way. In this case, the representative geodesic distance G ($\theta_i$, $\theta_j$) can be calculated according to the following Expression 25.

$$G(\theta_i,\theta_j)=\text{median}[g(i,j)]_{j \subset N_j}^{i \subset N_i} \quad \text{Expression 25}$$

In Expression 25, note the following part expressed by Expression 26.

$$\text{median}[g(i,j)]_{j \subset N_j}^{i \subset N_i} \quad \text{Expression 26}$$

This part indicates a function that returns a median value of g (i, j) including a plurality of values corresponding to an integer label i (i =1 to Ni) and an integer label j (j=1 to Nj).

It should be noted that when the geodesic distance taking an infinite value is included (i.e., the distance where g (i, j)=∞), these points are excluded from the median value calculation, as in the case of the mean value calculation described above. Alternatively, a maximum value gmax may be calculated after excluding the infinite values from all the distances g (i, j), and then the median value may be calculated by substituting the maximum value gmax for the distance where g (i, j)=∞. Or, only the geodesic distances may be recalculated so that g (i, j)≠∞.

Moreover, a mode value of the geodesic distances between the trajectories of the classes can be used as the representative distance, as indicated by the following Expression 27. The mode value refers to a value of the geodesic distance that occurs at the highest frequency among the geodesic distances calculated for all the pairs of trajectories included in the classes.

$$G(\theta_i,\theta_j)=\text{mode}[g(i,j)]_{j \subset N_j}^{i \subset N_i} \quad \text{Expression 27}$$

In Expression 27, note the following part expressed by Expression 28.

$$\text{mode}[g(i,j)]_{j \subset N_j}^{i \subset N_i} \quad \text{Expression 28}$$

This part indicates a function that returns a mode value of g (i, j) including a plurality of values corresponding to the integer label i (i=1 to Ni) and the integer label j (j=1 to Nj).

It should be noted that when the geodesic distance taking an infinite value is included (i.e., the distance where g (i, j)=∞), these points are excluded from the mode value calculation, as in the case of the mean value calculation described above. Alternatively, a maximum value gmax may be calculated after excluding the infinite values from all the distances g (i, j), and then the mode value may be calculated by substituting the maximum value gmax for the distance where g (i, j)=∞. Or, only the geodesic distances may be recalculated so that g (i, j)≠∞.

Next, an operation performed by the stationary measure assignment unit 1702 is described in detail. The stationary measure assignment unit 1702 assigns the weight to the representative geodesic distance G between the classes, the weight based on the stationary measures of the trajectories in the classes. The operation is explained with reference to FIG. 19A to FIG. 19E.

Figure 19A:
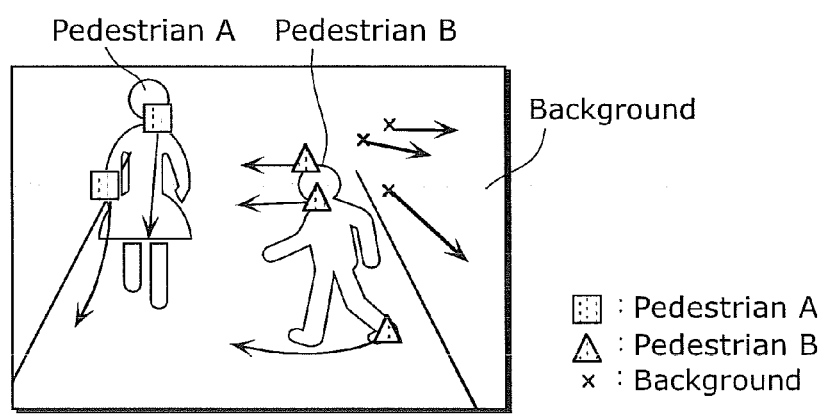
FIG. 19A is a conceptual diagram showing that examples of trajectories belonging to a moving object and a background are superimposed on the image of the scene.

FIG. 19A is a conceptual diagram showing that examples of the trajectories belonging to the moving object and the background are superimposed on a scene image. For the purpose of making the diagram easy to see: the trajectory belonging to a pedestrian A on the left is indicated by a rectangle; the trajectory belonging to a pedestrian B on the right is indicated by a triangle; and the trajectory belonging to the background is indicated by "x". FIG. 19A shows only eight representative trajectories. However, there are more trajectories in reality. In the diagram, the other trajectories are not illustrated for the purpose of making the diagram easy to see.

Figure 19B:
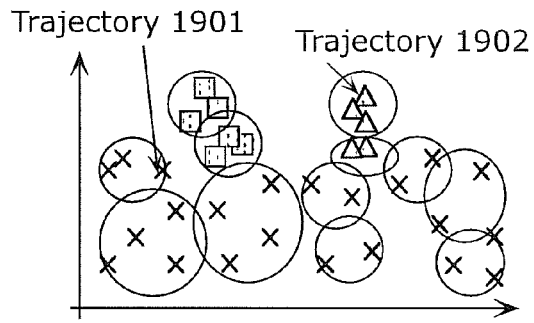
FIG. 19B is a diagram showing, in a higher-dimensional space, a result of the class classification performed by the subclass classification unit on the trajectories present in the scene shown in FIG. 19A.

FIG. 19B is a diagram showing, in a higher-dimensional space, a result of the classification performed by the subclass classification unit 105 on the trajectories present in the scene shown in FIG. 19A. Here, this diagram also shows the representative trajectories in a two-dimensional space for the purpose of making the diagram easy to see.

Each of the trajectories is observed to include a motion component of the object, i.e., the moving object or the background, in addition to a motion component of a camera. Thus, when the camera motion is larger, the motion component of the camera is more dominant in the distribution of trajectories (such as the distribution of trajectories as shown in FIG. 19B). On account of this, it is difficult to distinguish between the trajectories of the moving object and the trajectories of the background.

For example, when the camera largely moves forward as shown in FIG. 19A, the trajectories of the background radiate from a point of origin. As a result, as shown by the distribution of trajectories in FIG. 19B, similarity between the trajectories of the moving objects and the trajectories of the background and similarity between the subclasses of the trajectories of the moving objects and the subclasses of the trajectories of the background are relatively high. To be more specific, there may be a case where the geodesic distances are short. In other words, when the camera motion is larger, the distribution of the trajectories of the background and the distribution of the trajectories of the moving objects become closer to each other as shown in FIG. 19B. This means that the subclass of the background cannot be separated from the subclasses of the moving objects and, for this reason, the subclasses cannot be integrated according to the object.

Figure 19C:
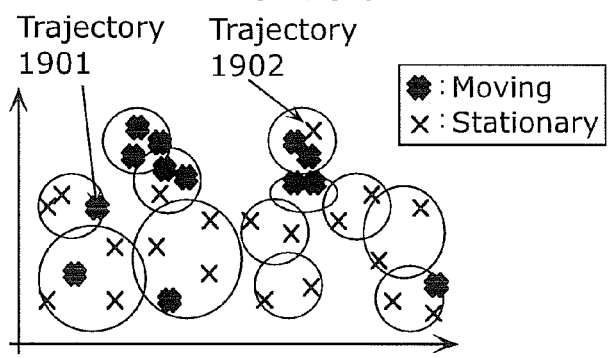
FIG. 19C is a diagram showing a result obtained by a stationary measure assignment unit by determining whether the trajectories belong to a stationary object or a moving object.

FIG. 19C is a diagram showing a result obtained by the stationary measure assignment unit 1702 by determining whether the trajectories belong to a stationary object or a moving object. FIG. 19C shows the same trajectories as shown in FIG. 19B at the same locations in the two-dimensional space.

Here, note that a measure representing the result of determination as to whether the trajectory belongs to the stationary object or the moving object is referred to as the stillness determination value $E_{ms}$. When the stationary measure E of the trajectory is greater than a set threshold $TH_{ms}$, the stationary measure assignment unit 1702 determines that the trajectory belongs to the moving object, that is, determines that the stillness determination value $E_{ms}$ is 1. Otherwise, the stationary measure assignment unit 1702 determines that the trajectory belongs to the stationary object, that is, determines that the stillness determination value $E_{ms}$ is 0. This is expressed by the following Expression 29. The threshold $TH_{ms}$ can be set by the user according to the scene or the experience of the user. In the present case, $TH_{ms}$ is set as $10^{-5}$.

$$E_{MS}(i) = \begin{cases} 1 & \text{if } E(i) > TH_{MS} \\ 0 & \text{otherwise} \end{cases} \quad \text{Expression 29}$$

The stillness determination value $E_{ms}$ is indicated by two values, i.e., 0 and 1. However, this is only an example and, therefore, the values are not limited to the aforementioned two values as long as the stationary object and the moving object are represented by different values.

When the result of determination as to whether the trajectories belong to the stationary object or the moving object as shown in FIG. 19B is compared to the actual result obtained for the trajectories as shown in FIG. 19C, the following can be understood. A trajectory 1901 that actually belongs to the stationary object is incorrectly determined to belong to the moving object (the stillness determination value $E_{ms}$=1). On the other hand, a trajectory 1902 that actually belongs to the moving object is incorrectly determined to belong to the stationary object (the stillness determination value $E_{ms}$=0). In fact, a similar event has been experimentally confirmed by the present inventors as well.

Figure 19D:
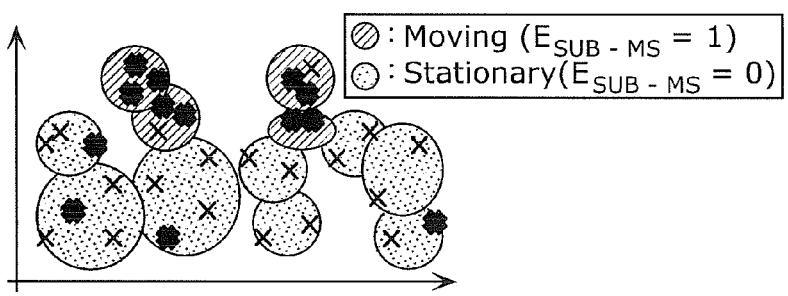
FIG. 19D is a diagram showing a result obtained by evaluating, for each of the subclasses, whether the subclass belongs to a stationary object or a moving object.

To address this, the stationary measure assignment unit 1702 makes an evaluation as to whether the trajectories belong to the stationary object or the moving object on a subclass-by-subclass basis, and accordingly corrects the determination errors, as shown in FIG. 19D.

A subclass is often obtained as a subregion of the moving object or a subregion of the background. More specifically, it can be assumed that the trajectories included in the subclass all belong to the moving object or to the stationary object. Thus, by making the evaluation as to whether the trajectories belong to the stationary object or the moving object on a subclass-by-subclass basis, the stationary measure assignment unit 1702 corrects the aforementioned determination errors made to the trajectories 1901 and 1902 shown in FIG. 19C. Here, an evaluation value indicating a result of the evaluation performed on a subclass-by-subclass basis is referred to as the inter-subclass stillness determination value $E_{SUB-MS}$. Note that the inter-subclass stillness determination value $E_{SUB-MS}$ takes on two values 0 and 1, as with the stillness determination value $E_{ms}$.

Examples of the simplest method of evaluating whether the trajectories belong to the stationary object or the moving object on a subclass-by-subclass basis include a majority method. To be more specific, when the number of trajectories where the stillness determination value $E_{ms}$=1 is greater in the current subclass, the stationary measure assignment unit 1702 makes the evaluation as "moving", that is, determines that the inter-subclass stillness determination value $E_{SUB-MS}$=1 for this subclass. On the other hand, when the number of trajectories determined to belong to the stationary object is greater or when the number of trajectories determined to belong to the stationary object is equal to the number of trajectories determined to belong to the moving object, the stationary measure assignment unit 1702 makes the evaluation as "stationary", that is, determines that the inter-subclass stillness determination value $E_{SUB-MS}$=0 for this subclass. This is expressed by the following Expression 30. Thus, as shown in FIG. 19D, it is determined that the stillness determination value $E_{ms}$=1 for each of the subclasses belonging to the moving object and that the stillness determination value $E_{ms}$=0 for each of the subclasses belonging to the stationary object. In this way, influence of the determination errors can be eliminated.

$$E_{SUB-MS}(\theta i) = \begin{cases} 1 & \text{if } \text{average}(E_{MS}(i)) > 0.5, i \in \theta i \\ 0 & \text{otherwise} \end{cases} \quad \text{Expression 30}$$

Although the inter-subclass stillness determination value $E_{SUB-MS}$ takes the two evaluation values calculated from the stillness determination value $E_{ms}$ taking the two values, the following may be applied.

More specifically, as expressed by Expression 31 below, supposing that the inter-subclass stillness determination value $E_{SUB-MS}$ takes two values, the inter-subclass stillness determination value EsuB-MS is obtained by determining which one of the following is greater: a mean value of stillness evaluation values E taking multiple values; and a predetermined threshold $TH_E$.

$$E_{SUB-MS}(\theta i) = \begin{cases} 1 & \text{if } \text{average}(E(i)) > TH_E, i \in \theta i \\ 0 & \text{otherwise} \end{cases} \quad \text{Expression 31}$$

This can reduce the amount of memory for storing the stillness determination value $E_{ms}$.

Embodiment aims to separate the moving object from the background. In order to perform separation or integration on the subclasses of the moving objects and the subclasses of the background that are close to each other in the higher-dimensional space as shown in FIG. 19B, it is desirable for new inter-subclass distances to be calculated such that the subclasses belonging to the stationary background become closer to each other and that the subclass belonging to the moving object and the subclass belonging to the background become farther away from each other.

Figure 19E:
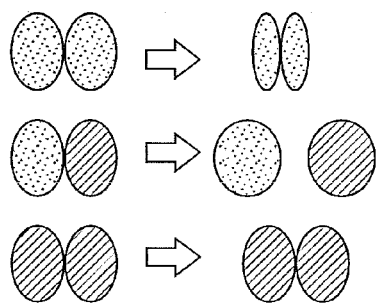
FIG. 19E is a diagram showing a weighting rule.

Hence, the stationary measure assignment unit 1702 sets a weighting rule as shown in FIG. 19E. Then, the stationary measure assignment unit 1702 calculates a weighted geodesic distance $G_w(\theta_i, \theta_j)$ which is a new inter-subclass distance defined between the subclasses $\theta_i$ and $\theta_j$, according to Expressions 32 and 33.

More specifically, when the inter-subclass stillness determination value $E_{SUB-MS}$ is 0 in both of the two subclasses, it is determined that both of these subclasses belong to the stationary object, i.e., to the same stationary background. This means that the distance between these subclasses may be reduced. Thus, the stationary measure assignment unit 1702 assigns a weight W to reduce the representative geodesic distance $G(\theta_i, \theta_j)$ (to bring the subclasses closer to each other). To be more specific, the stationary measure assignment unit 1702 assigns a weight Wmin where W<1.

$$G_w(\theta_i, \theta_j) = W\min \cdot G(\theta_i, \theta_j) < G(\theta_i, \theta_j)$$

When the inter-subclass stillness determination value $E_{SUB-MS}$ is 0 in one of the two subclasses and is 1 in the other, it is likely that these subclasses belong to the background and the moving object, respectively, that is, belong to the different objects. This means that the distance between these subclasses may be increased. Thus, the stationary measure assignment unit 1702 assigns a weight W to increase the representative geodesic distance $G(\theta_i, \theta_j)$ (to bring the subclasses farther away from each other). To be more specific, the stationary measure assignment unit 1702 assigns a weight Wmax where W>1.

$$G_w(\theta_i, \theta_j) = W\max \cdot G(\theta_i, \theta_j) > G(\theta_i, \theta_j)$$

When the inter-subclass stillness determination value $E_{SUB-MS}$ is 1 in both of the two subclasses, these subclasses belong to the moving object. However, unlike the case of the background, whether the two subclasses belong to the same moving object or to the different moving objects cannot be determined only from the inter-subclass stillness determination value $E_{SUB\text{-}MS}$. Thus, no weight is assigned. More specifically, the stationary measure assignment unit 1702 assigns a weight $W_{neu}$ to the representative geodesic distance $G(\theta_i, \theta_j)$ between the subclasses such that $W=1$.

$$G_w(\theta_i,\theta_j)=W_{neu} \cdot G(\theta_i,\theta_j)=G(\theta_i,\theta_j)$$

$$Gw(\theta i,\theta j)=w(\theta i,\theta j)G(\theta i,\theta j) \quad \text{Expression 32}$$

$$w(\theta i, \theta j) = \begin{cases} w\min & \text{if } E_{SUB-MS}(\theta_i) = 0, E_{SUB-MS}(\theta_j) = 0 \\ 1 & \text{if } E_{SUB-MS}(\theta_i) = 1, E_{SUB-MS}(\theta_j) = 1 \\ w\max & \text{otherwise} \end{cases} \quad \text{Expression 33}$$

In order to simplify the description, the inter-subclass stillness determination value $E_{SUB\text{-}MS}$ is used as the evaluation value taking the two values calculated from the stillness determination value $E_{ms}$. However, the inter-subclass stillness determination value $E_{SUB\text{-}MS}$ may take multiple values. For example, the inter-subclass stillness determination value $E_{SUB\text{-}MS}$ may be calculated directly from the stillness evaluation value E according to Expression 34.

$$E_{SUS\text{-}MS}(\theta i)=\text{average}(E(i)) \quad \text{Expression 34}$$

With this, the stillness evaluation value E of the trajectory is reflected and then whether the subclass belongs to the stationary object or the moving object can be accordingly determined.

In this case, Expression 33 defining the weighting rule is changed into Expression 35. To be more specific, when the inter-subclass stillness determination value $E_{SUB\text{-}MS}$ is smaller than or equal to a threshold $Th_{SUB\text{-}MS}$ in both of the two subclasses, the weight Wmin which is assigned in the case where both of the subclasses belong to the stationary object is assigned. When the inter-subclass stillness determination value $E_{SUB\text{-}MS}$ is greater than or equal to the threshold $Th_{SUB\text{-}MS}$ in both of the two subclasses, the weight $W_{neu}$, where $W=1$, is assigned, assuming that both of these subclasses belong to the moving object. Otherwise, the weight Wmax which is assigned in the case where one of the subclasses belongs to the background and the other belongs to the moving object is assigned.

$$w(\theta i, \theta j) = \begin{cases} w\min & \text{if } E_{SUB-MS}(\theta_i)_{SUB-MS} \leq Th_{SUB-MS}, E_{SUB-MS}(\theta_j) \leq Th_{SUB-MS} \\ 1 & \text{if } E_{SUB-MS}(\theta_i) \geq Th_{SUB-MS}, E_{SUB-MS}(\theta_j) \geq Th_{SUB-MS} \\ w\max & \text{otherwise} \end{cases}$$

Expression 35

In order to simplify the description again, the weight $W(\theta_i, \theta_j)$ takes three values which are Wmin, Wmax, and 1. However, the weight $W(\theta_i, \theta_j)$ may take multiple values. Any multiple values may be used as long as, for example: the weight $W(\theta_i, \theta_j)$ approximates to Wmin as each of the inter-subclass stillness determination values $E_{SUB\text{-}MS}(\theta_i)$ and $E_{SUB\text{-}MS}(\theta_j)$ approximates to 0; the weight $W(\theta_i, \theta_j)$ approximates to 1 as each of the inter-subclass stillness determination values $E_{SUB\text{-}MS}(\theta_i)$ and $E_{SUB\text{-}MS}(\theta_j)$ increases; and the weight $W(\theta_i, \theta_j)$ approximates to Wmax as one of the inter-subclass stillness determination values $E_{SUB\text{-}MS}(\theta_i)$ and $E_{SUB\text{-}MS}(\theta_j)$ approximates to 0 and the other increases.

It should be noted that Expression 36 or Expression 37 may be used instead of Expression 35. Expression 36 assigns a weight to reduce the distance between the subclasses when these two classes belong to the stationary object. Expression 37 assigns a weight to increase the distance between the subclasses when one of the two classes belong to the background and the other belongs to the moving object.

$$w(\theta i, \theta j) = \begin{cases} w\min & \text{if } E_{SUB-MS}(\theta_i) = 0, E_{SUB-MS}(\theta_j) = 0 \\ 1 & \text{otherwise} \end{cases} \quad \text{Expression 36}$$

The weight $W(\theta_i, \theta_j)$ in Expression 36 takes two values which are Wmin and 1. However, the weight $W(\theta_i, \theta_j)$ may take multiple values. Any multiple values may be used as long as, for example: the weight $W(\theta_i, \theta_j)$ approximates to Wmin as each of the inter-subclass stillness determination values $E_{SUB\text{-}MS}(\theta_i)$ and $E_{SUB\text{-}MS}(\theta_j)$ approximates to 0; and otherwise, the weight $W(\theta_i, \theta_j)$ approximates to 1.

$$w(\theta i, \theta j) = \begin{cases} w\max & \text{if } E_{SUB-MS}(\theta_i) = 1, E_{SUB-MS}(\theta_j) = 0 \text{ or} \\ & E_{SUB-MS}(\theta_i) = 0, E_{SUB-MS}(\theta_j) = 1 \\ 1 & \text{otherwise} \end{cases} \quad \text{Expression 37}$$

The weight $W(\theta_i, \theta_j)$ in Expression 37 takes two values which are Wmax and 1. However, the weight $W(\theta_i, \theta_j)$ may take multiple values. Any multiple values may be used as long as, for example: the weight $W(\theta_i, \theta_j)$ approximates to Wmax as one of the inter-subclass stillness determination values $E_{SUB\text{-}MS}(\theta_i)$ and $E_{SUB\text{-}MS}(\theta_j)$ approximates to 0 and the other increases; and otherwise, the weight $W(\theta_i, \theta_j)$ approximates to 1.

It should be noted that the values of Wmax and Wmin depend on the magnitude of the camera motion or the speed at which the moving object moves. For example, when the camera moves at a speed of 1 km per hour, Wmax and Wmin may be set at 5 and 0.01, respectively.

Moreover, by changing the weight according to the reliability of the inter-subclass stillness determination values $E_{SUB\text{-}MS}$, the moving object can be separated from the background with more accuracy.

When the reliability of the inter-subclass stillness determination values $E_{SUB\text{-}MS}$ is low, a determination error may be caused and thus a weight in an opposite direction may be assigned to the representative geodesic distance $G(\theta_i, \theta_j)$.

Here, suppose that an epipole error is used as the stationary measure E. For example, particularly when a small moving object is present in a narrow street in front of a vehicle driving straight, a detection error is likely to occur when the moving object present on an epipolar line. On account of this, the reliability of the stationary measure E is low. In such a case, Wmin and Wmax may be set in advance at values closer to 1, such as 0.1 and 2.5, respectively, so that an adverse influence on the weighted geodesic distance $G_w(\theta_i, \theta_j)$ due to the detection error or detection mistake can be reduced.

On the other hand, suppose a case where the reliability of the inter-subclass stillness determination values $E_{SUB\text{-}MS}$ is high (that is, the case where the aforementioned epipole error is used and a small moving object such as a pedestrian is unlikely to appear in front of the vehicle in a roadway like a main street). In this case, the values of Wmin and Wmax may be set at, for example, 0.001 and 10, respectively, so that the values are further away from 1. In particular, when the inter-subclass stillness determination values $E_{SUB-MS}$ is given with complete accuracy, Wmax may be set as Wmax=∞. With this, the moving object can be easily separated from the background.

Figure 19F:
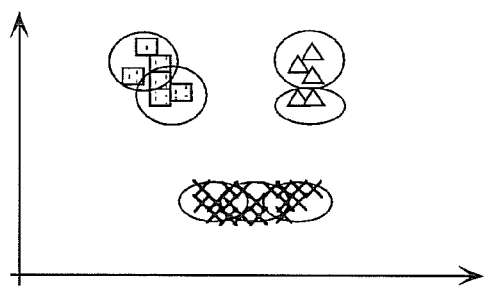
FIG. 19F is a diagram showing, in a higher-dimensional space, weighted geodesic distances calculated according to the weighting rule.

FIG. 19F is a diagram showing, in the higher-dimensional space, the weighted geodesic distances $G_w(\theta_i, \theta_j)$ calculated according to the aforementioned weighting rule. As in FIG. 19B, the higher-dimensional space is illustrated as the two-dimensional space for the sake of convenience.

As compared with the case shown in FIG. 19B, it can be seen that the subclasses belonging to the background are distanced from the subclasses belonging to the moving objects. Thus, it becomes easier to separate the moving objects from the background.

Lastly, in the segmentation step S307, the segmentation unit 107 uses, as segmentation candidates, the plurality of subclasses $\theta_p$ generated by the subclass classification unit 105, where p≤m and m is the number of subclasses. Based on the weighted geodesic distance $G_w(\theta_p, \theta_q)$ between the subclasses calculated by the weighted distance calculation unit 106 as the evaluation value for segmentation of the subclasses $\theta_p$, the segmentation unit 107 determines whether or not to separate the subclasses $\theta_p$ which are the segmentation candidates into different clusters.

Here, the "weighted geodesic distance $G_w(\theta_p, \theta_q)$" has been used thus far as the distance between the subclasses $\theta_p$ and $\theta_q$. In the following, however, the "weighted geodesic distance $G_w(\theta_p, \theta_q)$" is described as an "inter-subclass geodesic distance $h_{p,q}$" for the sake of explanation, where q≤m and m is the number of subclasses.

To be more specific, when the inter-subclass geodesic distance $h_{p,q}$ is greater than or equal to a predetermined threshold Ht, the segmentation unit 107 selects the corresponding subclasses $\theta_p$ and $\theta_q$ as classes adequately distanced from each other and thus determines these subclasses as different classes.

On the other hand, when the inter-subclass geodesic distance $h_{p,q}$ is smaller than the predetermined threshold Ht, the segmentation unit 107 determines the corresponding subclasses $\theta_p$ and $\theta_q$ to belong to the same class. In other words, segmentation is not performed in this case. Then, after determining whether or not to perform segmentation for all the subclasses which are the segmentation candidates, the segmentation unit 107 assigns different labels $\theta_m$ to the trajectories belonging to the different classes and outputs the labels as segmentation information on the trajectories.

Figure 20A:
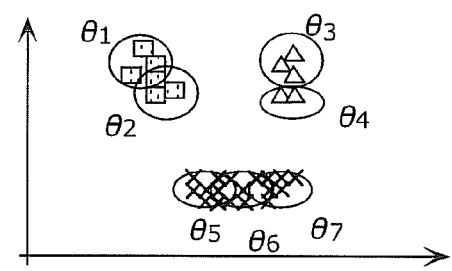
FIG. 20A is a diagram showing trajectories and subclasses in the higher-dimensional space.

For example, suppose that the inter-subclass geodesic distance between seven subclasses shown in FIG. 20A is $h_{p,q}$, where p=0 to 6, q=0 to 6, and m=7. Although the number of subclasses may be more than seven in reality, only seven subclasses are shown for the purpose of making the diagram easy to see.

Note that the inter-subclass geodesic distance between the two subclasses shown in FIG. 20A corresponding to the pedestrian A shown in FIG. 19A is $h_{1,2}$. When $h_{1,2}$≥Ht, the corresponding subclasses $\theta_1$ and $\theta_2$ are separated. When $h_{1,2}$<Ht, the corresponding subclasses $\theta_1$ and $\theta_2$ are integrated.

According to the above procedure, the segmentation unit 107 generates an image from the clusters $\theta_p$ of the trajectories assigned the labels according to the threshold Ht, and then displays the image on the display 120.

The segmentation unit 107 in Embodiment performs image processing on the input picture so that the result of the subclass integration performed on the video sequence received by the image receiving unit 101 can be viewed. Then, the display 120 displays the result.

Figure 20B:
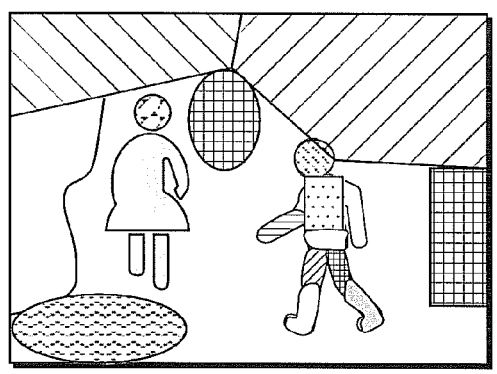
FIG. 20B is a diagram showing a result of the subclass classification.
Figure 20C:
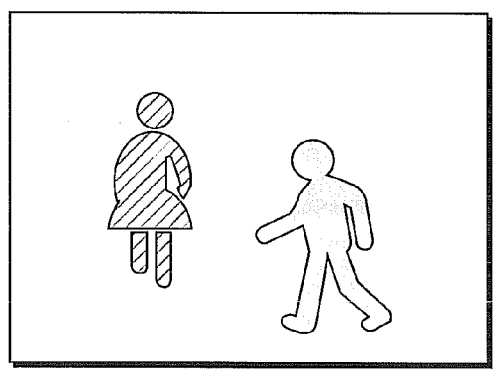
FIG. 20C is a diagram showing an example of how a result of subclass integration is displayed.
Figure 20D:
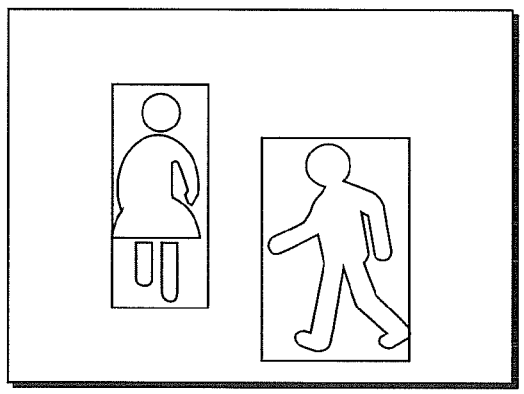
FIG. 20D is a diagram showing an example of how a result of subclass integration is displayed.

FIG. 20B to FIG. 20D shows examples of pictures generated by the segmentation unit 107.

The threshold Ht used by the segmentation unit 107 of the moving object detection apparatus 100 is predetermined in Embodiment. However, the threshold Ht is not limited to this. More specifically, the threshold Ht may be changed according to the magnitude of movement of the moving object on which region extraction is to be performed. Alternatively, the threshold Ht may be changed according to whether the moving object is a pedestrian or a vehicle.

The threshold Ht corresponds to the standard used for evaluating whether two segmentation candidates belong to different regions or the same region. For example, when the two segmentation candidates belong to two different moving objects, the threshold Ht may be set at a small value. As a result, two different regions corresponding to the two segmentation candidates can be extracted even when differences in relative location and movement between the two trajectories are small. On the other hand, the threshold Ht may be set at a great value, so that two different regions corresponding to the two segmentation candidates can be extracted only when differences in relative location and movement between the two trajectories are large. That is, the target for the region extraction can be changed by setting the threshold Ht at a great or small value.

FIG. 20B to FIG. 20D shows examples shown on the display as a result the process described above. When, out of the subclasses calculated by the subclass classification unit 105, a set of subclasses extracted as the same moving object is color-coded as one moving object, the result of the subclass classification as shown in FIG. 20B can be displayed as a result of the class integration as shown in FIG. 20C.

In this example, two moving objects are color-coded by two different colors. With this display manner, the moving object included in the picture can be accurately detected and the result of detection can be displayed in an easy-to-see manner.

In order to view the location of the moving object, at least a rough location of the moving object needs to be presented. Thus, since the entire region does not necessarily need to be color-coded, only an outline box may be displayed as shown in FIG. 20D. Here, as an advantageous effect, the moving object region can be presented almost without changing the appearance of the moving object.

When generating the picture, the segmentation unit 107 draws a pixel at the picture coordinate location of the trajectory using a color corresponding to a segment. However, the method of generating the picture is not limited to this. More specifically, when the number of trajectories is the same as the number of pixels included in the picture, all the pixels in the picture can be drawn in the color corresponding to the class according to the aforementioned method. On the other hand, the number of trajectories is smaller than the number of pixels included in the picture, a pixel that does not correspond to any picture coordinate location of any trajectory exists.

The pixel that does not correspond to the picture coordinate location of the trajectory may be drawn according to a different method. For example, a pixel belonging to a block used in the motion detection to generate a trajectory may be drawn in the same color as the subclass to which the trajectory belongs.

Moreover, the pixel that does not correspond to the picture coordinate location of the trajectory may be drawn in the same color as the subclass to which a nearest trajectory belongs.

Furthermore, the pixel that does not correspond to the picture coordinate location of the trajectory may be drawn according to another method as follows. That is, the picture coordinate locations (i.e., points) of the trajectories are connected according to a Delaunay triangulated-mesh generation method, and a pixel included in a triangle formed by three points belonging to the same class may be drawn in the same color as this class.

It should be noted that, when the process is performed on the video sequence received sequentially, the operation from step S301 to step S307 described above may be performed every time the T number of pictures are received.

As described thus far, the moving object detection apparatus and the moving object detection method in Embodiment determine whether or not a region in a picture belongs to a moving object, based on the representative geodesic distance of trajectories between subclasses in the picture and on the stationary measures of the trajectories included in the subclasses. Then, as a result of temporally tracking the region of the object moving in the picture, the moving object region in the picture can be detected regardless of the posture of the moving object.

In Embodiment, the weight assignment performed on the geodesic distance by the weighted distance calculation unit 106 and the segmentation performed by the segmentation unit 107 are carried out on a subclass-by-subclass basis. However, the segmentation does not necessarily need to be performed on a subclass-by-subclass basis.

More specifically, instead of the weight assignment performed on the representative geodesic distance between the subclasses, the stationary measure assignment unit 1702 of the weighted distance calculation unit 106 may assign, to the geodesic distances of all pairs of trajectories in the subclasses, the same weight assigned to the representative geodesic distance between the subclasses corresponding to the geodesic distances, and calculate the weighted geodesic distances between the trajectories. Moreover, the segmentation unit 107 may perform the segmentation based on the weighted geodesic distances between the trajectories, instead of the weighted geodesic distance Gw. In this case, a process that is the same as that performed by the subclass classification unit 105 or modifications thereof may be performed on the weighted geodesic distances between the trajectories. As a result, the segmentation can be performed on the picture, so that the moving object can be separated from the background.

In particular, the aforementioned weight assignment is performed on the geodesic distance. More specifically, a transformation is performed based on the stationary measures of the trajectories and the distances between the trajectories, so that a ratio of a distance between a trajectory belonging to any stationary object and a trajectory belonging to any moving object to a distance between trajectories both belonging to any stationary object is greater than a ratio obtained before the transformation. Then, the moving object region corresponding to the trajectory belonging to the moving object is detected by separating the trajectory belonging to the moving object from the trajectory belonging to the stationary object.

Thus, a geodesic distance between each pair of trajectories is calculated based on the distance between the trajectories. Then, a weighted geodesic distance is calculated by assigning a weight based on the stationary measures of the trajectories to the calculated geodesic distance, so that a ratio of a geodesic distance between a trajectory belonging to any stationary object and a trajectory belonging to any moving object to a geodesic distance between trajectories both belonging to any stationary object is greater than a ratio obtained before the weight assignment. After this, the moving object region corresponding to the trajectory belonging to the moving object is detected by separating the trajectory belonging to the moving object from the trajectory belonging to the stationary object.

This makes it easy to separate the trajectory on the moving object from the trajectory on the stationary object. Accordingly, even moving objects with changing shape, such as a pedestrian, are in the image, and the image is captured by a moving camera, moving objects can be detected accurately.

Moreover, a target candidate region does not need to be set as preprocessing. Thus, there is no region extraction error that may be caused due to an error in detecting the target candidate region.

Accordingly, clustering is performed based on the geodesic distance between the regions without requiring enormous parameter fittings, so that a moving object that moves with deformation, such as a pedestrian, can be detected from a picture with accuracy.

In the moving object detection apparatus in Embodiment, the distance calculation unit 104 calculates a distance and sends the distance to the weighted distance calculation unit 106. However, note that temporal variation in the distance may be used in place of the distance.

More specifically, the temporal variation in the distance refers to a difference between: a distance calculated from the trajectories between a t frame and a second t frame; and a distance calculated from the trajectories between the second t frame and a third t frame. The same advantageous effect can be achieved when this temporal variation in the distance is used in place of the trajectories of the t frame and the second t frame.

In the moving object detection apparatus in Embodiment, the number of pictures T extracted by the distance calculation unit 104 from the trajectories generated by the trajectory calculation unit 102 is 30, i.e., T=30. However, the number of pictures is not limited to this. For example, a different value may be used according to a type and state of a moving object to be detected. Suppose, for instance, that a detection target can be assumed to be a pedestrian. In this case, since an average human walking cycle is approximately one second (i.e., 30 frames), the trajectories included in the 30 pictures of frames, represented as T=30, correspond to one cycle of human walking. In the case where the detection target is a moving object showing the cyclic change in shape as described, the number of pictures corresponding to the shape-changing cycle of the moving object may be used as the number of pictures T of the trajectories to be extracted by the distance calculation unit 104. With this, the influence of the change of the moving object in shape is small, so that the moving object can be extracted with more accuracy. Moreover, suppose that there is a moving object region where the trajectories in the T pictures cannot be calculated due to the influence of, for example, occlusions. In this case, the maximum number of pictures using which the trajectories can be calculated may be set at S, where S<T. With this, the moving object region can be detected to a higher degree of detail.

In the moving object detection apparatus in Embodiment, the number of pictures T extracted by the distance calculation unit 104 to obtain the trajectories has been described to be predetermined and constant. However, the number of pictures T used may be dynamically changed for each of the trajectories.

As an example of the method for dynamically changing the number of pictures T used to obtain the trajectories, an upper limit of the number of trajectories may be predetermined and the number of pictures T may be dynamically changed so as not to significantly exceed the upper limit. To be more specific, an upper value Nmax of the number of trajectories may be predetermined. Then, when the number of trajectories extracted by the distance calculation unit 104 from the trajectories included in the predetermined number of pictures T exceeds Nmax, the number of pictures T may be increased. Here, when the number of trajectories is great, this means that the trajectories can be calculated since there are many co-located points over all the pictures because, for example: change in the video sequence is small; movement of the object is small; or the number of regions occluded due to movement is small. In such a case, by increasing the number of pictures T, the motion information is more included in the moving object region. Thus, as an advantageous effect, the moving object is expected to be detected with accuracy.

As another example of the method for dynamically changing the number of pictures T used to obtain the trajectories, a lower limit of the number of trajectories may be predetermined and the number of pictures T may be dynamically changed so as not to fall below the lower limit. To be more specific, a lower value Nmin of the number of trajectories may be predetermined. Then, when the number of trajectories extracted by the distance calculation unit 104 from the trajectories included in the predetermined number of pictures T falls below Nmin, a smaller number of pictures T may be used so that the number of trajectories exceeds Nmin. With this process, the number of trajectories is prevented from falling below the predetermined number. With this, even in the case of a video sequence where the number of trajectories is relatively small because of occlusions due to the movement of the object in the video sequence, the number of trajectories is less likely to decrease to an extreme. As a result, as an advantageous effect, a case where segmentation cannot be performed is less likely to occur. In Embodiment, the Euclidean distance is used as the linear distance. However, as mentioned above, the linear distance is not limited to the Euclidean distance. Any embodiment obtained by using any distance measure defined by the aforementioned linear distance is intended to be included in the scope of the present disclosure.

It should be noted that the moving object detection apparatus and the moving object detection method are not limited to the above embodiment. The present disclosure includes other embodiments implemented through various modifications which are conceived by those having skill in the art without departing from the scope of the present disclosure and through a combination of arbitrary components of the above embodiment and the following modifications without departing from the scope of the present disclosure.

[Modification 1]

Next, a moving object detection apparatus in Modification 1 according to Embodiment is described.

The moving object detection apparatus in Modification 1 includes an interface for adjusting the threshold $TH_{MS}$ used when the stillness determination value $E_{ms}$ is calculated.

As described above, the optimum value of the threshold $TH_{MS}$ used when the stillness determination value $E_{ms}$ is calculated depends on the magnitude of the camera motion or the speed at which the moving object moves. For this reason, when a scene to be captured or a camera setting changes, a predetermined fixed threshold $TH_{MS}$ is not optimum in reality. Thus, there may be a case where the moving object cannot be detected with accuracy when the fixed threshold $TH_{MS}$ is used.

In such a case, the user needs to perform the following procedure to obtain the optimum threshold $TH_{MS}$. Firstly, the moving object detection apparatus 100 calculates the inter-subclass stillness determination value $E_{SUB-MS}$ based on the fixed threshold $TH_{MS}$, and performs the processes such as assigning a weight to the inter-subclass distance based on the calculated inter-subclass stillness determination value $E_{SUB-MS}$. Then, the display 120 displays the result of the segmentation. After verifying the displayed result of the segmentation, the user enters the threshold $TH_{MS}$ by trial and error. Following this, the moving object detection apparatus 100 performs segmentation again. Then, the user repeats the process of verifying the displayed result of the segmentation and entering the threshold $TH_{MS}$. In this way, the optimum threshold $TH_{MS}$ needs to be obtained by repeatedly performing the segmentation and entering the threshold $TH_{MS}$ by trial and error.

Here, the threshold $TH_{MS}$ is applied to the value of the stationary measure E. Therefore, it can be considered that the threshold $TH_{MS}$ is greatly dependent on the distribution of the values of the stationary measure. Thus, when the values of the stationary measure E and the distribution of the valued in the current image can be verified, the threshold $TH_{MS}$ can be adjusted without having to perform the segmentation to the end. Accordingly, the optimum can be determined in a shorter time.

Figure 21:
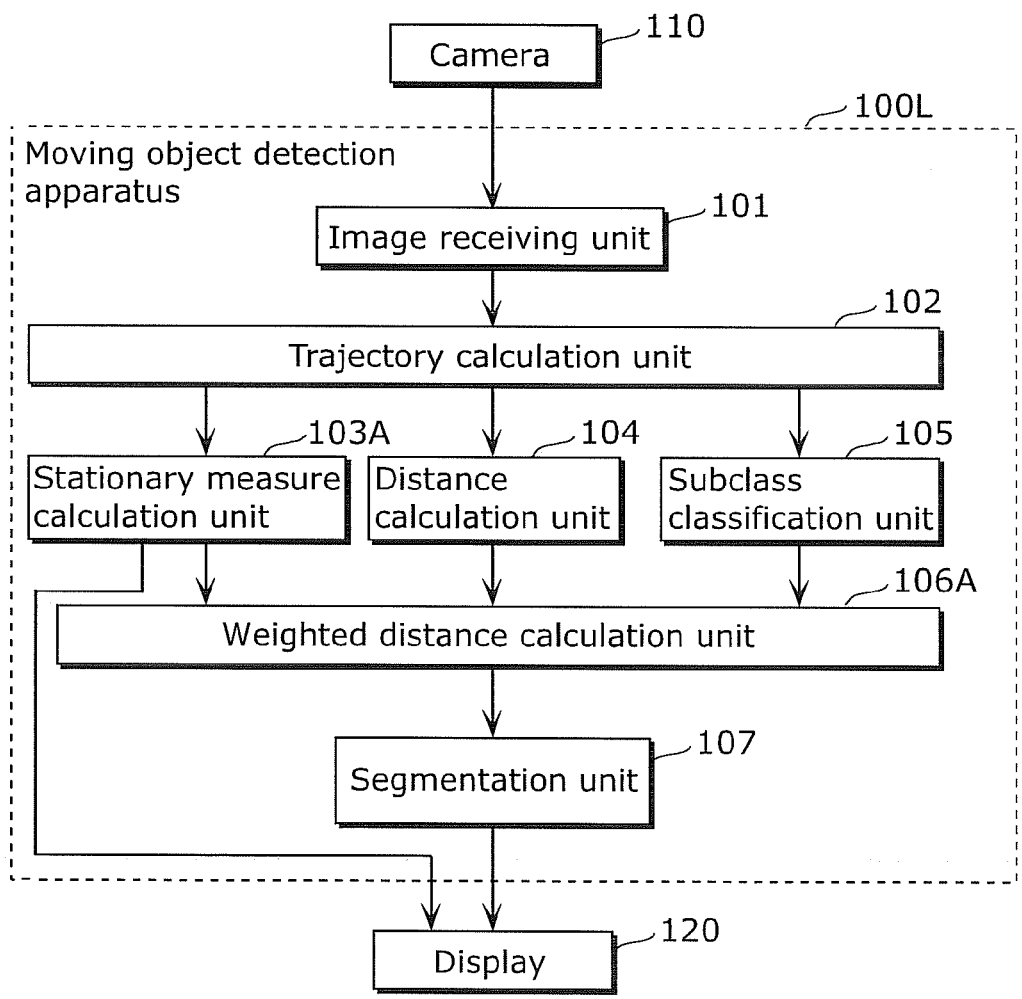
FIG. 21 is a diagram showing a configuration of a moving object detection apparatus in Modification 1 according to Embodiment.

FIG. 21 is a block diagram showing a configuration of a moving object detection apparatus 100L in Modification 1. The moving object detection apparatus 100L uses a stationary measure calculation unit 103A and a weighted distance calculation unit 106A in place of the stationary measure calculation unit 103 and the weighted distance calculation unit 106 included in the moving object detection apparatus 100 shown in FIG. 1.

The following mainly describes points different from those in Embodiment described above, and thus omits points identical to those in Embodiment.

Figure 22:
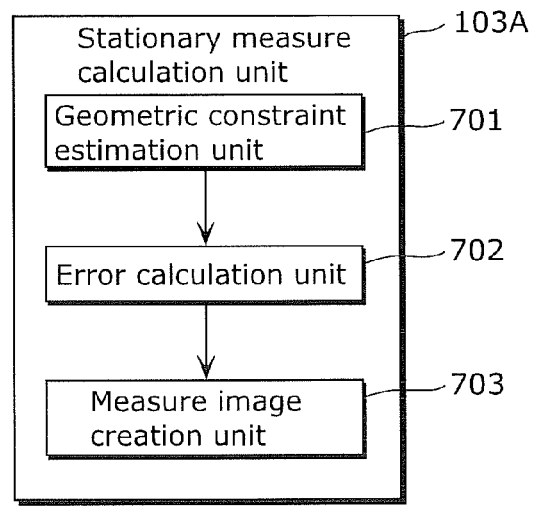
FIG. 22 is a diagram showing a configuration of a stationary measure calculation unit included in the moving object detection apparatus.

FIG. 22 is a block diagram showing a detailed configuration of the stationary measure calculation unit 103A.

The stationary measure calculation unit 103A includes a measure image creation unit 703 in addition to the configuration of the stationary measure calculation unit 103 shown in FIG. 7. The measure image creation unit 703 causes the display 120 to display each of the blocks included in the current picture in a display manner corresponding to the value of the calculated stationary measure. A process executed by the measure image creation unit 703 is described in detail later.

Figure 23:
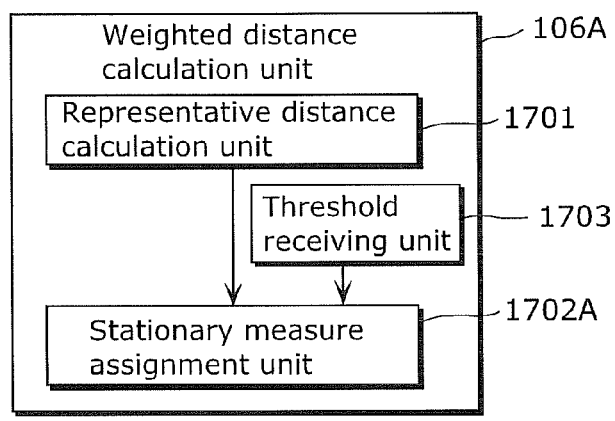
FIG. 23 is a diagram showing a detailed configuration of a weighted distance calculation unit.

FIG. 23 is a block diagram showing a detailed configuration of the weighted distance calculation unit 106A.

The weighted distance calculation unit 106A includes a threshold receiving unit 1703 in addition to the configuration of the weighted distance calculation unit 106 shown in FIG. 17, and uses a stationary measure assignment unit 1702A in place of the stationary measure assignment unit 1702 of the weighted distance calculation unit 106. The threshold receiving unit 1703 is a processing unit which receives a stationary measure threshold entered by the user, and may be configured with, for example, a keyboard and a mouse. The stationary measure assignment unit 1702A calculates a stationary measure according to the same method as that used by the stationary measure assignment unit 1702, and assigns a weight to the representative geodesic distance between the subclasses based on the stationary measure. Note that the threshold $TH_{MS}$ used here for the stationary measure is received by the threshold receiving unit 1703, and this is different from the case of using the stationary measure assignment unit 1702.

Figure 24:
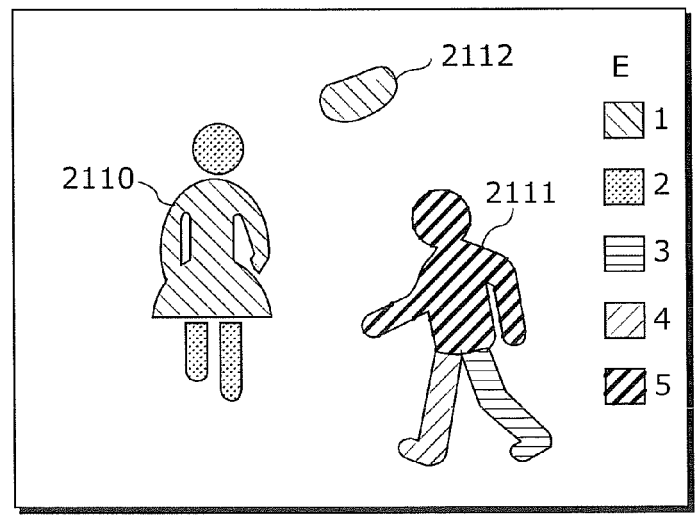
FIG. 24 is a diagram showing an example of an image created by a stationary measure image creation unit of the stationary measure calculation unit.

FIG. 24 is a diagram showing an example of an image created by the measure image creation unit 703 of the stationary measure calculation unit 103A. For example, the measure image creation unit 703 classifies the values of the stationary measure E into five levels, and displays, on the display 120, an image where hatching is performed for each of the blocks corresponding to the level of the stationary measure E. It should be noted that the measure image creation unit 703 may display, on the display 120, a color gradation corresponding to the values of the stationary measure E. Moreover, the measure image creation unit 703 may include a threshold receiving unit, and display the values of the stationary measure E in binary based on a threshold separately entered by the user using the threshold receiving unit. For example, a pixel having the stationary measure E greater than the threshold entered by the user may be displayed in red, and a pixel having the stationary measure E other than this may be displayed in blue. With this, when a certain threshold is actually entered, a determination of the threshold is made while easily viewing the stillness determination values $E_{ms}$.

Figure 25A:
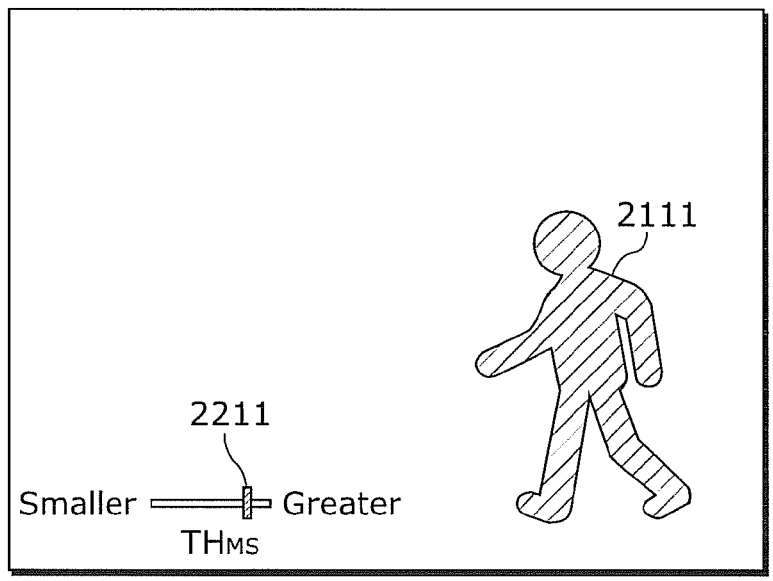
FIG. 25A is a diagram showing an example of how a result of segmentation is displayed.
Figure 25B:
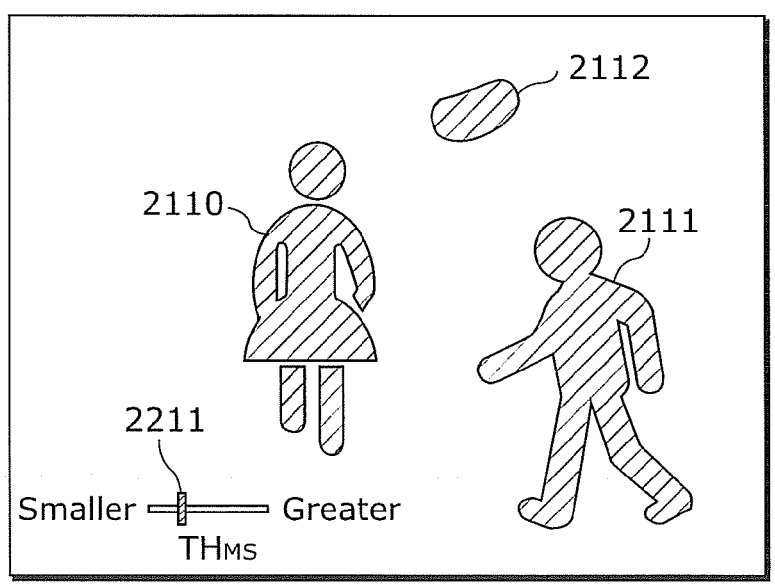
FIG. 25B is a diagram showing an example of how a result of segmentation is displayed.

Moreover, the threshold receiving unit 1703 receives the threshold $TH_{MS}$ entered by the user at any timing. The stationary measure assignment unit 1702A calculates the stillness determination value $E_{MS}$ using the received threshold $TH_{MS}$. Then, the segmentation unit 107 performs segmentation, and the result of the segmentation is shown on the display 120. For example, as shown in FIG. 25A, the display 120 shows a slider 2211. By moving the slider 2211 to the right or left, the user enters the threshold $TH_{MS}$. When the threshold $TH_{MS}$ is set at a great value as shown in FIG. 25A, a region of a moving object 2111 having a great value as the stationary measure E is extracted, for example. When the threshold $TH_{MS}$ is set at a small value by moving the slider 2211 to the left, regions of a moving object 2110 and a noise 2112 each having a small value as the stationary measure E are extracted in addition to the moving object 2111 having the great value as the stationary measure E. In this way, the user can determine the threshold $TH_{MS}$, by changing the threshold $TH_{MS}$ using the slider 2211 and easily viewing the result of the segmentation.

Accordingly, whenever the scene and the camera setting are changed, the optimum threshold determined by the user can be readily used as a parameter of the moving object detection apparatus.

[Modification 2]

Next, a moving object detection apparatus in Modification 2 according to Embodiment is described.

In the moving object detection apparatus 100 in Embodiment described above, the subclass classification unit 105 calculates the subclasses based on the Euclidean distance f (i, j) calculated according to Expression 14. However, the operation performed by the subclass classification unit 105 is not limited to this. More specifically, the subclass classification unit 105 may classify the plurality of trajectories into the plurality of subclasses based on color similarity between the blocks included in the trajectories. The following describes an example where clustering is performed on the trajectories on the basis of color similarity between pixels.

Figure 26A:
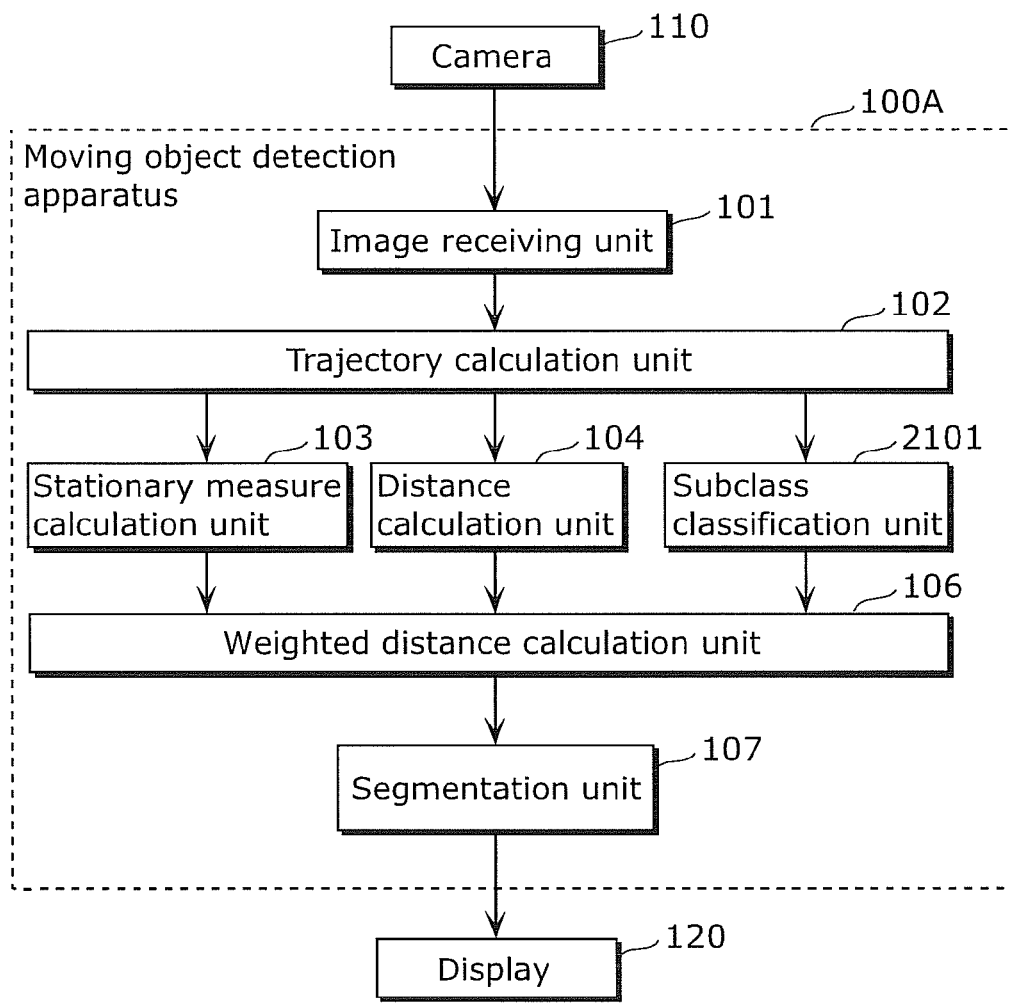
FIG. 26A is a diagram showing a configuration of a moving object detection apparatus in Modification 2 according to Embodiment.

FIG. 26A is a diagram showing a configuration of a moving object detection apparatus 100A in Modification 2 according to Embodiment. As shown in FIG. 26A, the moving object detection apparatus 100A includes an image receiving unit 101, a trajectory calculation unit 102, a stationary measure calculation unit 103, a distance calculation unit 104, a subclass classification unit 2101, a weighted distance calculation unit 106, and a segmentation unit 107.

The processing units other than the subclass classification unit 2101 are the same as those described in Embodiment and, therefore, the explanations are not repeated here.

Instead of the method for calculating the subclasses by labeling the similar trajectories as described above in Embodiment, the subclass classification unit 2101 may employ a method whereby a picture is segmented into a plurality of subclasses or so-called "superpixels" on the basis of color similarity between pixels. A superpixel can be calculated according to a graph-based method, for example. Details of the procedure are disclosed in Non Patent Literature 7, for example, and therefore a detailed explanation is omitted here. By estimating a boundary between regions based on a picture in a graph-based expression, the picture is segmented into sub-regions while efficient and global characteristics of the picture are maintained. As an advantageous effect, this method is robust to occlusions, thereby achieving more robust segmentation.

Non Patent Literature 7: Pedro F. Felzenszwalb and Daniel P. Huttenlocher, "Efficient Graph-Based Image Segmentation", International Journal of Computer Vision, Vol. 59, No. 2, pp. 167 to 181, September 2004.

Figure 26B:
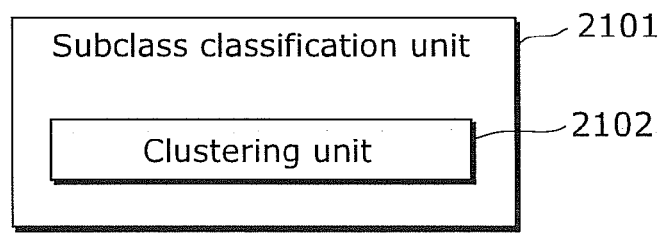
FIG. 26B is a diagram showing a configuration of a subclass classification unit.

FIG. 26B is a diagram showing a configuration of the subclass classification unit 2101 in Modification 2 according to Embodiment. The subclass classification unit 2101 includes a clustering unit 2102. The clustering unit 2102 divides a picture into a plurality of subclasses on the basis of the aforementioned color similarity. As compared with the configuration of the subclass classification unit 105 shown in FIG. 15, the configuration of the subclass classification unit 2101 in Modification 2 does not require a Euclidean distance calculation unit. Therefore, with a simpler configuration, the picture can be divided into the subclasses at a high speed. Moreover, especially in a scene where a moving object and a background are different in color, it is likely that each of the subclasses belongs only to the moving object or to the background (meaning that the moving object and the background are likely to be classified into different subclasses when their colors are different). On this account, the inter-subclass stillness determination value $E_{SUB-MS}$ on a subclass-by-subclass basis can be calculated with more accuracy.

According to the procedure described thus far, the picture is divided into the subclasses and the trajectories belonging to the corresponding subclasses can be used for detecting the moving object region.

[Modification 3]

Next, a moving object detection apparatus in Modification 3 according to Embodiment is described.

In the moving object detection apparatus 100 in Embodiment described above, the subclass classification unit 105 calculates the subclasses based on the Euclidean distance f (i, j) calculated according to Expression 14. However, the operation performed by the subclass classification unit 105 is not limited to this. The following describes an example where subclass classification is performed by executing dimensionality reduction on the geodesic distance g (i, j).

Figure 27A:
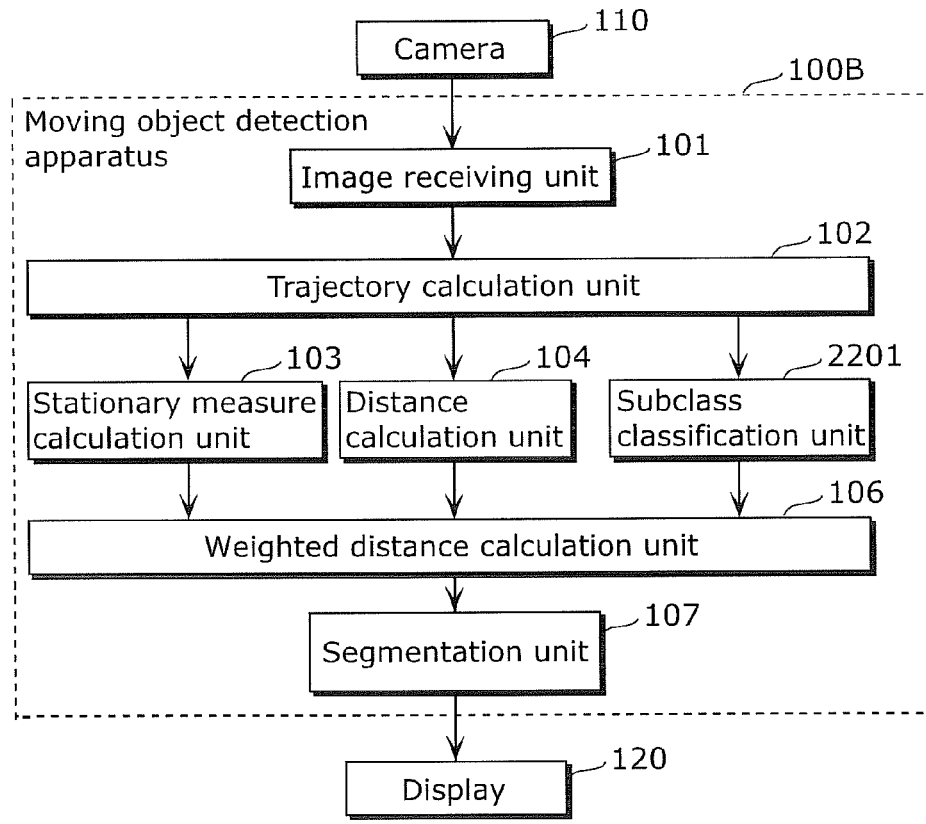
FIG. 27A is a diagram showing a configuration of a moving object detection apparatus in Modification 3 according to Embodiment.

FIG. 27A is a diagram showing a configuration of a moving object detection apparatus 100B in Modification 3 according to Embodiment. As shown in FIG. 27A, the moving object detection apparatus 100B includes an image receiving unit 101, a trajectory calculation unit 102, a stationary measure calculation unit 103, a distance calculation unit 104, a subclass classification unit 2201, a weighted distance calculation unit 106, and a segmentation unit 107.

The processing units other than the subclass classification unit 2201 are the same as those described in Embodiment and, therefore, the explanations are not repeated here.

Figure 27B:
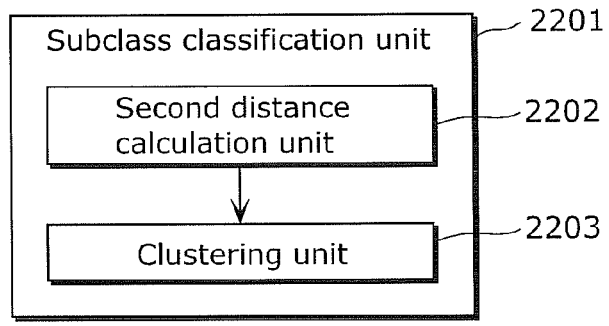
FIG. 27B is a diagram showing a configuration of a subclass classification unit.

FIG. 27B is a diagram showing a configuration of the subclass classification unit 2201 in Modification 3 according to Embodiment. The subclass classification unit 2201 includes a second distance calculation unit 2202 and a clustering unit 2203. The configuration of the subclass classification unit 2201 is different from that of the subclass classification unit 105 shown in FIG. 15 in that the second distance calculation unit 2202 is included in place of the Euclidean distance calculation unit 1501. The second distance calculation unit 2202 calculates the Euclidean distance f (i, j) from the trajectories calculated by the trajectory calculation unit 102, according to Expression 14. Then, the second distance calculation unit 2202 calculates the geodesic distance g (i, j) according to Expressions 17 and 18. Here, an operation performed to calculate the geodesic distance g (i, j) is the same as that performed by the distance calculation unit 104 as described in Embodiment and, therefore, the explanation is not repeated here.

Following this, after performing dimensionality reduction on the calculated geodesic distance g (i, j), the clustering unit 2203 performs clustering on the trajectories using the lower-dimensional geodesic distance so that a within-class variance is minimum with the number of classes being given.

The dimensionality reduction can be achieved by obtaining an eigensystem after performing Young-Householder transformation. With the reduction in the dimension, data distributed in the multidimensional space is efficiently projected onto a lower-dimensional space. The following describes a procedure whereby the clustering unit 2203 performs dimensional reduction on the geodesic distance g (i, j) to execute clustering on the trajectories.

Suppose that a matrix formed by the geodesic distances g (i, j) is referred to as a geodesic distance matrix G expressed by Expression 38.

$$G = \{g(i,j)\} \qquad \text{Expression 38}$$

The clustering unit 2203 performs Young-Householder transformation, by which a centered matrix "H" is multiplied from both sides, on the geodesic distance matrix G. This transformation is performed so as to transform an inter-point distance matrix into a distance matrix in barycentric coordinates.

$$\tau(G) = \frac{HG^{(2)}H}{2} \qquad \text{Expression 39}$$

Here, "H" represents a centered matrix and is expressed as follows.

$$H_{ij} = (I - 1/NS) \qquad \text{Expression 40}$$

Here, "I" represents a unit matrix and "N" represents the number of trajectories.

Also, the following expression is formulated.

$$G^{(2)} = \{g(i,j)^2\} \qquad \text{Expression 41}$$

Next, in order to perform dimensionality reduction, the clustering unit 2203 calculates a "P" number of eigenvectors $e_p$ of $\tau(G)$ and eigenvalues $\lambda p$ corresponding to the eigenvectors $e_p$. Suppose that the following expression is formulated.

$$g^i = (g(i,1), g(i,2), \ldots, g(i,N_S)) \qquad \text{Expression 42}$$

In this case, a result of projecting "$g^i$" onto the lower-dimensional space can be represented as data "$z_p^i$" as follows.

$$z_p^i = \sqrt{\lambda_p} e_p^i \qquad \text{Expression 43}$$

Note that "$e_p^i$" represents the i-th element of the p-th eigenvector $e_p$. Also note that "P" representing the number of eigenvectors may be determined empirically according to a scene used, or may be determined based on a contribution ratio "$a_p$" calculated from the eigenvalues $\lambda_p$ as follows.

$$a_p = \frac{\sum_{p=1}^{P} \lambda_p}{\sum_{p=1}^{N} \lambda_p} \qquad \text{Expression 44}$$

Here, P represents the number of eigenvectors to be used, that is, the number of dimensions in the lower-dimensional space, and N represents the total number of eigenvectors. Thus, P obtained when the contribution ratio $a_p$ is greater than or equal to a fixed value may be set as the number of eigenvectors.

In this way, the clustering unit 2203 performs the dimensionality reduction on the geodesic distance g (i, j) by the processes executed according to Expressions 39 to 44. The geodesic distance $g^i$ calculated by the second distance calculation unit 2202 and corresponding virtual trajectories can be associated with the data $z_p^i$ provided by the eigenvector $e_p$ in the lower-dimensional space.

Figure 28A:
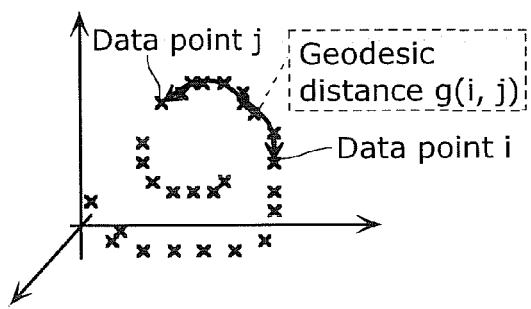
FIG. 28A is a diagram showing, in a multidimensional space, a data distribution of trajectories before dimensionality reduction is performed.
Figure 28B:
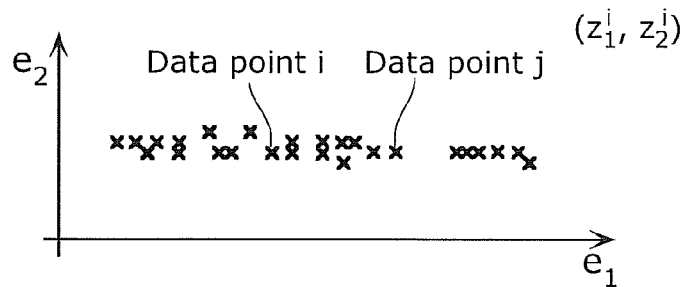
FIG. 28B is a diagram showing a space obtained by performing dimensionality reduction on the multidimensional space of the trajectories shown in FIG. 28A.

The following describes a process whereby, in the case where an image of a pedestrian is received, a temporal trajectory of a pixel i is projected in the space obtained through the nonlinear dimensionality reduction, with reference to FIG. 28A to FIG. 28D. FIG. 28A is a diagram showing, in a multidimensional space, a data distribution of the trajectories before dimensionality reduction. This diagram shows the multidimensional space in the three-dimensional space in order to simplify the explanation. However, the elements of the vector represented by Expression 2 correspond to the dimensions in reality. FIG. 28B is a diagram showing a space obtained by performing dimensionality reduction on the multidimensional space of the trajectories shown in FIG. 28A. The horizontal and vertical axes in FIG. 28B indicate the eigenvectors $e_1$ and $e_2$, respectively. A dot indicated as ($z_1^i$, $z_2^i$) projected onto a two-dimensional space is a result of projecting $g^i$. Here, the data $z_p^i$ in the nonlinear space has a one-to-one correspondence with the temporal trajectory $x^i$ corresponding to the pixel i in the picture. On account of this, the dot indicated as ($z_1^i$, $z_2^i$) can be considered to correspond to the trajectory of the pixel i. In Modification 3, the number of dimensions in the nonlinear space is two in order to visualize the result. However, as described earlier, the number of dimensions does not necessarily need to be two, and the data can be projected with higher accuracy when the number of dimensions is greater.

Next, the clustering unit 2203 performs clustering on the data $z_p^i$ obtained as a result of the dimensionality reduction performed on the trajectories shown in FIG. 28B. Accordingly, clustering is performed on the trajectories. Note that Modification 3 employs a clustering method whereby a within-class variance is minimum with the number of classes being given.

Firstly, a subclass is expressed as follows.

$$\theta = \{\theta_1, \ldots \theta_m, \ldots \theta_M\} \qquad \text{Expression 45}$$

Here, "M" represents the number of subclasses and is determined empirically according to a scene to be used.

Each subclass $\theta_m$ is expressed by a parameter below and a parameter $Z_m$.

$$\overline{z_m}$$

Here, $$\overline{z_m}$$

represents a mean value of coordinate values of data belonging to the subclass $\theta_m$ in the lower-dimensional space, and the parameter $Z_m$ represents a covariance matrix related to the coordinate values of data belonging to the subclass $\theta_m$.

Note that an initial value of $$\overline{z_m}$$

may be determined on a random basis. Alternatively, the nonlinear lower-dimensional space may be evenly divided into a grid, and coordinate values at an intersection point may be set as the initial value.

Note that the parameter below and the parameter $Z_m$ can be expressed by Expression 46 and Expression 47, respectively.

$$\overline{z_m}$$

$$\overline{z_m} = \begin{bmatrix} \overline{z_1^m} \\ \vdots \\ \overline{z_P^m} \end{bmatrix} \quad \text{Expression 46}$$

$$Z_m = \frac{1}{C_m} \sum_{c_m=1}^{C_m} \begin{bmatrix} z_1^{c_m} - \overline{z_1^m} \\ \vdots \\ z_P^{c_m} - \overline{z_P^m} \end{bmatrix} [z_1^{c_m} - \overline{z_1^m} \quad \ldots \quad z_P^{c_m} - \overline{z_P^m}] \quad \text{Expression 47}$$

Here, "$C_m$" represents the number of data pieces belonging to the subclass $\theta_m$ in the nonlinear lower-dimensional space.

Next, a specific clustering method is described. Firstly, the subclass $\theta_m$ to which the data $z_i$ belongs is calculated using a distance function of Expression 48.

$$\psi_m(z_i) = \phi_m(z_i) + \ln|Z_m| - \ln p(z_i) \quad \text{Expression 48}$$

Here, "$\psi_m(z_i)$" represents a distance between the data $z_i$ corresponding to the trajectory of the pixel i and the corresponding subclass $\theta_m$. Each of the data pieces belong to the subclass $\theta_m$, where $\psi_m(z_i)$ is at the minimum value. Note that "$\phi_m(zi)$" represents a Mahalanobis distance and is expressed as follows.

$$\phi_m(z_i) = (z_i - \overline{z_m})^t Z_m^{-1}(z_i - \overline{z_m}) \quad \text{Expression 49}$$

Note here that $\phi_m(zi)$ may be used in place of $\psi_m(z_i)$.

Moreover, "$p(z_i)$" is a prior probability of zi in a framework based on a likelihood function. Thus, "$p(z_i)$" may be set as a constant value. Or, when it is known in advance that a target scene includes a predetermined object, such as a person, "$p(z_i)$" may be set in advance based on the shapes or area ratios of body parts. This is effective especially when the data $z_i$ is biased in density. For example, when it is known in advance that the density of the data $z_i$ is high and it is desired for the dense data $z_i$ to be classified into one subclass, the corresponding prior probability $p(z_i)$ may be set at a greater value. On the other hand, when it is desired for the data $z_i$ to be classified into different subclasses in a more detailed manner, the corresponding prior probability $p(z_i)$ may be set at a smaller value. Here, the density of the data $z_i$ may be obtained in the image space or in the nonlinear lower-dimensional space.

Next, based on the result of calculating Expression 48, the parameter of the subclass $\theta_m$ expressed as below and the parameter $Z_m$ are updated as follows using the data $z_i$ belonging to the subclass $\theta_m$.

$$\overline{z_m}$$

$$\overline{z_m} = \frac{\sum_{c_m=1}^{C_m} \omega_{c_m} z_{c_m}}{\sum_{c_m=1}^{C_m} \omega_{c_m}} \quad \text{Expression 50}$$

$$Z_m = \frac{\sum_{c_{mk}=1}^{C_m} \omega_{c_m}^2 (z_{c_m} - \overline{z_m})(z_{c_m} - \overline{z_m})^t}{\sum_{c_m=1}^{C_m} \omega_{c_m}^2} \quad \text{Expression 51}$$

Figure 28C:
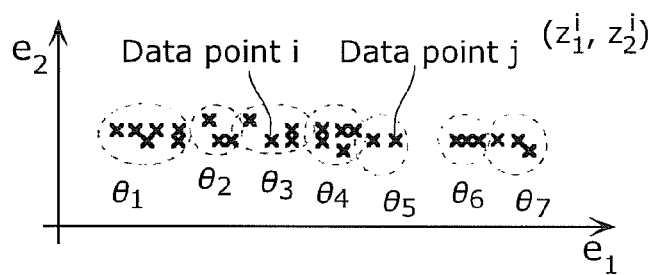
FIG. 28C is a diagram showing a result of applying clustering to the lower-dimensional data.

Here, "$z_{c_m}$" represents the data belonging to the subclass $\theta_m$ in the nonlinear lower-dimensional space. Moreover, "$\omega$" represents a weighting factor of the subclass $\theta_m$, and may be set to be equal to 1 or adjusted according to a difference from the mean value of the input data. In this way, the subclass $\theta_m$ to which the data in the nonlinear lower-dimensional space belongs can be obtained, by repeating the distance calculation and parameter update according to Expressions 48 to 51 a specified number of times. In addition to the above process, a different clustering method, such as the k-means clustering algorithm or a competitive learning algorithm, may be employed. FIG. 28C shows a result of above clustering process applied to the data in the low-dimensional representation as shown in FIG. 28B. It can be seen that the data points are classified into the subclasses.

Figure 28D:
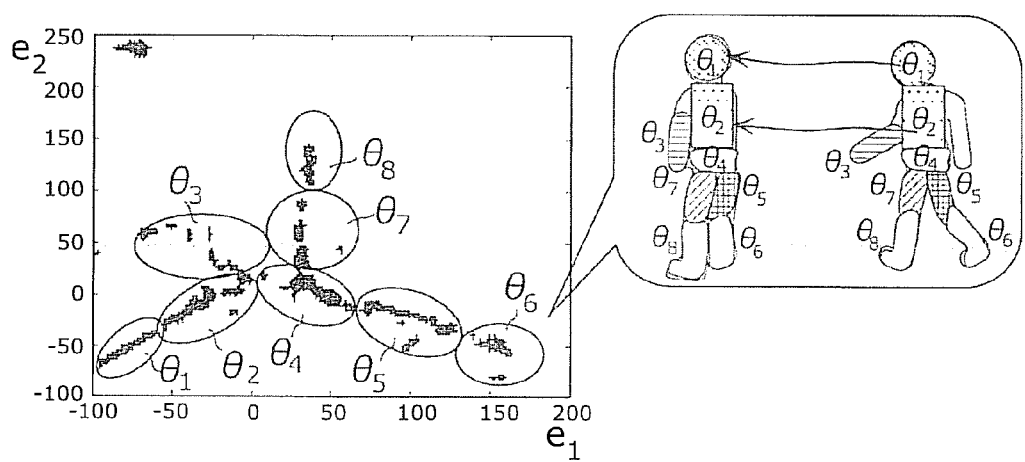
FIG. 28D is a diagram showing an example of clustering performed on data on a moving pedestrian in a nonlinear space.

FIG. 28D shows an example where clustering is performed on image data on a moving pedestrian similarly in the nonlinear space. Note that the corresponding regions of the pedestrian are shown along with a diagram showing a distribution of lower-dimensional data. The correspondences of the subclasses $\theta_1$ and $\theta_2$ in the nonlinear lower-dimensional space are as follows. In the picture, the subclass $\theta_1$ corresponds to the head region of the pedestrian and the subclass $\theta_2$ corresponds to the torso region. In this way, each of the subclasses corresponds to a part of the body of the pedestrian.

Here, each of the parts of the body corresponds to a subclass in the nonlinear lower-dimensional space. This is obtained as a result of tracking pixels over temporally-consecutive pictures. More specifically, as a result of performing clustering in the nonlinear lower-dimensional space and temporally tracking the regions of the moving object in the image sequence, an image region can be extracted for each of moving objects included in the image sequence.

According to Modification 3, with dimensionality reduction, clustering is performed in the nonlinear space without requiring enormous parameter fittings. As a result, clustering can be performed with stability especially even when the pictures include a moving object, such as a pedestrian, that moves with deformation. This can achieve an effect of calculating the stationary measure $E_{SUB-MS}$ on a subclass-by-subclass basis with more accuracy.

In Embodiment, the Euclidean distance is used as the linear distance connecting the two points. However, as mentioned above, the linear distance is not limited to the Euclidean distance. Any embodiment obtained by using any distance measure defined by the aforementioned linear distance is intended to be included in the scope of the present disclosure.

[Modification 4]

Next, a moving object detection apparatus in Modification 4 according to Embodiment is described.

In the moving object detection apparatus 100 in Embodiment described above, the subclass classification unit 105 calculates the subclasses based on the Euclidean distance f (i, j). However, the operation performed by the subclass classification unit 105 is not limited to this. The following describes an example where subclass candidates are generated by generating a plurality of geodesic distances and then subclass classification is performed by selecting a subclass from among the subclass candidates.

Figure 29A:
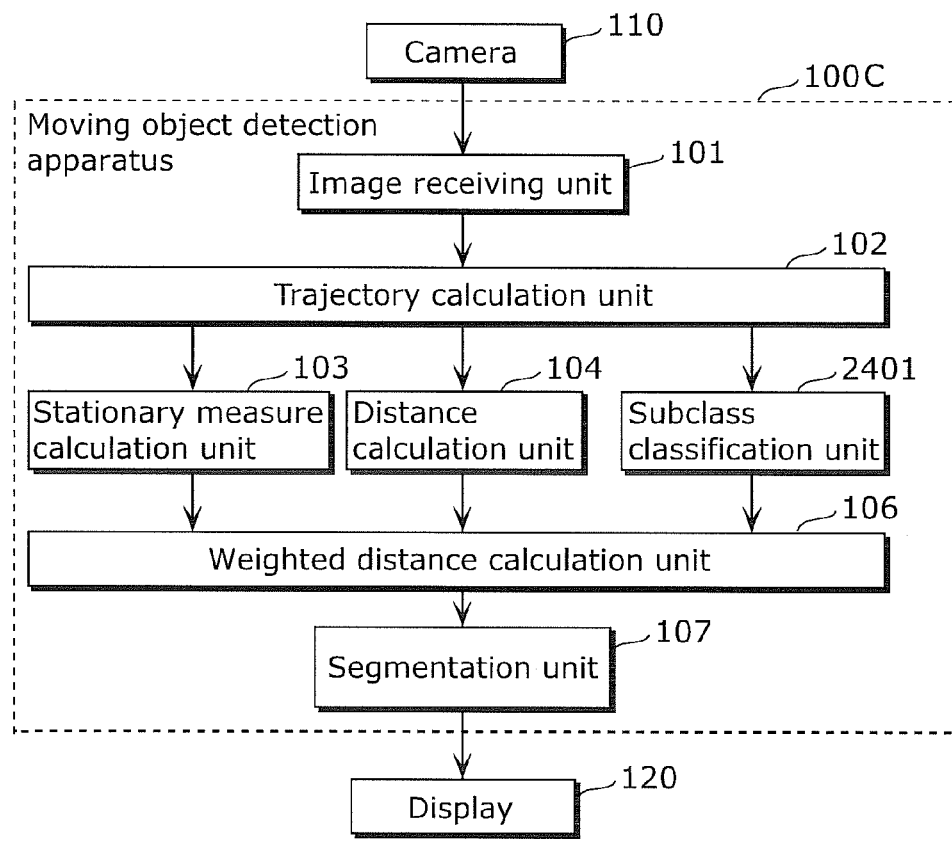
FIG. 29A is a diagram showing a configuration of a moving object detection apparatus in Modification 4 according to Embodiment.

FIG. 29A is a diagram showing a configuration of a moving object detection apparatus 100C in Modification 4 according to Embodiment. As shown in FIG. 29A, the moving object detection apparatus 100C includes an image receiving unit 101, a trajectory calculation unit 102, a stationary measure calculation unit 103, a distance calculation unit 104, a subclass classification unit 2401, a weighted distance calculation unit 106, and a segmentation unit 107.

Figure 29B:
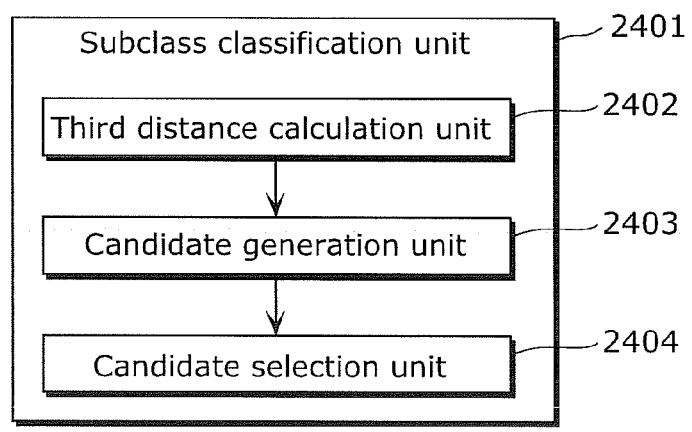
FIG. 29B is a diagram showing a configuration of a subclass classification unit.

The processing units other than the subclass classification unit 2401 are the same as those described in Embodiment and, therefore, the explanations are not repeated here. FIG. 29B is a diagram showing a configuration of the subclass classification unit 2401 in Modification 4 according to Embodiment.

The subclass classification unit 2401 classifies each of the trajectories into one of the subclasses as follows. That is, the subclass classification unit 2401 obtains the geodesic distance by calculating a shortest path from the trajectory to another trajectory after (i) selecting a distance smaller than or equal to a predetermined distance threshold from among the distances between the trajectory to the other trajectory and (ii) performing nonlinear processing to change an unselected distance into an infinite distance, and then classifies, into one subclass, a set of trajectories between each pair of which the geodesic distance is finite.

The subclass classification unit 2401 includes a third distance calculation unit 2402, a candidate generation unit 2403, and a candidate selection unit 2404.

The third distance calculation unit 2402 in the subclass classification unit 2401 firstly calculates the Euclidean distance f (i, j) from the trajectories calculated by the trajectory calculation unit 102. Then, the third distance calculation unit 2402 sets criteria, or thresholds, and performs geodesic distance transformation on the calculated distance matrix to obtain the geodesic distance g (i, j). Next, the candidate generation unit 2403 detects, using a threshold, a discontinuous point in the distribution of distances each between the trajectories, and then performs clustering on continuously distributed trajectories so that the trajectories separated by a geodesic distance shorter than or equal to a length of the detected discontinuous point are classified into one cluster. As a result, the candidate generation unit 2403 generates subclass candidates for each of the thresholds. Lastly, the candidate selection unit 2404: obtains an instruction regarding the number of classes; selects a candidate having the number of regions close to the obtained number of classes, from among the candidates generated by the candidate generation unit 2403; and then outputs the selected subclass candidate as a result of the subclass classification performed on the trajectories calculated by the trajectory calculation unit 102. More specifically, the candidate selection unit 2404 selects a clustering result that indicates the number of regions closest to the predetermined number of classes, from among the candidates generated by the candidate generation unit 2403 for each of the thresholds.

The following describes an operation performed by the subclass classification unit 2401.

Firstly, the third distance calculation unit 2402 calculates the Euclidean distance f (i, j). This procedure is the same as that performed by the Euclidean distance calculation unit 1501 in Embodiment described above and, therefore, the explanation is omitted here. The third distance calculation unit 2402 determines a K number of thresholds $R_k$ for the calculated Euclidean distance f (i, j). Then, the third distance calculation unit 2402 performs nonlinear processing on each of the determined thresholds $R_k$ and calculates $g^k$ (i, j) which is a geodesic distance corresponding to the threshold $R_k$. An operation to calculate the geodesic distance $g^k$ (i, j) corresponding to the threshold $R_k$ is the same as that performed by the distance calculation unit 104 in Embodiment described above and, therefore, the explanation is omitted here.

Figure 30A:
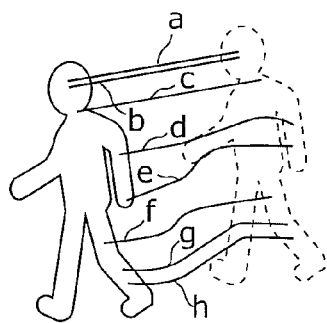
FIG. 30A is a diagram showing examples of trajectories.
Figure 30B:
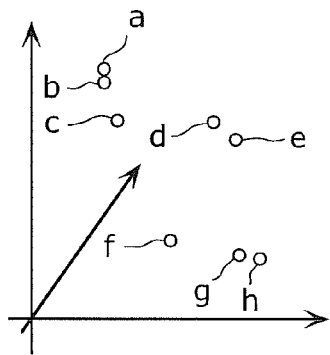
FIG. 30B is a diagram showing a multidimensional space including the trajectories.

Next, the candidate generation unit 2403 generates the subclass candidates by detecting a discontinuous point using the geodesic distance matrix $g^k$ (i, j) corresponding to the threshold $R_k$. More specifically, the candidate generation unit 2403 determines that the discontinuous point is located at a position where $g^k$ (i, j) becomes infinite between the trajectories "i" and "j". This procedure is explained with reference to FIG. 30A to FIG. 30E. FIG. 30A is a diagram showing trajectories "a" to "h", and FIG. 30B is a conceptual diagram showing a multidimensional space including the trajectories "a" to "h".

Figure 30C:
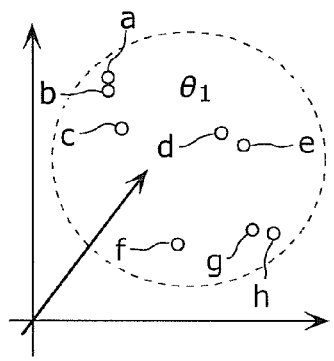
FIG. 30C is a diagram showing a result of clustering in the case where a threshold is larger than a maximum value of a Euclidean distance.

When the threshold $R_k$ is a sufficiently great value, that is, when the threshold $R_k$ is greater than the maximum value of the Euclidean distance f (i, j), for example, the geodesic distance $g^k$ (i, j) corresponding to each pair of the moving trajectories i and j does not become infinite. Therefore, as shown in FIG. 30C, the number of subclasses is one since no discontinuous point is present. On the other hand, when the threshold $R_k$ is a sufficiently small value, that is, when the threshold $R_k$ is smaller than the minimum value of the Euclidean distance f (i, j), for example, the geodesic distance $g^k$ (i, j) corresponding to each pair of the moving trajectories "i" and "j" becomes infinite. Therefore, the number of subclasses is equal to the number of trajectories. In this case, it is efficient to set the value of the threshold $R_k$ between the maximum and minimum values of f (i, j) and to perform subclass classification. Each of FIG. 30D and FIG. 30E shows an example where the threshold determined in this way is applied.

Figure 30D:
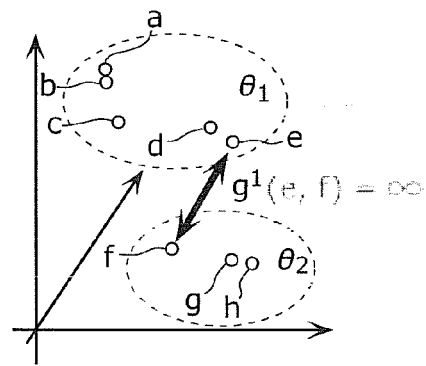
FIG. 30D is a diagram showing a result of clustering performed in the case of a threshold $R_1$.
Figure 30E:
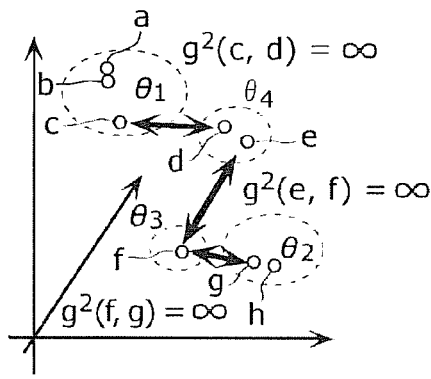
FIG. 30E is a diagram showing a result of clustering performed in the case of a threshold $R_2$ smaller than the threshold $R_1$.

When $R_1$ is set as the threshold, the geodesic distance $g^1$ (e, f) becomes infinite as shown in FIG. 30D. Accordingly, the candidate generation unit 2403 determines that a discontinuous point is between the trajectories "e" and "f". Thus, the geodesic distances between each of the trajectories "a" to "d" and the trajectory e do not cross the discontinuous point and thus are not transformed into infinite distances. On the other hand, each geodesic distance between one of the trajectories "f" to "h" and one of the trajectories "a" to "e" crosses the discontinuous point $g^1$ (e, f) and thus is transformed into an infinite distance. To be more specific, if the geodesic distance between the trajectories "i" and "j" is not transformed into an infinite distance, the pair of trajectories "i" and "j" belongs to the same subclass. If the geodesic distance between the trajectories "i" and "j" is transformed into an infinite distance, these trajectories "i" and "j" belong to different subclasses. Therefore, as shown in FIG. 30D, the data points are classified into two subclasses $\theta_1$ and $\theta_2$. Moreover, FIG. 30E shows an example of that the threshold $R_2$, which is smaller than $R_1$, is applied. In this case, the candidate generation unit 2403 determines that discontinuous points are between the trajectories "c" and "d", between the trajectories "e" and "f", and between the trajectories "f" and "g". Thus, as in the case shown in FIG.

30D, the trajectories are classified on the basis of whether or not the geodesic distance is infinite and are accordingly classified into four subclasses $\theta_1$, $\theta_2$, $\theta_3$, and $\theta_4$.

With the processing described thus far, the candidate generation unit 2403 can determine that the pair of trajectories not having an infinite geodesic distance according to the thresholds $R_k$ is continuous and thus classified into the same subclass. Moreover, the candidate generation unit 2403 can determine that the pair of trajectories having an infinite geodesic distance is discontinuous, and can generate the plurality of subclass candidates based on the discontinuous point.

Next, the candidate selection unit 2404 selects, as the final result, the subclass candidate that indicates the number of classes closest to a predetermined number of classes, from among the subclass candidates generated by the candidate generation unit 2403. In the case shown in FIG. 30A to FIG. 30E, when the number of classes M is set at 4, the subclass candidates obtained when the threshold is $R_2$ (as shown in FIG. 30E) are selected. When the number of classes M is set at 2, the subclass candidates obtained when the threshold is $R_1$ (as shown in FIG. 30D) are selected. Accordingly, the subclass classification is performed on the trajectories so that the number of subclasses is close to the specified number. Here, the number of classes is set at 2 and 4 in this example. However, it is desired for the number of subclasses to be greater in reality, and any number can be determined empirically or according to a scene to be used.

Modification 4 allows the subclass classification to be performed in consideration of the pixel location and motion similarity, by using the Euclidean distance and the geodesic distance. The specific examples shown in FIG. 30A to FIG. 30E are explained. When M=2, the regions corresponding to the upper and lower bodies can be classified into different subclasses because of a significant difference in movement between the lower and upper bodies. Moreover, when M=4, the regions corresponding to the head, arm, thigh, and lower leg can be classified into different subclasses, which are more than those in the case where M=2, because of differences in movement between the head and the arm and between the thigh and the lower leg.

It should be noted that any number of thresholds $R_k$ may be prepared. Here, suppose that there is no result indicating the number of subclasses equal to the predetermined number of classes. In such a case: the result indicating the number closest to the predetermined number may be selected; the result indicating the number smaller than and closest to the predetermined number may be selected; or the result indicating the number greater than and closest to the predetermined number may be selected.

As described thus far, the subclass candidates are generated based on the discontinuous points calculated using the geodesic distances for each of the thresholds, and then the result indicating the number of subclasses closest to the specified number of classes is selected. In this way, the subclass classification can be implemented.

[Modification 5]

Next, a moving object detection apparatus in Modification 5 according to Embodiment is described.

In the moving object detection apparatus 100 in Embodiment described above, the subclass classification unit 105 calculates the subclasses based on the Euclidean distance f(i, j) calculated according to Expression 14. However, the operation performed by the subclass classification unit 105 is not limited to this. To be more specific, although the Euclidean distance calculation unit 1501 of the subclass classification unit 105 calculates the Euclidean distance, the distance calculation unit 104 also calculates the Euclidean distance. On account of this, in Modification 5, the distance calculation performed by the subclass classification unit is omitted and subclass classification is performed using the distance calculated by the distance calculation unit 104.

Figure 31A:
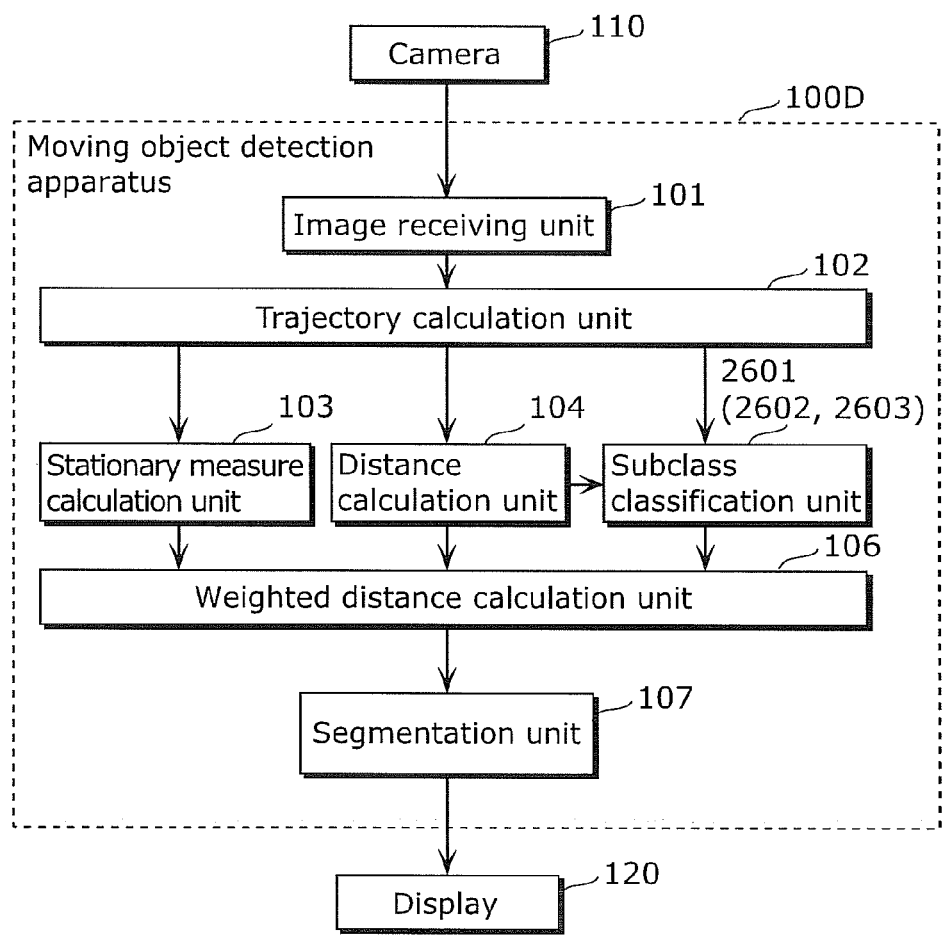
FIG. 31A is a diagram showing a configuration of a moving object detection apparatus in Modification 5 according to Embodiment.

FIG. 31A is a diagram showing a configuration of a moving object detection apparatus 100D in Modification 5 according to Embodiment. As shown in FIG. 31A, the moving object detection apparatus 100D includes an image receiving unit 101, a trajectory calculation unit 102, a stationary measure calculation unit 103, a distance calculation unit 104, a subclass classification unit 2601, a weighted distance calculation unit 106, and a segmentation unit 107. It should be noted that a subclass classification unit 2602 or a subclass classification unit 2603 may be used in place of the subclass classification unit 2601.

The processing units other than the subclass classification units 2601, 2602, and 2603 are the same as those described in Embodiment and, therefore, the explanations are not repeated here.

Figure 31B:
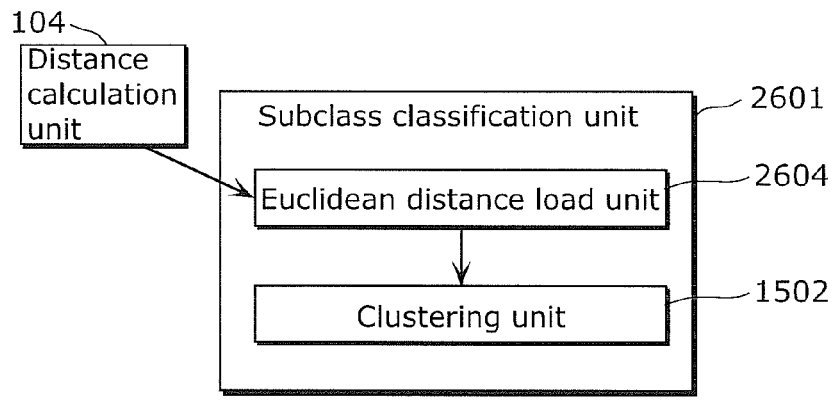
FIG. 31B is a diagram showing a configuration of a subclass classification unit.
Figure 31C:
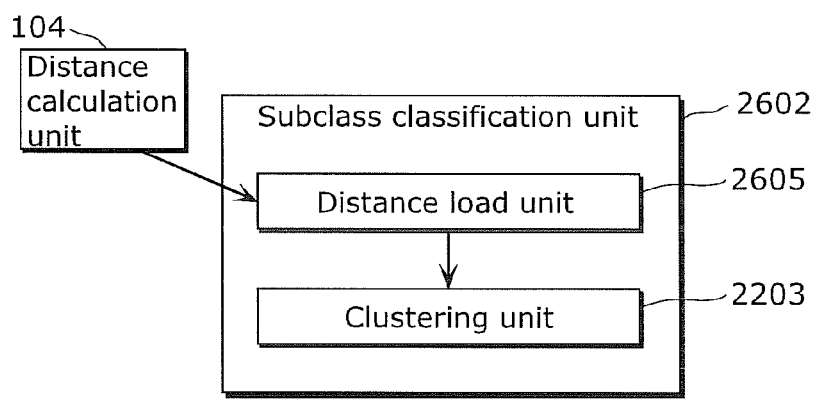
FIG. 31C is a diagram showing another configuration of the subclass classification unit.
Figure 31D:
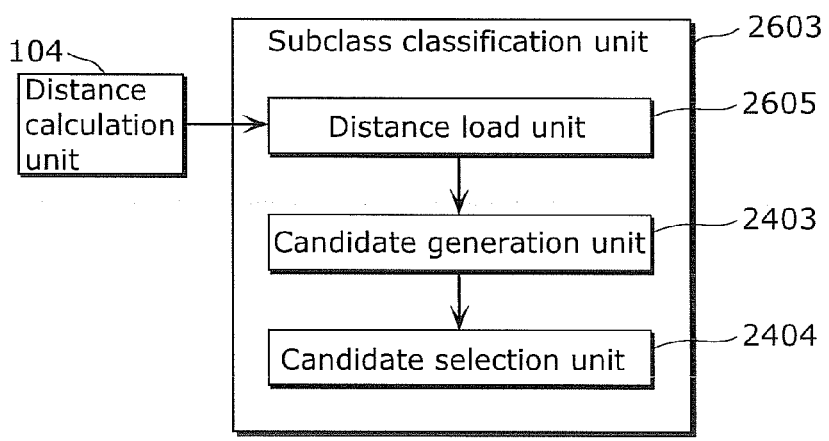
FIG. 31D is a diagram showing another configuration of the subclass classification unit.

FIG. 31B to FIG. 31D show configurations of the subclass classification unit 2601 to 2603, respectively. These configurations correspond to Embodiment, Modification 3 of Embodiment, and Modification 4 of Embodiment, respectively. Each of the configurations is described as follows.

The subclass classification unit 2601 shown in FIG. 31B includes a Euclidean distance load unit 2604 and a clustering unit 1502. An operation performed by the clustering unit 1502 is the same as that performed by the clustering unit 1502 shown in FIG. 15 and, therefore, the explanation is omitted here.

With this configuration, the Euclidean distance calculation unit 1201 included in the distance calculation unit 104 stores in advance the calculated Euclidean distance f (i, j) into a memory (not illustrated), and the Euclidean distance load unit 2604 included in the subclass classification unit 2601 loads, from the memory, the stored Euclidean distance f (i, j). The clustering unit 1502 performs clustering on the trajectories using the Euclidean distance f (i, j) loaded from the memory by the Euclidean distance load unit 2604. This can save the trouble of newly calculating the Euclidean distance, thereby implementing higher-speed processing.

The subclass classification unit 2602 shown in FIG. 31C includes a distance load unit 2605 and a clustering unit 2203. An operation performed by the clustering unit 2203 is the same as that performed by the clustering unit 2203 shown in FIG. 27B in Modification 3 and therefore, the explanation is omitted here.

With this configuration, the Euclidean distance calculation unit 1201 and the geodesic distance calculation unit 1202 included in the distance calculation unit 104 store in advance the calculated Euclidean distance f (i, j) and the geodesic distance g (i, j), respectively, into a memory (not illustrated). Then, the distance load unit 2605 included in the subclass classification unit 2602 loads, from the memory, the stored Euclidean distance f(i, j) and the stored geodesic distance g (i, j). The clustering unit 2203 performs clustering on the trajectories using the Euclidean distance f (i, j) and the geodesic distance g (i, j) loaded from the memory by the distance load unit 2605. This can save the trouble of newly calculating the Euclidean distance and the geodesic distance, thereby implementing higher-speed processing.

The subclass classification unit 2603 shown in FIG. 31D includes a distance load unit 2605, a candidate generation unit 2403, and a candidate selection unit 2404. Operations performed by the candidate generation unit 2403 and the candidate selection unit 2404 are respectively the same as those performed by the candidate generation unit 2403 and the candidate selection unit 2404 shown in FIG. 29B in Modification 4. Therefore, the explanation is omitted here.

With this configuration, the Euclidean distance calculation unit 1201 and the geodesic distance calculation unit 1202 included in the distance calculation unit 104 store in advance the calculated Euclidean distance f (i, j) and the geodesic distance g (i, j), respectively, into a memory (not illustrated). Then, the distance load unit 2605 included in the subclass classification unit 2603 loads, from the memory, the stored Euclidean distance f (i, j) and the stored geodesic distance g (i, j). The candidate generation unit 2403 performs clustering, together with the candidate selection unit 2404, on the trajectories using the Euclidean distance f (i, j) and the geodesic distance g (i, j) loaded from the memory by the distance load unit 2605. This can save the trouble of newly calculating the Euclidean distance and the geodesic distance, thereby implementing higher-speed processing.

[Modification 6]

Next, a moving object detection apparatus in Modification 6 according to Embodiment is described.

In the moving object detection apparatus 100 in Embodiment described above, the geometric constraint estimation unit 701 included in the stationary measure calculation unit 103 obtains the geometric constraint based on the trajectories calculated by the trajectory calculation unit 102.

However, the operation performed by the stationary measure calculation unit 103 is not limited to this. To be more specific, the stationary measure calculation unit 103 may estimate the geometric constraint using trajectories different from the trajectories calculated by the trajectory calculation unit 102. The trajectories to be used here are separately obtained from the video sequence received as an input by the image receiving unit 101.

The following describes an example where the trajectories used for geometric constraint estimation are separately calculated.

Figure 32A:
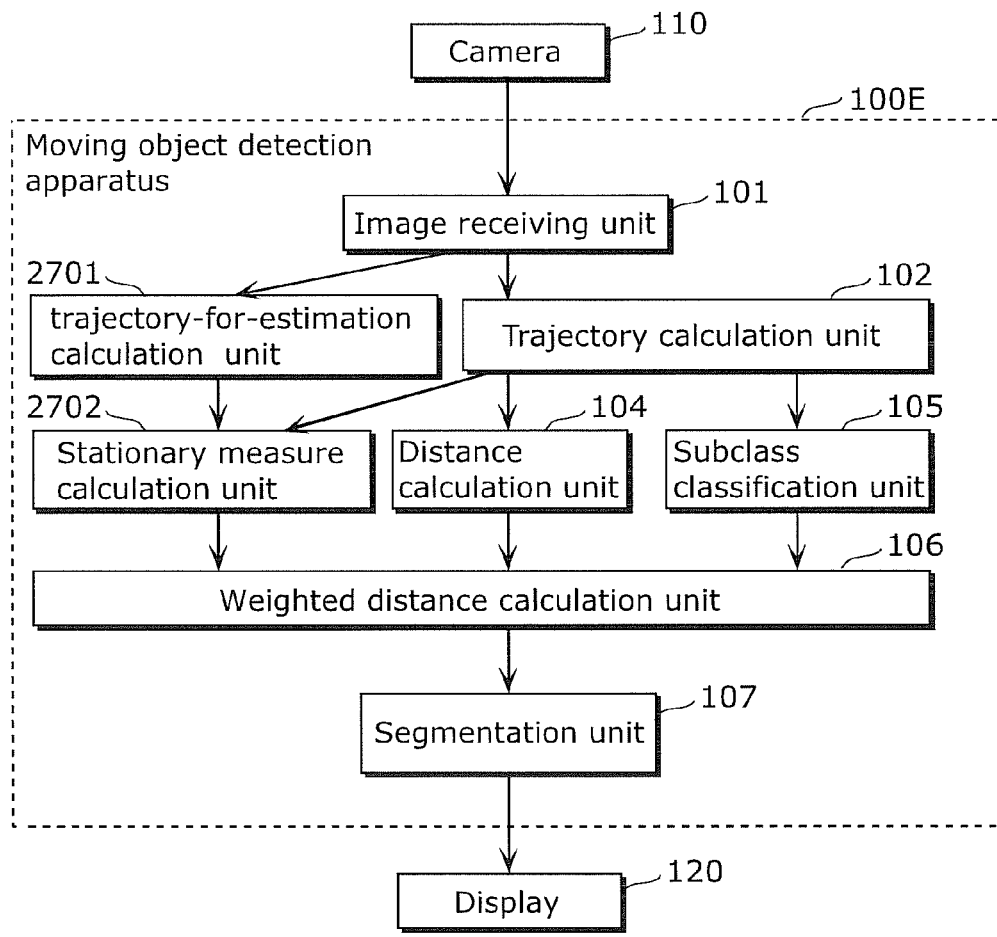
FIG. 32A is a diagram showing a configuration of a moving object detection apparatus in Modification 6 according to Embodiment.

FIG. 32A is a diagram showing a configuration of a moving object detection apparatus 100E in Modification 6 according to Embodiment.

As shown in FIG. 32A, the moving object detection apparatus 100E includes an image receiving unit 101, a trajectory calculation unit 102, a trajectory-for-estimation calculation unit 2701, a stationary measure calculation unit 2702, a distance calculation unit 104, a subclass classification unit 105, a weighted distance calculation unit 106, and a segmentation unit 107.

The processing units other than the trajectory-for-estimation calculation unit 2701 and the stationary measure calculation unit 2702 are the same as those described in Embodiment and, therefore, the explanations are not repeated here.

Figure 32B:
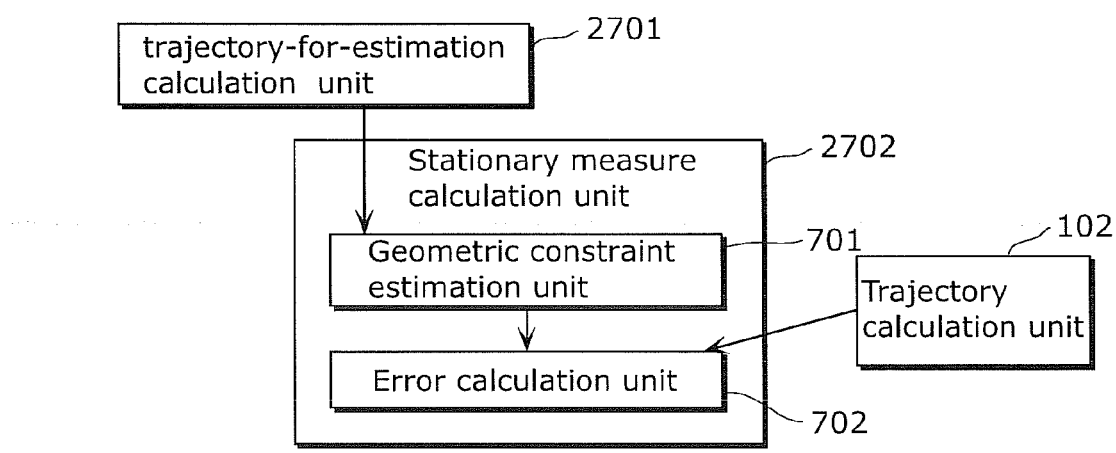
FIG. 32B is a diagram showing a configuration of a stationary measure calculation unit.

FIG. 32B is a diagram showing a configuration of the stationary measure calculation unit 2702. The following is a description including a procedure performed by the trajectory-for-estimation calculation unit 2701.

Concerning the aforementioned estimation of the geometric constraint, it is known that the estimation stability and the estimation result are dependent on the accuracy of the co-located points extracted from the trajectories. In other words, a more accurate geometric constraint can be obtained using data including as few errors as possible instead of data including many errors. The present inventors also have experimentally confirmed the degradation in the estimation stability and the estimation result when the accuracy of the co-located points is low. In general, a method of obtaining sparse co-located points, such as the KLT method or the Lucas-Kanade (LK) method, has a disadvantage that the obtained points are sparse. However, with this method, accurate co-located points can be obtained.

In order to perform subclass classification on the trajectories with accuracy, it is desired for the subclass classification unit 105 to obtain the trajectories that are as uniform and dense as possible on the image. For this reason, it is considered that the aforementioned sparse co-located points should not be used by the subclass classification unit 105.

Accordingly, in Modification 6, the sparse and accurate co-located points separately obtained are used only for estimating a more accurate geometric constraint. Examples of the method for obtaining the sparse co-located points include a KLT tracker.

The KLT tracker calculates similarity between images according to Expression 52 below. Note that: "p" represents a pixel location indicated as (u, v); "z" represents an amount of movement between pixels of co-located points indicated as (u, v); and "e" represents an error component to be minimized.

$$e = \int\int_{w} [J(p+z) - I(p)]^2 \, du \qquad \text{Expression 52}$$

By solving "z" minimizing a solution of Expression 52, the amount of movement "z" can be obtained. Since the method for obtaining the co-located points is described in more detail in Non Patent Literature 8, further detailed explanation is omitted here.

Non Patent Literature 8: "An Implementation of the Kanade-Lucas-Tomasi Feature Tracker", http://www.ces.clemson.edu/~stb/klt/, 2006

As shown in FIG. 32B, the stationary measure calculation unit 2702 includes a geometric constraint estimation unit 701 and an error calculation unit 702. Operations performed by the geometric constraint estimation unit 701 and the error calculation unit 702 are respectively the same as those performed by the geometric constraint estimation unit 701 and the error calculation unit 702 shown in FIG. 7. Therefore, the explanation is omitted here.

The geometric constraint estimation unit 701 of the stationary measure calculation unit 2702 receives, as an input, the trajectories calculated by the trajectory-for-estimation calculation unit 2701, and then estimates the geometric constraint. Following this, the error calculation unit 702 applies the geometric constraint estimated by the geometric constraint estimation unit 701 to the trajectories calculated by the trajectory calculation unit 102 to calculate the stationary measure E for each of the trajectories. Using the stationary measures calculated in the above procedure, the processes are executed by the weighted distance calculation unit 106 and the subsequent units.

With this configuration, since the geometric constraint can be obtained with more stability and more accuracy. This allows the moving object to be detected with more stability and more accuracy. Therefore, the reliability of the stationary measure E is increased and, as a result, the stationary measure $E_{SUB-MS}$ can be calculated on a subclass-by-subclass basis with more accuracy.

[Modification 7]

Next, a moving object detection apparatus in Modification 7 according to Embodiment is described.

In the moving object detection apparatus 100 in Embodiment described above, the weighted distance calculation unit 106 calculates the inter-subclass geodesic distance by performing weight assignment, based on the geodesic distance g (i, j) calculated by the distance calculation unit 104 and the stationary measure E calculated by the stationary measure calculation unit 103. However, the operations performed by the distance calculation unit 104 and the weighted distance calculation unit 106 are not limited to these. To be more specific, the distance calculation unit 104 may calculate the Euclidean distance between the trajectories. Moreover, the weighted distance calculation unit 106 may: calculate the Euclidean distance between the subclasses; determine whether or not the subclass belongs to the stationary object or the moving object based on the stationary measures of the trajectories included in the subclass; assign a weight to the inter-subclass Euclidean distance based on a result of the determination; and finally calculate the inter-subclass geodesic distance from the inter-subclass Euclidean distance.

An operation performed in Modification 7 is described, with reference to FIG. 33A to FIG. 33D.

Figure 33A:
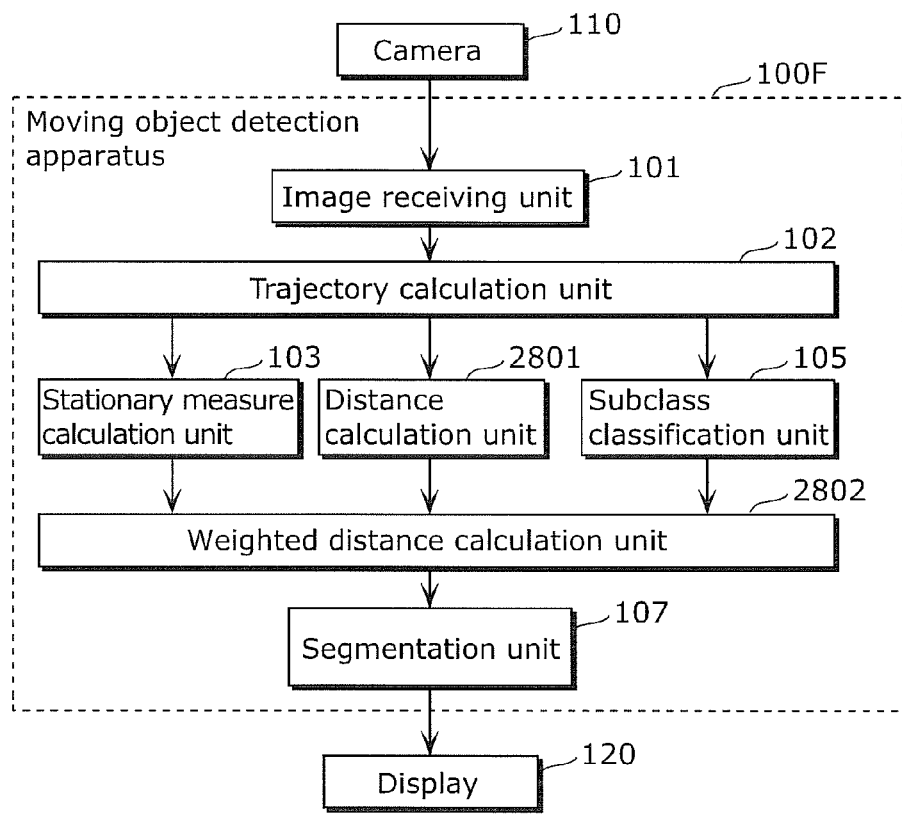
FIG. 33A is a diagram showing a configuration of a moving object detection apparatus in Modification 7 according to Embodiment.

FIG. 33A is a diagram showing a configuration of a moving object detection apparatus 100F in Modification 7 according to Embodiment. As shown in FIG. 33A, the moving object detection apparatus 100F includes an image receiving unit 101, a trajectory calculation unit 102, a stationary measure calculation unit 103, a distance calculation unit 2801, a subclass classification unit 105, a weighted distance calculation unit 2802, and a segmentation unit 107.

The processing units other than the distance calculation unit 2801 and the weighted distance calculation unit 2802 are the same as those described in Embodiment and, therefore, the explanations are not repeated here.

Figure 33B:
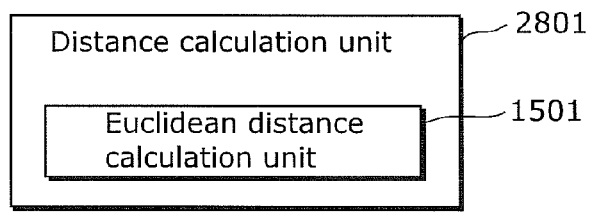
FIG. 33B is a diagram showing a configuration of a distance calculation unit.

The distance calculation unit 2801 calculates the Euclidean distance between the trajectories. FIG. 33B is a diagram showing a configuration of the distance calculation unit 2801. The distance calculation unit 2801 includes a Euclidean distance calculation unit 1501. An operation performed by the Euclidean distance calculation unit 1501 is the same as that performed by the Euclidean distance calculation unit 1501 shown in FIG. 15 and, therefore, the explanation is omitted here.

The weighted distance calculation unit 2802 calculates a weighted Euclidean distance by assigning a weight based on the stationary measures of the trajectories to the Euclidean distance calculated by the distance calculation unit 2801, so that a ratio of a Euclidean distance between a trajectory belonging to any stationary object and a trajectory belonging to any moving object to a Euclidean distance between trajectories both belonging to any stationary object is greater than a ratio obtained before the weight assignment. Then, the weighted distance calculation unit 2802 calculates the weighted geodesic distance from the calculated weighted Euclidean distance.

Figure 33C:
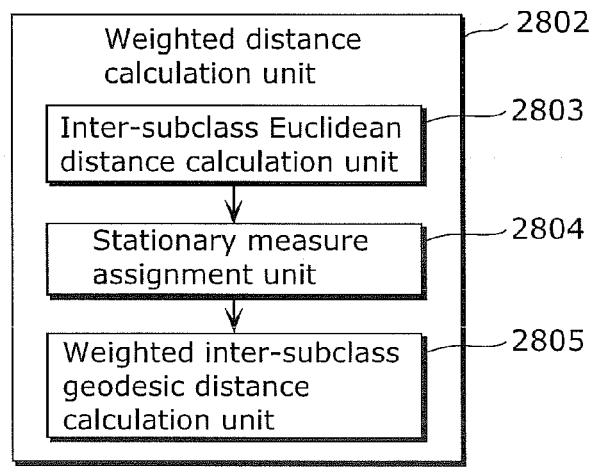
FIG. 33C is a diagram showing a configuration of a weighted distance calculation unit.

FIG. 33C is a diagram showing a configuration of the weighted distance calculation unit 2802. The weighted distance calculation unit 2802 in Modification 7 includes an inter-subclass Euclidean distance calculation unit 2803, a stationary measure assignment unit 2804, and a weighted inter-subclass geodesic distance calculation unit 2805.

An operation performed by the inter-subclass Euclidean distance calculation unit 2803 is described.

Figure 34:
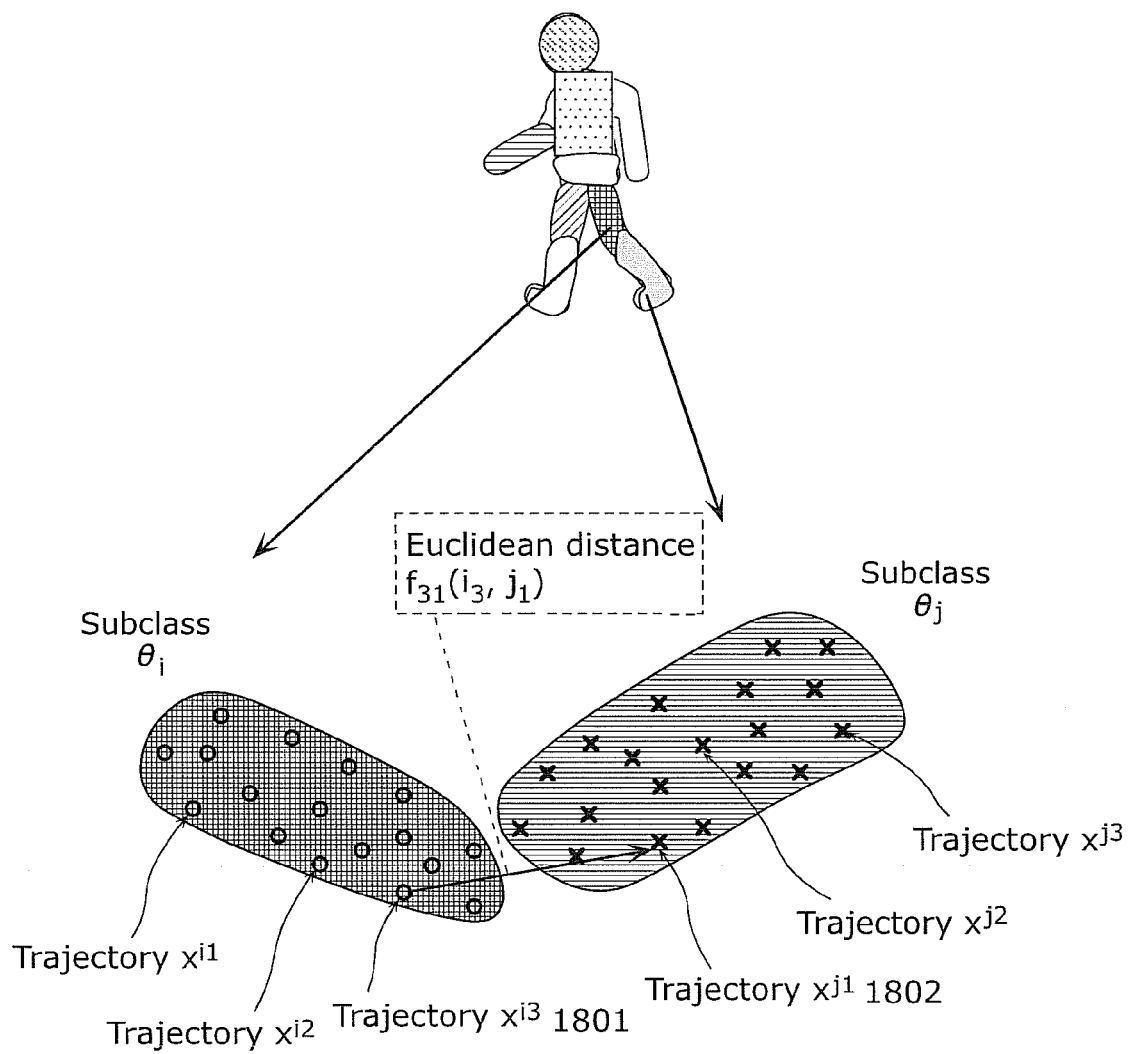
FIG. 34 is a conceptual diagram showing a Euclidean distance between subclasses.

FIG. 34 shows two subclasses $\theta_i$ and $\theta_j$ which are closely located to each other, among the plurality of subclasses generated by the subclass classification unit 105. In the following description, the "subclass" may be referred to as the "class" for the sake of simplicity.

A set of trajectories included in the class $\theta_i$ and a set of trajectory included in the class $\theta_j$ are referred to as I and J, respectively. Moreover, the number of trajectories included in the class $\theta_i$ and the number of trajectories included in the class $\theta_j$ are referred to as Ni and Nj, respectively. In this case, I and J are expressed by Expression 21 and Expression 22, respectively, used in the explanations given with reference to FIG. 13A to FIG. 13C.

Here, "$x_i$" included in Expressions 21 and 22 is a trajectory expressed by a multidimensional vector as indicated by Expression 2.

Here, note that a distance calculated between a trajectory included in I and a trajectory included in J is defined as an "inter-class distance". Note also that this "distance" conceptually includes both a Euclidean distance and a geodesic distance.

FIG. 34 is a conceptual diagram showing a representative value of the inter-class Euclidean distances (i.e., the representative Euclidean distance). Suppose that a trajectory $x^{i3}$ 1801 is selected from the class $\theta_i$, and that a trajectory $x^{j1}$ 1802 is selected from the class $\theta_j$. In this case, the Euclidean distance between these two trajectories is calculated as $f_{31}$ (=f $(i_3, j_1)$). When the distance is calculated for each of all pairs of trajectories between I and J, a plurality of Euclidean distances f represented by Expression 53 are obtained.

$$f(i,j)=(f_{11},f_{12},\ldots f_{NiNj}) \quad \text{Expression 53}$$

The moving object region detection in the present specification focuses on a single set of trajectories in the class, such as I or J, and performs the operation based on a macro distance between the classes. Thus, Embodiment can prevent noise and detection error of the stationary measure that may be caused when the process is performed on a pixel-by-pixel basis. On this account, it is desirable to calculate the representative value of the inter-class distances. More specifically, it is desirable for the representative value of the inter-class distances to approximate the movement or positional relationship between the classes, as shown in FIG. 34

As the representative distance satisfying the above desirable condition, a mean value of the Euclidean distances between the trajectories in the classes can be used. The mean value is obtained by calculating the Euclidean distance for each of all the pairs of trajectories included in the classes and averaging the calculated Euclidean distances. In this case, the representative Euclidean distance F ($\theta_i$, $\theta_j$) can be calculated according to the following Expression 54.

$$F(\theta_i, \theta_j) = \frac{1}{N_i N_j} \sum_{\substack{i \subset N_i, \\ j \subset N_j}}^{N_i, N_j} f(i, j) \quad \text{Expression 54}$$

It should be noted that the representative Euclidean distance is not limited to the mean value of the Euclidean distances.

For example, a median value of the Euclidean distances between the trajectories in the classes may be used as the representative value as follows. The median value is obtained by calculating the Euclidean distance for each of all the pairs of trajectories included in the classes and obtaining a median of the calculated Euclidean distances. In this case, the representative Euclidean distance F ($\theta_i$, $\theta_j$) can be calculated according to the following Expression 55.

$$F(\theta_i, \theta_j)=\text{median}[f(i,j)]_{j \subset N_j}^{i \subset N_i}, \quad \text{Expression 55}$$

In Expression 55, note the following part expressed by Expression 56.

$$\text{median}[f(i,j)]_{\subset N_j}^{i \subset N_i}, \quad \text{Expression 56}$$

This part indicates a function that returns a median value of f (i, j) including a plurality of values corresponding to an integer label i (i=1 to Ni) and an integer label j (j=1 to Nj).

Moreover, a mode value of the Euclidean distances between the trajectories of the classes can be used as the representative distance, as indicated by the following Expression 57. The mode value refers to a value of the Euclidean distance that occurs at the highest frequency among the Euclidean distances calculated for all the pairs of trajectories included in the classes.

$$F(\theta_i, \theta_j) = \text{mode}[f(i,j)]_{\subset N_j}^{i \subset N_i}, \quad \text{Expression 57}$$

In Expression 57, note the following part expressed by Expression 58.

$$\text{mode}[f(i,j)]_{\subset N_j}^{i \subset N_i} \quad \text{Expression 58}$$

This part indicates a function that returns a mode value of f (i, j) including a plurality of values corresponding to the integer label i (i=1 to Ni) and the integer label j (j=1 to Nj).

Next, an operation performed by the stationary measure assignment unit 2804 is described in detail. The stationary measure assignment unit 2804 weights the representative Euclidean distance F between the classes, based on the stationary measures of the trajectories in the classes.

The procedure and rule of the weight assignment are the same as those explained with reference to FIG. 19E and, therefore, the detailed description is omitted here. As a result of the weight assignment, the representative Euclidean distance between the subclasses belonging to the moving object is reduced, and the representative Euclidean distance between the subclasses belonging to the moving object and the background is increased.

Lastly, the weighted inter-subclass geodesic distance calculation unit 2805 calculates the inter-subclass geodesic distance from the weighted inter-subclass Euclidean distance F ($\theta_i$, $\theta_j$). The procedure for calculating the geodesic distance from the representative Euclidean distance is explained above in detail when the distance calculation unit 104 is described. More specifically, the procedure is the same as that performed by the geodesic distance calculation unit 1202 of the distance calculation unit 104. The geodesic distance can be calculated by the same processing, a difference being only whether the processing is performed on a trajectory-by-trajectory basis or on a subclass-by-subclass basis.

Figure 33D:
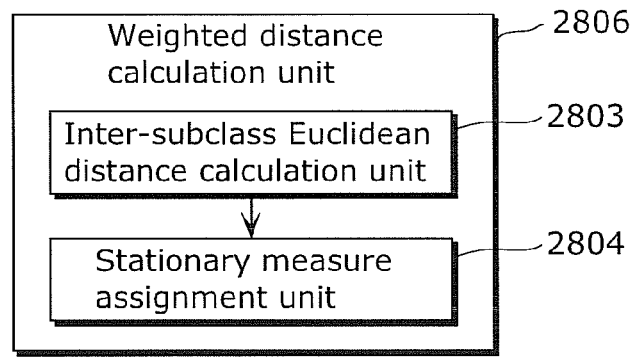
FIG. 33D is a diagram showing a configuration of a weighted distance calculation unit.

It should be noted that the weighted distance calculation unit 2802 does not necessarily need to include the weighted inter-subclass geodesic distance calculation unit 2805. The geodesic distance is suitable for expressing a moving object, especially like a pedestrian, that significantly changes its shape. However, depending on a degree of active shape changes of the moving object included in the video sequence, there may be a case where the moving object region can be detected using only the Euclidean distance without using the geodesic distance. A configuration of the weighted distance calculation unit 2806 in this case is shown in FIG. 33D.

The weighted distance calculation unit 2806 calculates a weighted Euclidean distance by assigning a weight based on the stationary measures of the trajectories to the Euclidean distance calculated by the distance calculation unit 2801, so that a ratio of a Euclidean distance between a trajectory belonging to any stationary object and a trajectory belonging to any moving object to a Euclidean distance between trajectories both belonging to any stationary object is greater than a ratio obtained before the weight assignment.

The weighted distance calculation unit 2806 in Modification 7 includes an inter-subclass Euclidean distance calculation unit 2803 and a stationary measure assignment unit 2804.

With this configuration, the inter-subclass geodesic distance does not need to be calculated. Thus, the amount of calculation can be reduced.

As described above, the subclasses are generated by the subclass classification unit 105 performing clustering on a set of trajectories calculated by the trajectory calculation unit 102, using a certain measure, such as luminance or similarity between the trajectories. However, it should be noted that each of the subclasses does not necessarily need to include a plurality of trajectories. To be more specific, the subclass classification may be performed so that each of the subclasses includes one trajectory.

By detecting the moving object according to the procedure described thus far, the amount of calculation to obtain the geodesic distance can be reduced when the number of subclasses provided by the subclass classification unit is smaller than the number of all trajectories.

[Modification 8]

Next, a moving object detection apparatus in Modification 8 according to Embodiment is described.

In the moving object detection apparatus 100 in Embodiment described above, the weighted distance calculation unit 106 calculates the inter-subclass geodesic distance by performing weight assignment, based on the geodesic distance g (i, j) calculated by the distance calculation unit 104 and the stationary measure E calculated by the stationary measure calculation unit 103.

However, the operations performed by the stationary measure calculation unit 103 and the weighted distance calculation unit 106 are not limited to these. To be more specific, the stationary measure calculation unit 103 may include a camera motion obtaining unit which obtains, from images, motion information on a camera 110. Then, the stationary measure calculation unit 103 may send, to the weighted distance calculation unit 106, the camera motion detected from the images. Moreover, the weighted distance calculation unit 106 may: determine whether or not the subclass belongs to the stationary object or the moving object based on the inter-subclass geodesic distance and the stationary measures of the trajectories included in the subclass; and assign a weight to the inter-subclass geodesic distance based on a result of the determination and the camera motion information to obtain the weighted inter-subclass geodesic distance.

The following describes an example where the camera motion information is estimated and used for weighting the inter-subclass geodesic distance.

Figure 35A:
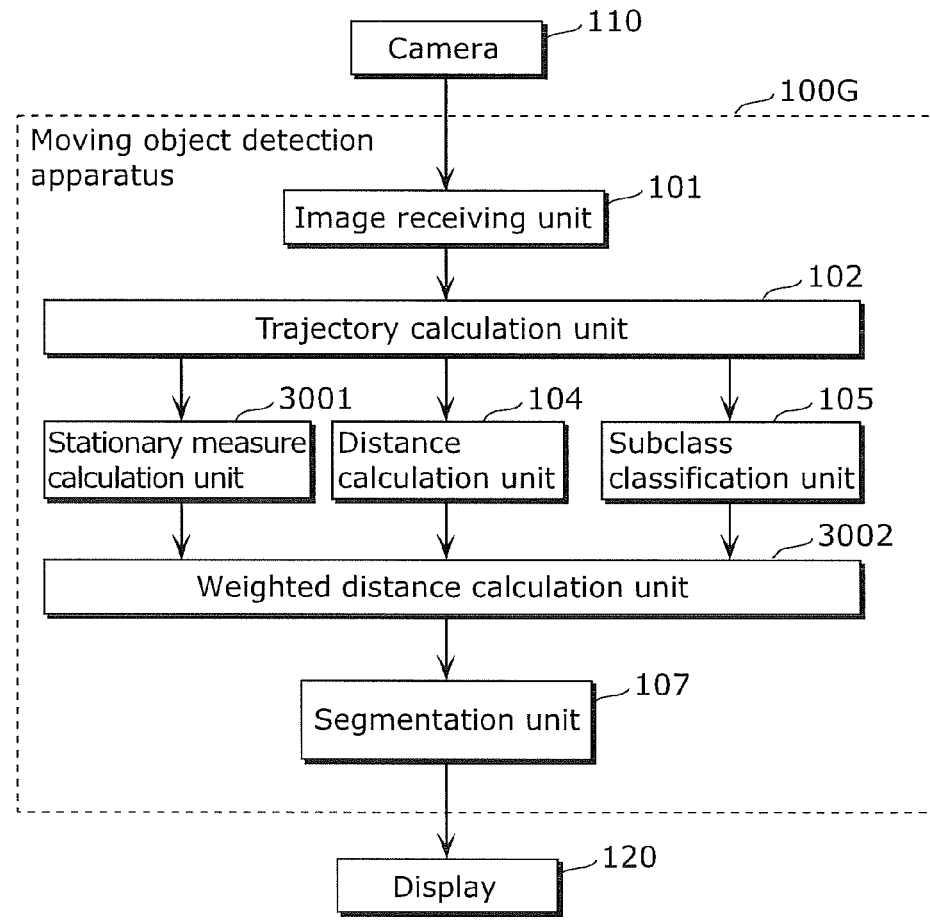
FIG. 35A is a diagram showing a configuration of a moving object detection apparatus in Modification 8 according to Embodiment.

FIG. 35A is a diagram showing a configuration of a moving object detection apparatus 100G in Modification 8 according to Embodiment. As shown in FIG. 35A, the moving object detection apparatus 100G includes an image receiving unit 101, a trajectory calculation unit 102, a stationary measure calculation unit 3001, a distance calculation unit 104, a subclass classification unit 105, a weighted distance calculation unit 3002, and a segmentation unit 107.

The processing units other than the stationary measure calculation unit 3001 and the weighted distance calculation unit 3002 are the same as those described in Embodiment and, therefore, the explanations are not repeated here.

Figure 35B:
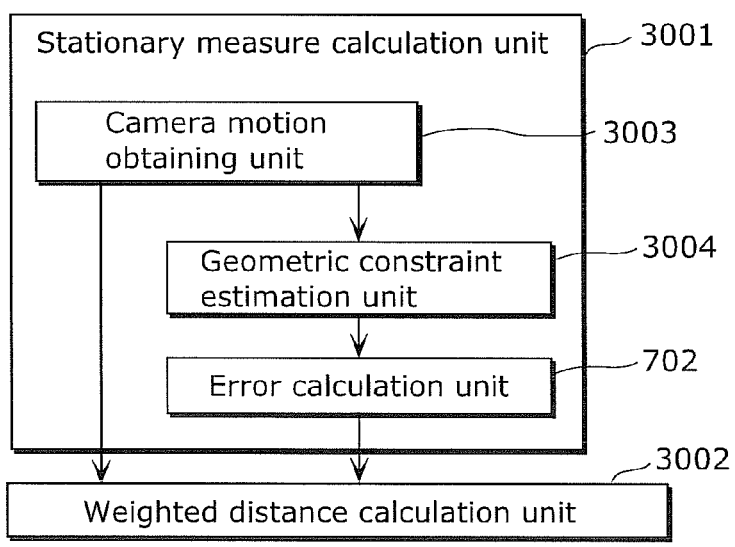
FIG. 35B is a diagram showing configurations of a stationary measure calculation unit and a weighted distance calculation unit.

FIG. 35B is a diagram showing a configuration of the stationary measure calculation unit 3001. The stationary measure calculation unit 3001 in Modification 8 includes a camera motion obtaining unit 3003, a geometric constraint estimation unit 3004, and an error calculation unit 702. An operation performed by the error calculation unit 702 is the same as that performed by the error calculation unit 702 shown in FIG. 7 and, therefore, the explanation is omitted here.

Firstly, an operation performed by the camera motion obtaining unit 3003 is described. The camera motion obtaining unit 3003 estimates the camera motion information from the motion information on the images. To be more specific, the camera motion obtaining unit 3003 extracts the co-located points between the frames from the trajectories calculated by the trajectory calculation unit 102, and estimates the information on camera motion between the frames.

Among various examples of the method for estimating the camera motion information, there is a method whereby the fundamental matrix F is obtained according to the eight-point method and motion estimation is performed using the matrix. The eight-point method, whereby eight sample are selected from among the co-located points and the matrix is estimated according to the RANSAC algorithm, is well known as a method often used for estimating the fundamental matrix. By performing a camera calibration and obtaining a calibration matrix, a main matrix (or, a matrix E) can be calculated using the estimated fundamental matrix and the camera calibration matrix. Then, by performing singular value decomposition on the matrix E, the camera motion information can be estimated.

Since the motion estimation method explained thus far is described in more detail in Non Patent Literature 4, further detailed explanation is omitted here. However, it should be obvious that, instead of the above method, motion estimation may be performed using co-located points and a plane as disclosed in Non Patent Literature 9, for example. Furthermore, as long as a method estimates the information on camera motion between the frames from the images, the method can be used in motion estimation in Embodiment.

Non Patent Literature 9: Kanatani Kenichi, "Image Understanding—Mathematical Principle of Three-dimensional Recognition", Morikita Publishing Co., Ltd., 1990

The geometric constraint estimation unit 3004 can estimate a geometric constraint using the camera motion information estimated by the camera motion obtaining unit 3003. For example, the fundamental matrix F estimated by the camera motion obtaining unit 3003 can be used as it is in the epipolar constraint expressions presented as Expressions 4 and 5. Moreover, a homography matrix and an epipole included in the projective depth used in the homography constraint and the structure consistency constraint can also be calculated from the camera motion information estimated by the camera motion obtaining unit 3003. More details on the transformation are also described in Non Patent Literature 4 and, therefore, the explanation is omitted here. According to the procedure described thus far, the operation performed by the geometric constraint estimation unit 3004 can be simplified. Moreover, the error calculation unit 702 calculates the stationary measure E for each of the trajectories, using the geometric constraint estimated by the geometric constraint estimation unit 3004. The error calculation unit 702 sends the calculated stationary measures E to the weighted distance calculation unit 3002, and the camera motion obtaining unit 3003 sends the obtained camera motion information to the weighted distance calculation unit 3002.

Following this, the weighted distance calculation unit 3002 calculates the inter-subclass geodesic distance in the same way as the weighted distance calculation unit 106 shown in FIG. 17. Up to this point, the weighted distance calculation unit 3002 and the weighted distance calculation unit 106 perform the same operation.

FIG. 36A and FIG. 36B are conceptual diagrams showing subclass distributions in higher-dimensional spaces when camera motion is large and small, respectively. In each of these diagrams, the actual higher-dimensional space is illustrated as the two-dimensional space, for the purpose of making the diagram easy to see. FIG. 36A shows a distribution in the case of large camera motion, and FIG. 36B shows a distribution in the case of small camera motion. When the camera motion is larger, the motion component of the background is relatively enlarged and the distribution of the background is thus widened. For this reason, a distance between the moving objects and the background is inevitably reduced as shown in FIG. 36. On the other hand, when the camera motion is small, the background is distanced away from the moving objects in the distribution as shown in FIG. 36B. In order to address the difference between these distributions, the aforementioned weighting rule is changed according to the magnitude of camera motion.

A specific example is shown in FIG. 36C. When two subclasses belong to the stationary object, a weight $W_B$ or $W_S$ indicated below is assigned to the inter-subclass geodesic distance.

$$W_B < W_S < 1,$$

where $W_B$ represents a weight assigned in the case of large camera motion and $W_S$ represents a weight assigned in the case of small camera motion. When two subclasses belong to the stationary object and the moving object, respectively (i.e., the two subclasses belong to different classes), a weight $W_B$ or $W_S$ indicated below is assigned to the inter-subclass geodesic distance.

$$W_B > W_S > 1,$$

where $W_B$ represents a weight in the case of large camera motion and $W_S$ represents a weight assigned in the case of small camera motion. That is to say, the weights to be assigned are set such that, when the camera motion is large: the subclasses both belonging to the stationary object come closer to each other; and the subclass belonging to the moving object and the subclass belonging to the stationary object are distanced away from each other.

More specifically, a criterion to determine whether the camera motion is large or small depends on the speed of the moving object to be detected from the video sequence. For example, suppose a case where a pedestrian is to be detected as the moving object. Here, since an average moving speed of a pedestrian is 3 km/h, it may be determined that "the camera motion is large" when the speed of the camera motion is 3 km/h or faster. Then, as the camera motion is larger, a weight W to be assigned to the geodesic distance between a pair of trajectories each of which has "0" as the stillness determination value $E_{MS}$ (i.e., the trajectory belongs to the stationary object) may be set to be smaller (note that W<1). Moreover, as the camera motion is larger, a weight to be assigned to the geodesic distance between a pair of trajectories which have "0" and "1", respectively, as the stillness determination value $E_{MS}$ (i.e., one of the trajectories belongs to the stationary object and the other belongs to the moving object) may be set greater (note that W>1). Here, the stillness determination value $E_{MS}$ indicates the result of the determination as to whether the subclass belongs to the stationary object or the moving object.

On the other hand, when the speed of the camera motion is slower than 3 km/h, it may be determined that "the camera motion is small". Then, as the camera motion is smaller, the weight W to be assigned to the geodesic distance between the pair of trajectories each of which has "0" as the stillness determination value $E_{MS}$ may be set to be greater (note that W<1). Moreover, as the camera motion is smaller, the weight to be assigned to the geodesic distance between the pair of trajectories which have "0" and "1", respectively, as the stillness determination value $E_{MS}$ may be set smaller (note that W>1).

For example, when the camera motion is large, such as 5 km/h, the weight W to be assigned to the geodesic distance between the pair of trajectories whose subclasses both belong to the stationary object is set at 0.005. Moreover, the weight W to be assigned to the geodesic distance between the pair of trajectories whose subclasses belong to the stationary object and the moving object, respectively, is set at 10. When the camera motion is small, such as when the camera motion is represented by a distance corresponding to 0.2 km/h, the weight W to be assigned to the geodesic distance between the pair of trajectories whose subclasses both belong to the stationary object is set at 0.05. Moreover, the weight W to be assigned to the geodesic distance between the pair of trajectories whose subclasses belong to the stationary object and the moving object, respectively, is set at 1.

Examples of the result obtained by the change in the inter-subclass geodesic distance through the weight assignment set as described above are shown in FIG. 36D and FIG. 36E. FIG. 36D shows a distribution of the subclasses obtained after the weight corresponding to the large camera motion is assigned to the inter-subclass geodesic distance. FIG. 36E shows a distribution of the subclasses obtained after the weight corresponding to the small camera motion is assigned to the inter-subclass geodesic distance. As can be seen, by appropriate change in the weight, the geodesic distance between the subclasses is calculated regardless of the magnitude of the camera motion.

Here, W may be determined as follows. For example, a weight $W_{ref}$ may be set in advance under a certain camera motion. Then, the weighting rule may be changed by multiplying or dividing the weight $W_{ref}$ by a ratio of absolute values of the camera motion.

With the configuration described thus far, the influence of variations in the camera motion on the weighted inter-subclass geodesic distance $G_w$ can be reduced. Hence, the moving object detection can be implemented with stability.

In Modification 8, the camera motion obtaining unit obtains the very information on the camera motion. However, instead of the camera motion, a mean value of the magnitudes of the trajectories (the amounts of movement obtainable from the trajectories) may be calculated and used in place of the camera motion. When the camera motion increases, the magnitude of the trajectory belonging to the background also increases on average. On this account, a value approximately proportionate to the magnitude of the camera motion can be obtained. For example, by obtaining in advance a relationship between an actual camera motion and an approximate mean value of magnitudes of the trajectories, the mean value can be used as an evaluation value corresponding to the camera motion.

[Modification 9]

Next, a moving object detection apparatus in Modification 9 according to Embodiment is described.

In the moving object detection apparatus 100G in Modification 8, the camera motion obtaining unit 3003 is included in the stationary measure calculation unit 3001 and estimates the camera motion information from the images. However, the operation performed by the camera motion obtaining unit 3003 is not limited to this.

To be more specific, the camera motion obtaining unit 3003 may electronically or physically obtain the camera motion information from a sensor mounted on the camera. Alternatively, the camera motion obtaining unit 3003 may obtain the camera motion information from an operation control signal of the camera.

Figure 37:
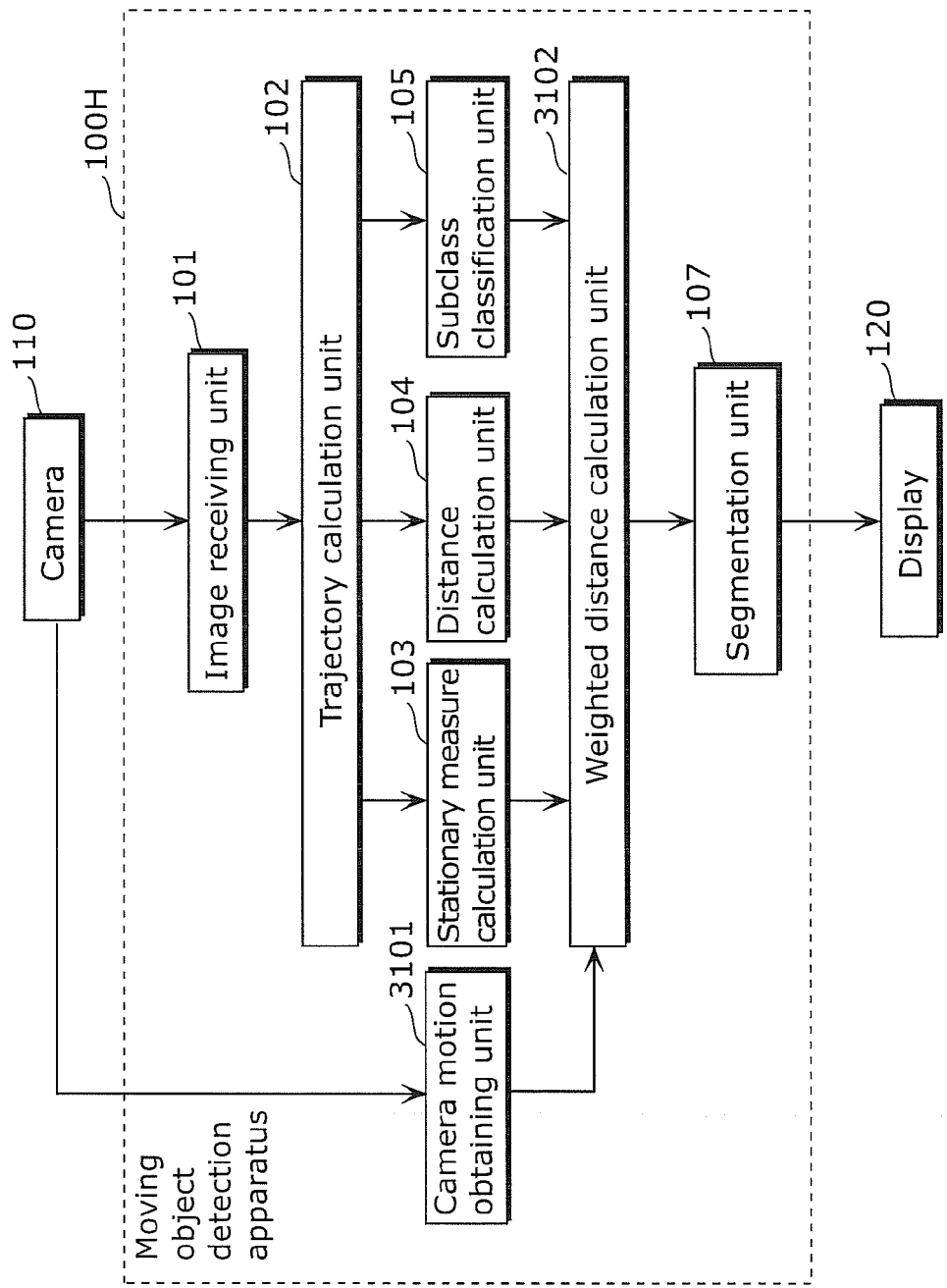
FIG. 37 is a diagram showing a configuration of a moving object detection apparatus in Modification 9 according to Embodiment.

FIG. 37 is a diagram showing a configuration of a moving object detection apparatus 100H in Modification 9 according to Embodiment. As shown in FIG. 37, the moving object detection apparatus 100H includes an image receiving unit 101, a trajectory calculation unit 102, a stationary measure calculation unit 103, a distance calculation unit 104, a subclass classification unit 105, a weighted distance calculation unit 3102, and a segmentation unit 107.

The processing units other than a camera motion obtaining unit 3101 and the weighted distance calculation unit 3102 are the same as those described in Modification 8 and, therefore, the explanations are not repeated here.

The camera motion obtaining unit 3101 electronically or physically obtains the camera motion information from a sensor mounted on a camera. Following this, the weighted distance calculation unit 3102 receives the camera motion information obtained by the camera motion obtaining unit 3101, in addition to receiving the stationary measures E from the stationary measure calculation unit 103, the distances between the trajectories from the distance calculation unit 104, and the subclass classification information (i.e., the label information) from the subclass classification unit 105. As in Modification 8, the weight to be assigned to the inter-subclass geodesic distance is changed based on the camera motion information. The details of the processing are the same as in Modification 8 and, therefore, the explanation is omitted here. With this configuration, the weighted distance calculation unit 3102 obtains the information on the actual camera motion. Hence, the moving object detection can be performed with more accuracy.

Figure 38:
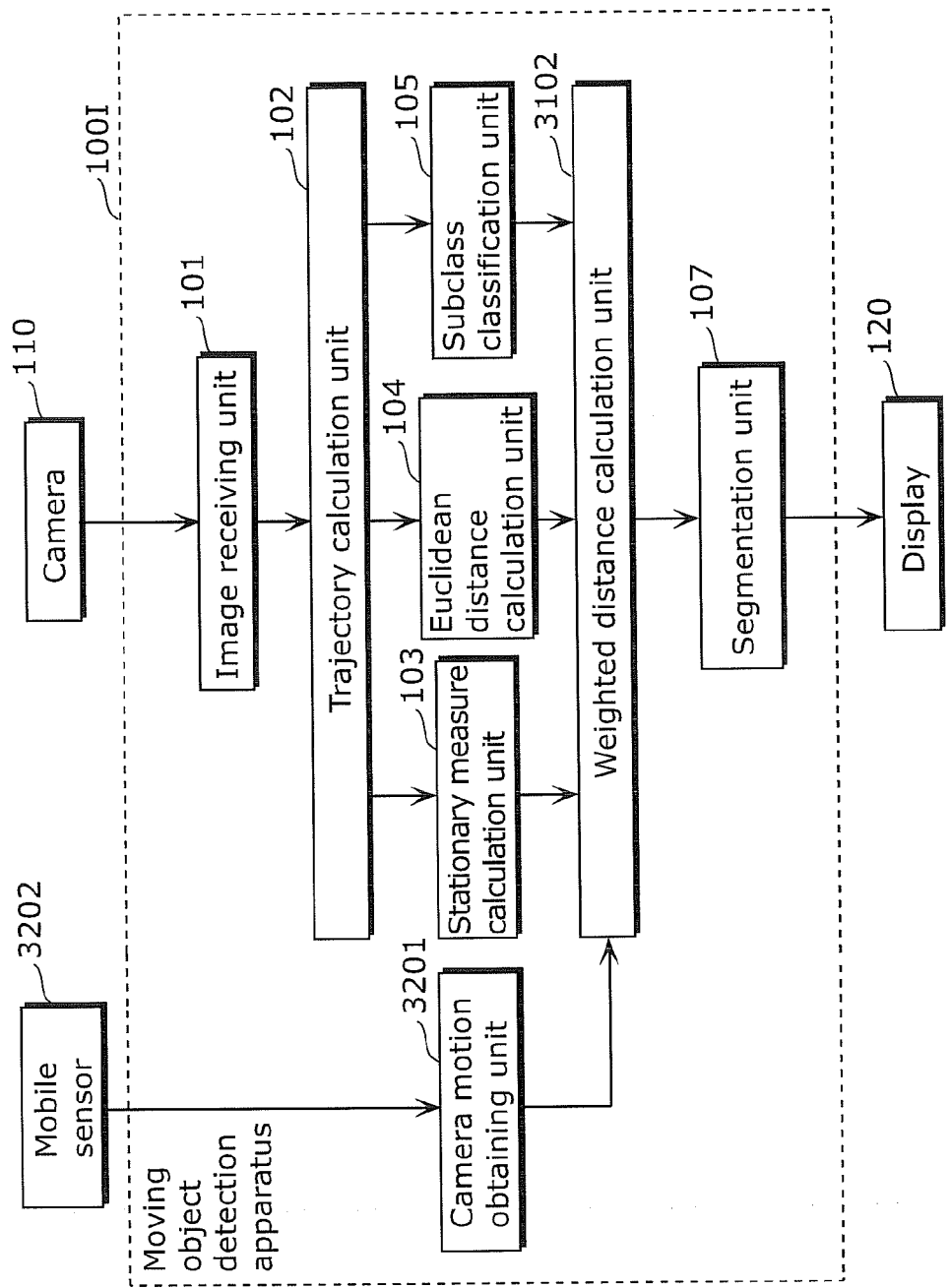
FIG. 38 is a diagram showing another configuration of the moving object detection apparatus in Modification 9 according to Embodiment.

Note that the camera motion obtaining unit 3101 does not necessarily need to obtain the camera motion information from the sensor mounted on the camera. The camera motion obtaining unit 3101 may obtain the information from a sensor separately mounted on a moving vehicle including the camera. Especially when the moving vehicle is a car, an in-car sensor can be used. When a positional relationship between the camera and the separately-mounted sensor is known, coordinate transformation may be performed on the motion information on the moving object obtained by the sensor. With this, the motion information on the moving object can be easily transformed into the motion information on the camera. FIG. 38 shows a configuration of the moving object detection apparatus in which the sensor is provided separately from the camera. To be more specific, the moving object detection apparatus 100I includes a camera motion obtaining unit 3201 in space of the camera motion obtaining unit 3101 included in the moving object detection apparatus 100H shown in FIG. 37. The camera motion obtaining unit 3201 may obtain sensor information from a mobile sensor 3202 mounted on a moving vehicle, such as a car, perform coordinate transformation on the camera coordinate system, and output the motion information on the moving object as the camera motion information. With this configuration, even when it is difficult to obtain the motion information from the camera body, the camera motion information can be obtained by the sensor separately mounted on the moving vehicle including the camera. As a specific example of the mobile sensor 3202 used when the moving vehicle is a car, a sensor for detecting a travel distance and a steering angle may be used. Although the camera is mounted on the moving vehicle here, it should be obvious that the camera may be mounted on any object instead of the vehicle as long as the object can move, include a camera, and detect motion of the camera.

[Modification 10]

Next, a moving object detection apparatus in Modification 10 according to Embodiment is described.

In the moving object detection apparatus 100 in Embodiment described above, the weighted distance calculation unit 106 includes the representative distance calculation unit 1701 and the stationary measure assignment unit 1702 and assigns the weight to the representative geodesic distance based on the stationary measures. Moreover, in the moving object detection apparatus 100, the segmentation unit 107 performs segmentation on the weighted representative geodesic distance. However, the operations performed by the weighted distance calculation unit 106 and the segmentation unit 107 are not limited to these.

The weighted distance calculation unit 106 may calculate the representative geodesic distance and the representative stationary measure for each subclass, and send the calculated representative geodesic distance and the calculated representative stationary measure to the segmentation unit 107. Then, the segmentation unit 107 may assign a weight to the clustering threshold based on the representative stationary measure.

Figure 39A:
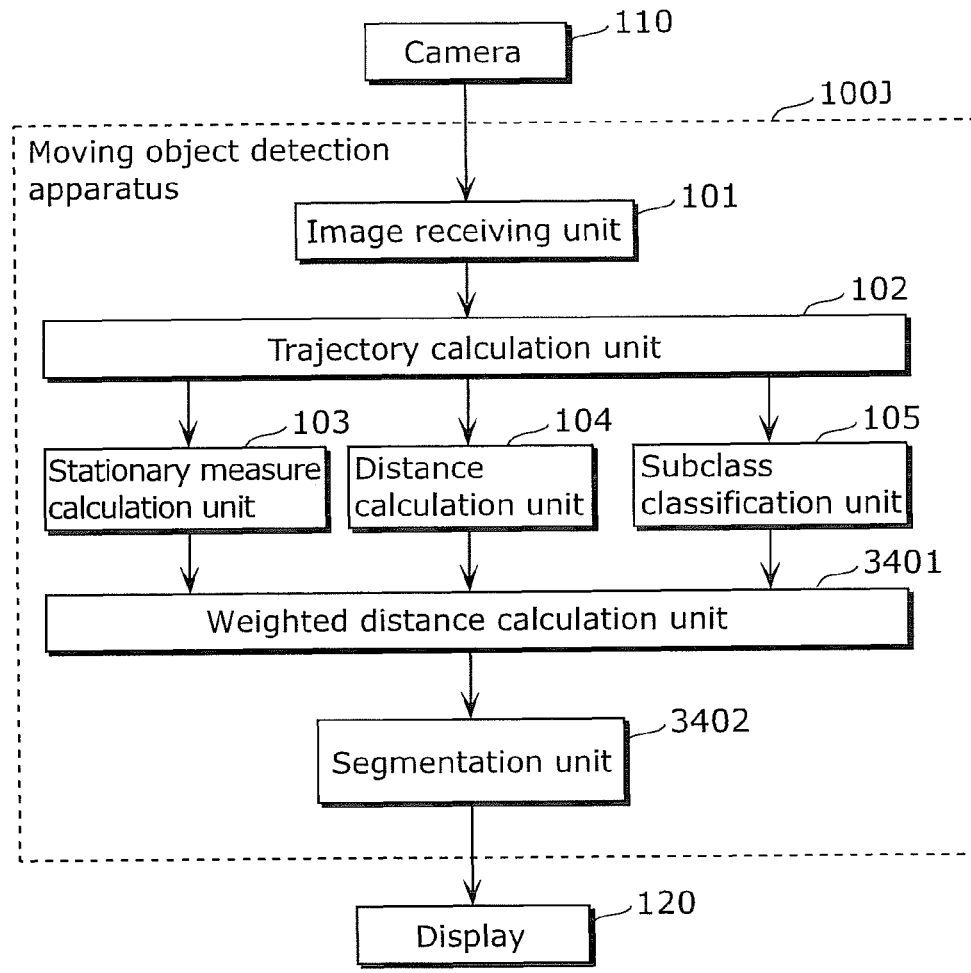
FIG. 39A is a diagram showing a configuration of a moving object detection apparatus in Modification 10 according to Embodiment.

FIG. 39A is a diagram showing a configuration of a moving object detection apparatus 100J in Modification 10 according to Embodiment.

As shown in FIG. 39A, the moving object detection apparatus 100J includes an image receiving unit 101, a trajectory calculation unit 102, a stationary measure calculation unit 103, a distance calculation unit 104, a subclass classification unit 105, a weighted distance calculation unit 3401, and a segmentation unit 3402.

The processing units other than the weighted distance calculation unit 3401 and the segmentation unit 3402 are the same as those described in Embodiment and, therefore, the explanations are not repeated here.

The weighted distance calculation unit 3401 calculates a geodesic distance between trajectories based on a distance between the trajectories.

The segmentation unit 3402 separates the stationary object region from the moving object region in the picture, by separating the trajectory belonging to the moving object from the trajectory belonging to the stationary object based on a result of comparing a weighted geodesic distance threshold and the geodesic distance calculated by the weighted distance calculation unit 3401. Here, the weighted geodesic distance threshold is obtained by assigning a weight based on the stationary measures to a geodesic distance threshold used for determining whether or not to classify the trajectory belonging to the stationary object and the trajectory belonging to the moving object into different classes.

The segmentation unit 3402 performs the weight assignment so that the weight assigned to the geodesic distance threshold of when each of the stationary measures of the pair of trajectories indicates "stationary" is greater than the weight assigned to the geodesic distance threshold of when the stationary measures of the pair of trajectories indicate "moving" and "stationary", respectively.

Figure 39B:
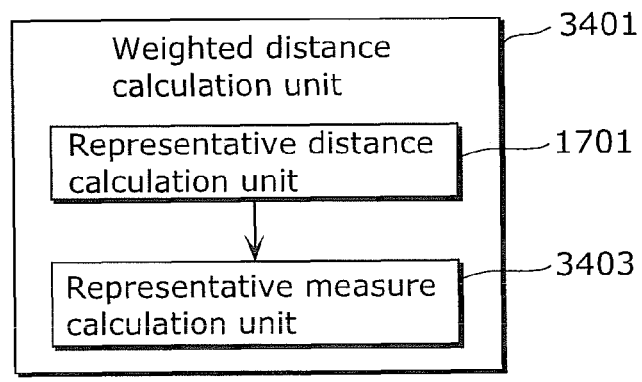
FIG. 39B is a diagram showing a configuration of a weighted distance calculation unit.

As shown in FIG. 39B, the weighted distance calculation unit 3401 includes a representative distance calculation unit 1701 and a representative measure calculation unit 3403. An operation performed by the representative distance calculation unit 1701 is the same that described above in Embodiment and, therefore, the explanation is omitted here.

An operation performed by the representative measure calculation unit 3403 is described in detail. The representative measure calculation unit 3403 calculates a representative value of the stationary measures of the trajectories for each of the classes.

More specifically, this process is the same as that performed in a first half of the operation (i.e., where one stationary measure is calculated for each of the subclasses) performed by the stationary measure assignment unit 1702 in Embodiment above. Thus, by evaluating whether the current subclass belongs to the stationary object or the moving object, the determination error caused to the stationary measure on a pixel-by-pixel basis is corrected.

Examples of the simplest method of evaluating whether the trajectories belong to the stationary object or the moving object on a subclass-by-subclass basis include a majority method. To be more specific, when the number of trajectories where the stillness determination value $E_{ms}=1$ (i.e., "moving") is greater in the current subclass, the representative measure calculation unit 3403 makes the evaluation as "moving", that is, determines that the inter-subclass stillness determination value $E_{SUB-MS}=1$ for this subclass. On the other hand, when the number of trajectories determined to belong to the stationary object is greater or when the number of trajectories determined to belong to the stationary object is equal to the number of trajectories determined to belong to the moving object, the representative measure calculation unit 3403 makes the evaluation as "stationary", that is, determines that the inter-subclass stillness determination value $E_{SUB-MS}=0$ for this subclass. Thus, as shown in FIG. 19D, it is determined that the stillness determination value $E_{ms}=1$ for each of the subclasses belonging to the moving object and that the stillness determination value $E_{ms}=0$ for each of the subclasses belonging to the stationary object. In this way, influence of the determination errors can be eliminated.

Accordingly, one inter-subclass stillness determination value $E_{SUB-MS}$ is assigned for each pair of subclasses, that is, the evaluation value indicating "stationary" or "moving" is assigned on a subclass-by-subclass basis. Then, the weighted distance calculation unit 3401 sends the inter-subclass stillness determination value $E_{SUB-MS}$ and the inter-subclass geodesic distance $h_{p,q}$ to the segmentation unit 3402.

The segmentation unit 3402 uses, as segmentation candidates, the plurality of subclasses $\theta_p$ generated by the subclass classification unit 105, where p≤m and m is the number of subclasses. Using the inter-subclass geodesic distance $h_{p,q}$ calculated by the weighted distance calculation unit 3401 as the evaluation value for segmentation of the subclasses $\theta_p$ and using the inter-subclass stillness determination value $E_{SUB-MS}$ as the weight to be assigned to the threshold for segmentation, the segmentation unit 3402 determines whether or not to separate the subclasses $\theta_p$ which are the segmentation candidates into different clusters.

To be more specific, when the inter-subclass geodesic distance $h_{p,q}$ is greater than or equal to a predetermined threshold Ht, the segmentation unit 3402 selects the corresponding subclasses $\theta_p$ and $\theta_q$ as classes adequately distanced from each other and thus determines these subclasses as different classes.

On the other hand, when the inter-subclass geodesic distance $h_{p,q}$ is smaller than the predetermined threshold Ht, the segmentation unit 3402 determines the corresponding subclasses $\theta_p$ and $\theta_q$ to belong to the same class. In other words, segmentation is not performed in this case. Then, after determining whether or not to perform segmentation for all the subclasses which are the segmentation candidates, the segmentation unit 3402 assigns different labels $\theta_m$ to the trajectories belonging to the different classes and outputs the labels as segmentation information on the trajectories.

Here, a weighting rule is established for the predetermined threshold Ht as follows.

When the inter-subclass stillness determination value $E_{SUB-MS}$ is 0 in each of the two subclasses, it is determined that both of these subclasses belong to the stationary object, i.e., to the same stationary background. On this account, a process may be performed to make it easier for the subclasses to be integrated. Thus, a weight Y to reduce the inter-subclass geodesic distance is assigned to the threshold Ht used for the segmentation determination for the subclasses. To be more specific, the segmentation unit 3402 may assign a weight Ymin to the threshold Ht using the weight Wmin described in Embodiment so that Ymin=1/Wmin. When the weighted threshold is represented as Htw (p, q), the following expression is formed.

$$Htw(p,q) = Ymin \cdot Ht$$

When the inter-subclass stillness determination value $E_{SUB-MS}$ is 0 in one of the two subclasses and is 1 in the other, it is likely that these subclasses belong to the background and the moving object, respectively, that is, belong to the different objects. On this account, a process may be performed to make it harder for the subclasses to be integrated. Thus, a weight Y to increase the inter-subclass geodesic distance is assigned to the threshold Ht. To be more specific, as with the weight Ymin, the segmentation unit 3402 may assign a weight Ymax to the threshold Ht using the weight Wmax described in Embodiment so that Ymax=1/Wmax. When the weighted threshold is represented as Htw (p, q), the following expression is formed.

$$Htw(p, q) = Ymax \cdot Ht$$

When the inter-subclass stillness determination value $E_{SUB-MS}$ is 1 in both of the two subclasses, these subclasses belong to the moving object. However, unlike the case of the background, whether the two subclasses belong to the same moving object or to the different moving objects cannot be determined only from the inter-subclass stillness determination value $E_{SUB-MS}$. Thus, no weight is assigned. More specifically, the segmentation unit 3402 assigns a weight $Y_{neu}$ to the inter-subclass clustering threshold such that Y=1. When the weighted threshold is represented as Htw (p, q), the following expression is formed.

$$Htw(p, q) = Yneu \cdot Ht$$

As described, the weight assignment is performed to make it easier for the subclasses both belonging to the stationary object to be integrated. Moreover, the weight assignment is performed to make it harder for the subclasses, one of which belongs to the background and the other of which belongs to the stationary object, to be integrated. Here, it should be noted that only one of these weight assignments may be performed or both of the weight assignments may be performed at the same time.

It should be noted that the values of Ymax and Ymin depend on the magnitude of the camera motion or the speed at which the moving object moves. For example, when the camera moves at a speed of 1 km per hour, Ymax and Ymin may be set at 0.2 and 100, respectively, based on Wmax and Wmin in Embodiment above.

Moreover, by changing the weight according to the reliability of the inter-subclass stillness determination values $E_{SUB-MS}$, the moving object can be separated from the background with more accuracy.

When the reliability of the inter-subclass stillness determination values $E_{SUB-MS}$ is low (such as when an epipole error is used and a small moving object is present in a narrow street particularly in front of a vehicle driving straight), a determination error may be caused. In such a case, the values of Ymax and Ymin may be set in advance at values closer to 1, such as 0.4 and 10, respectively. As a result, a detection error or detection mistake can be reduced.

On the other hand, suppose a case where the reliability of the inter-subclass stillness determination values $E_{SUB-MS}$ is high (that is, the case where the aforementioned epipole error is used and a small moving object such as a pedestrian is unlikely to appear in front of the vehicle in a roadway like a main street). In this case, the values of Ymax and Ymin may be set at, for example, 0.1 and 1000, respectively, so that the values are further away from 1.

In particular, when the inter-subclass stillness determination values $E_{SUB-MS}$ is given with complete accuracy, Ymax may be set at 0. With this, the moving object can be easily separated from the background.

In this way, by weighting the threshold used for segmentation of the subclasses, the same advantageous effect as the weight assignment performed on the geodesic distance in Embodiment above can be achieved.

Lastly, as with the process performed by the segmentation unit 107 above in Embodiment, the segmentation unit 3402 compares the inter-subclass geodesic distance $h_{p, q}$ with the weighted threshold Htw (p, q). When $h_{p, q} \geq Htw$ (p, q), the segmentation unit 3402 determines that the corresponding subclasses $\theta_p$ and $\theta_q$ are to be classified into different classes. On the other hand, when $h_{p, q} < Htw$ (p, q), the segmentation unit 3402 determines that the corresponding subclasses $\theta_p$ and $\theta_q$ are to be integrated, instead of being classified into different classes.

According to the procedure described thus far, the same advantageous effect as the moving object detection apparatus 100 in Embodiment above can be achieved only by changing the threshold without having to directly changing the value of the geodesic distance. In particular, suppose a case where the weighted geodesic distance is not stored, that is, where the number of subclasses is great, for example. In such a case, both of the geodesic distances before and after the weight assignment do not need to be stored into a memory. Thus, the memory efficiency can be increased.

In this way, the moving object detection apparatus and the moving object detection method in Embodiment and Modifications can perform subclass classification based on a distance between pixels or similarity between trajectories, and perform segmentation on a picture including a moving object using a representative distance between subclasses and stationary measures of the trajectories regardless of the posture of the moving object.

Moreover, a target candidate region does not need to be set as preprocessing. Thus, there is no region extraction error that may be caused due to an error in detecting the target candidate region. Accordingly, from a picture including a moving object, such as a pedestrian, that moves with deformation, the moving object can be detected with accuracy without requiring enormous parameter fittings.

Figure 40:
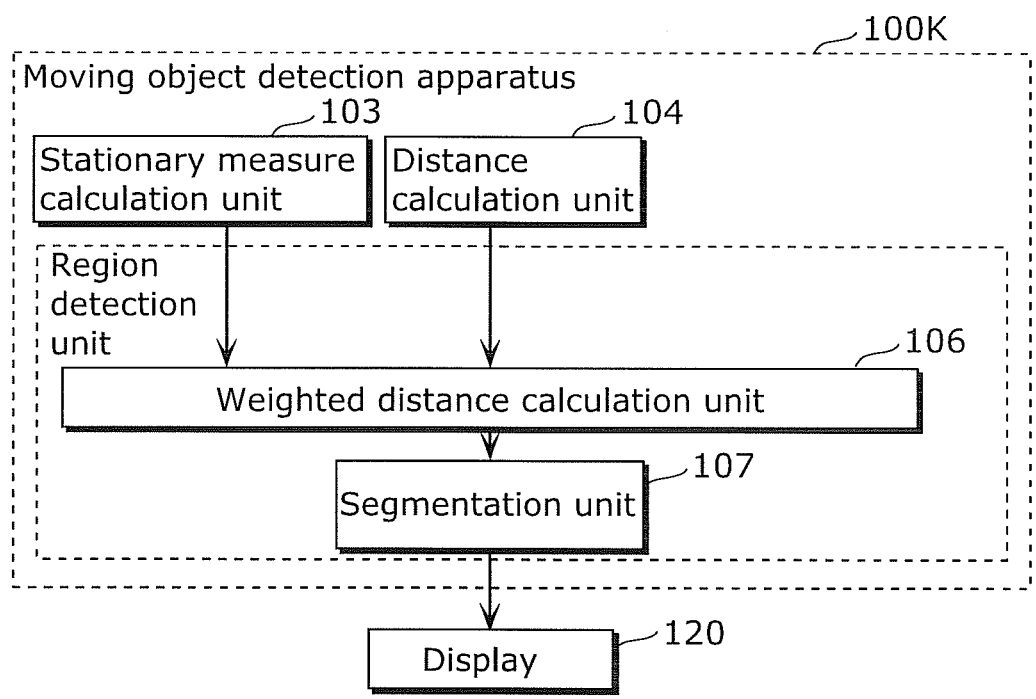
FIG. 40 is a diagram showing a configuration of a moving object detection apparatus including components essential in an exemplary embodiment.

The moving object detection apparatus 100 in Embodiment includes the image receiving unit 101, the trajectory calculation unit 102, and the subclass classification unit 105. However, these components are not essential in an exemplary embodiment. FIG. 40 is a diagram showing a configuration of a moving object detection apparatus including components essential in an exemplary embodiment. A moving object detection apparatus 100K includes a stationary measure calculation unit 103, a distance calculation unit 104, a weighted distance calculation unit 106, and a segmentation unit 107. More specifically, suppose that trajectories of a plurality of blocks in pictures included in a video sequence are calculated in advance. In this case, the moving object detection apparatus 100 may obtain these trajectories from an external source and perform the processes of steps S303, S304, S306, and S307 on the obtained trajectories. Moreover, the weighted distance calculation unit 106 may calculate the geodesic distance for each pair of trajectories without classifying the trajectories into subclasses. It should be noted that, in Claims set forth below, the weighted distance calculation unit 106 and the segmentation unit 107 are collectively referred to as a region detection unit.

An exemplary embodiment is implemented as the moving object detection apparatus. However, it should be obvious that an exemplary embodiment can be implemented as an image processing apparatus that extracts or segments a region of an object having articulated motion in a video sequence as long as the image processing apparatus has the function of the moving object detection apparatus 100.

In Embodiment, the Euclidean distance is used as the linear distance. However, as mentioned above, the linear distance is not limited to the Euclidean distance. Any embodiment obtained by using any distance measure defined by the aforementioned linear distance is intended to be included in the scope of the present disclosure.

Moreover, some or all of the components included in each of the above-described apparatuses may be realized as a single system Large Scale Integration (LSI). The system LSI is a super multifunctional LSI manufactured by integrating a plurality of components onto a signal chip. To be more specific, the system LSI is a computer system configured with a microprocessor, a ROM, a RAM, and so forth. The RAM stores a computer program. The microprocessor operates according to the computer program, so that a function of the system LSI is carried out.

Furthermore, some or all of the components included in each of the above-described apparatuses may be implemented as an IC card or a standalone module that can be inserted into and removed from the corresponding apparatus. The IC card or the module is a computer system configured with a microprocessor, a ROM, a RAM, and so forth. The IC card or the module may include the aforementioned super multifunctional LSI. The microprocessor operates according to the computer program, so that a function of the IC card or the module is carried out. The IC card or the module may be tamper resistant.

Moreover, an exemplary embodiment may be implemented by the methods described above. Each of the methods may be a computer program implemented by a computer, or may be a digital signal of the computer program.

Furthermore, an exemplary embodiment may be implemented by the aforementioned computer program or digital signal recorded on a computer-readable nonvolatile recording medium, such as a flexible disk, a hard disk, a CD-ROM, an MO, a DVD, a DVD-ROM, a DVD-RAM, a Blu-ray Disc (BD) (registered trademark), or a semiconductor memory. Also, an exemplary embodiment may be implemented by the digital signal recorded on such a recording medium.

Moreover, an exemplary embodiment may be implemented by the aforementioned computer program or digital signal transmitted via a telecommunication line, a wireless or wired communication line, a network represented by the Internet, and data broadcasting.

Furthermore, an exemplary embodiment may be implemented by a computer system including a microprocessor and a memory. The memory may store the aforementioned computer program and the microprocessor may operate according to the computer program.

Moreover, by transferring the nonvolatile recording medium having the aforementioned program or digital signal recorded thereon or by transferring the aforementioned program or digital signal via the aforementioned network or the like, an exemplary embodiment may be implemented by a different independent computer system.

Furthermore, Embodiment and Modifications described above may be combined.

Although only some exemplary embodiments have been described in detail above, those skilled in the art will readily appreciate that various modifications may be made in these exemplary embodiments without materially departing from the principles and spirit of the inventive concept, the scope of which is defined in the appended Claims and their equivalents.

INDUSTRIAL APPLICABILITY

An exemplary embodiment can be used as a moving object detection apparatus detecting a moving object, such as a pedestrian, that moves with deformation, from a picture by extracting a region of the moving object. For example, the moving object detection apparatus can be built into a motion analysis apparatus, a monitoring apparatus, or an AV apparatus such as a video camera or a TV set.

The invention claimed is:

1. A moving object detection apparatus which detects a moving object region using trajectories which correspond to a region included in a video, said moving object detection apparatus comprising:
   a stationary measure calculation unit configured to calculate, for each of the trajectories, a stationary measure representing likelihood that the trajectory belongs to a stationary object, the trajectory indicating a motion of blocks between two or more pictures included in the video, and each of the blocks being included in a picture and having one or more pixels;
   a distance calculation unit configured to calculate a distance between each pair of trajectories, the distance representing similarity between the trajectories; and
   a region detection unit configured (i) to perform a transformation based on the distances between trajectories and the stationary measure of these trajectories, so that a ratio of a distance between two trajectories that one belongs to stationary object and another belongs to moving object, to the distance between trajectories both belonging to stationary object, becomes greater than the ratio obtained before the transformation, and (ii) to detect the trajectories belonging to the moving object as the moving object region by separating the trajectories on moving object from those on stationary object, based on the transformed distances between trajectories.

2. The moving object detection apparatus according to claim 1,
   wherein said distance calculation unit is configured to calculate, based on the distances between trajectories, a geodesic distance being a distance of a path that passes through, as a relay point, a trajectory other than the first trajectory and the second trajectory, to reach the second trajectory from the first trajectory, and
   said region detection unit is configured (i) to perform a transformation based on the stationary measure of trajectories and the geodesic distances between the trajectories, so that a ratio of a geodesic distance between two trajectories that one belongs to stationary object and another belongs to moving object, to the distance between trajectories both belonging to stationary object, becomes greater than the ratio obtained before the transformation, and (ii) to detect the trajectories belonging to the moving object as the moving object region by separating the trajectories of the moving object from those of the stationary object, based on each of the transformed geodesic distances between trajectories.

3. The moving object detection apparatus according to claim 1,
wherein said stationary measure calculation unit is configured to estimate, based on the trajectories, a geometric constraint that holds when the trajectory belongs to the stationary object, and to calculate, as the stationary measure, a degree at which the trajectory satisfies the estimated geometric constraint.

4. The moving object detection apparatus according to claim 3,
wherein said stationary measure calculation unit is configured to estimate, based on the trajectories, any of following geometric constraints, an epipolar constraint, a homography constraint, a trilinear constraint, and a structure consistency constraint, and calculate, as the stationary measure, a degree at which the trajectory satisfies the estimated geometric constraint.

5. The moving object detection apparatus according to claim 1,
wherein said region detection unit includes:
a weighted distance calculation unit configured to (i) calculate a geodesic distance between each pair of trajectories based on the distance between these trajectories, and to (ii) calculate a weighted geodesic distance by assigning a weight based on the stationary measure of these trajectories, to the calculated geodesic distance, so that a ratio of a geodesic distance between two trajectories that one belongs to stationary object and another belongs to moving object, to the geodesic distance between trajectories both belonging to stationary object, becomes greater than the ratio obtained before the weight assignment; and
a segmentation unit configured to segment the picture into stationary object region and moving object region by classifying the trajectories into different classes if the weighted geodesic distance calculated by said weighted distance calculation unit is greater than or equal to a predetermined threshold, and into the same class if the distance is below the threshold.

6. The moving object detection apparatus according to claim 5,
wherein said distance calculation unit is configured to calculate a geodesic distance between each pair of trajectories, the geodesic distance representing similarity between the trajectories, and
said weighted distance calculation unit is configured to calculate the weighted geodesic distance by assigning a weight based on the stationary measures to the geodesic distance calculated by said distance calculation unit, so that a ratio of a geodesic distance between two trajectories that one belongs to stationary object and another belongs to moving object, to the geodesic distance between trajectories both belonging to stationary object becomes greater than the ratio obtained before the weight assignment.

7. The moving object detection apparatus according to claim 5,
wherein said distance calculation unit is configured to calculate a linear distance between each pair of trajectories, the linear distance representing similarity between the trajectories, and
said weighted distance calculation unit is configured to (i) calculate a weighted linear distance by assigning a weight based on the stationary measures of the trajectories to the linear distance calculated by said distance calculation unit, so that a ratio of a linear distance between two trajectories that one belongs to stationary object and another belongs to moving object, to a linear distance between trajectories both belonging to stationary object, becomes greater than the ratio obtained before the weight assignment, and to (ii) calculate the weighted geodesic distance based on the calculated weighted linear distance.

8. The moving object detection apparatus according to claim 1,
wherein said region detection unit includes:
a weighted distance calculation unit configured to calculate a geodesic distance between each pair of trajectories based on the distance between the trajectories; and
a segmentation unit configured to segment the picture into stationary object region and moving object region, by separating trajectories that belong to the moving object, and those belong to the stationary object into different classes, based on a result whether or not the geodesic distance calculated by said weighted distance calculation unit is greater than a weighted geodesic distance threshold, which is obtained by assigning a weight based on the stationary measures to a geodesic distance threshold, the threshold applied to determine whether or not to classify the trajectories on stationary object and moving object into different classes.

9. The moving object detection apparatus according to claim 8,
wherein said segmentation unit is configured to perform the weight assignment so that the weight assigned to the geodesic distance threshold is greater when the stationary measures of the pair of trajectories both indicates "stationary", than when the stationary measures of the pair of trajectories indicate "moving" and "stationary", respectively.

10. The moving object detection apparatus according to claim 5, further comprising
a subclass classification unit configured to classify the trajectories into subclasses each of which is a subset of similar trajectories out of the trajectories,
wherein said weighted distance calculation unit is configured to calculate, based on stationary measures of the trajectories, the distances between trajectories, and classified subclasses, the weighted geodesic distance assigned with the weight based on the stationary measures, and
said segmentation unit is configured to segment the picture into regions of stationary object and those of moving object, by separating the trajectories on the moving object from the trajectories on the stationary object, based on the weighted geodesic distance calculated by said weighted distance calculation unit.

11. The moving object detection apparatus according to claim 5, further comprising
a subclass classification unit configured to classify the trajectories into subclasses each of which is a subset of similar trajectories out of the trajectories,
wherein said weighted distance calculation unit is configured to calculate, based on stationary measures of the trajectories, the distances between trajectories, and classified subclasses, the weighted inter-subclass geodesic distance assigned with the weight based on stationary measures, and
said segmentation unit is configured to segment the picture into regions of stationary object and those of moving object, by separating the subclasses on the moving object from the subclasses on the stationary object, based on the weighted inter-subclass geodesic distance calculated by said weighted distance calculation unit.

12. The moving object detection apparatus according to claim 11,
wherein said distance calculation unit is configured to calculate a geodesic distance between each pair of trajectories, the geodesic distance representing similarity between the trajectories, and
said weighted distance calculation unit is configured to calculate the weighted inter-subclass geodesic distance by assigning, to a representative value of inter-subclass geodesic distances, a weight based on the representative value of stationary measures of trajectories within the subclass.

13. The moving object detection apparatus according to claim 11,
wherein said distance calculation unit is configured to calculate a linear distance between each pair of trajectories, the linear distance representing similarity between the trajectories, and
said weighted distance calculation unit is configured to assign, to a representative value of inter-subclass linear distances, a weight based on a representative value of stationary measures of the trajectories within the subclass, and calculate the weighted inter-subclass geodesic distance based on the weighted representative value of the inter-subclass linear distances.

14. The moving object detection apparatus according to claim 11,
wherein, if a subclass has a representative stationary measure indicating "moving" and another has that of "stationary", said weighted distance calculation unit is configured to set a value greater than 1 as the weight to be assigned to the inter-subclass geodesic distance between such pair of subclasses.

15. The moving object detection apparatus according to claim 11,
wherein, when the pair of the subclasses both have representative stationary measures indicating "stationary", said weighted distance calculation unit is configured to set a value smaller than 1 as the weight to be assigned to the inter-subclass geodesic distance.

16. The moving object detection apparatus according to claim 14,
wherein, when the pair of subclasses both have representative stationary measures indicating "moving", said weighted distance calculation unit is configured to set a value 1 as the weight to be assigned to the inter-subclass geodesic distance.

17. The moving object detection apparatus according to claim 10,
wherein said subclass classification unit is configured to classify trajectories into different subclasses, based on the similarity between the trajectories.

18. The moving object detection apparatus according to claim 10,
wherein said subclass classification unit is configured to classify trajectories into different subclasses, based on similarity in luminance between blocks respectively belonging to the trajectories.

19. The moving object detection apparatus according to claim 10,
wherein said subclass classification unit includes:
a second distance calculation unit configured to calculate a geodesic distance between each pair of trajectories; and
a clustering unit configured to perform a dimensionality reduction on the geodesic distance between the trajectories calculated by said second distance calculation unit, and classify the trajectories into the subclasses based on the lower-dimensional geodesic distance between the trajectories.

20. The moving object detection apparatus according to claim 10,
wherein said subclass classification unit is configured to classify trajectories into different subclasses by: obtaining the geodesic distance between a pair of trajectories by calculating a shortest path from one trajectory (A) to another (B) after (i) selecting a distance smaller than or equal to a predetermined distance threshold from the distances between pairs including former trajectory (A), and (ii) performing nonlinear processing to change an unselected distances between pairs including former trajectory (A) into an infinite distance; and classifying, into the same subclass, if a set of trajectories between each pair of which the geodesic distance is finite.

21. The moving object detection apparatus according to claim 1,
wherein said stationary measure calculation unit is configured to estimate a geometric constraint from a trajectory used for estimating the geometric constraint that holds when the trajectory belongs to the stationary object, and calculate, based on the estimated geodesic distance, the stationary measures of the trajectories to be used by said distance calculation unit to calculate the distance.

22. The moving object detection apparatus according to claim 5, further comprising
a camera motion obtaining unit configured to obtain motion information on a camera capturing the video,
wherein said weighted distance calculation unit is configured to adjust the weight which is to be assigned to the stationary measure, based on a magnitude indicated by the motion information of the camera.

23. The moving object detection apparatus according to claim 22,
wherein, when the magnitude indicated by the motion information on the camera is greater, said weighted distance calculation unit is configured to increase the weight that is to be assigned to the distance between the trajectory on stationary object and the trajectory on the moving object.

24. The moving object detection apparatus according to claim 11, further comprising
a camera motion obtaining unit configured to obtain motion information of a camera capturing the video,
wherein, if a subclass has a representative stationary measure indicating "moving" and another has that of "stationary", said weighted distance calculation unit is configured to perform a weight assignment on an inter-subclass geodesic distance between such pair of subclasses, and
a relationship expressed as WB>WS>1 is satisfied, where WB represents a weight of a case where a value of the motion information on the camera is greater than or equal to a predetermined threshold and WS represents a weight of a case where the value of the motion information on the camera is smaller than the predetermined threshold.

25. The moving object detection apparatus according to claim 11, further comprising
a camera motion obtaining unit configured to obtain motion information on a camera capturing the video, wherein, when the pair of subclasses both has representative stationary measures indicating "stationary", said weighted distance calculation unit is configured to perform a weight assignment on an inter-subclass geodesic distance between such pair of subclasses, and a relationship expressed as WB<WS<1 is satisfied, where WB represents a weight of a case where a value of the motion information on the camera is greater than or equal to a predetermined threshold and WS represents a weight of a case where the value of the motion information on the camera is smaller than the predetermined threshold.

26. The moving object detection apparatus according to claim 22, wherein said camera motion obtaining unit is configured to obtain the motion information on the camera from an operation control signal of the camera.

27. The moving object detection apparatus according to claim 22, wherein said camera motion obtaining unit is configured to obtain the motion information on the camera from an in-car sensor.

28. The moving object detection apparatus according to claim 5, wherein said weighted distance calculation unit is further configured to compare the stationary measure of the trajectory with a stationary measure threshold, and to determine that if the stationary measure is smaller than or equal to the stationary measure threshold, the trajectory is on the stationary object, and that if the stationary measure is greater than the stationary measure threshold, the trajectory is on the moving object.

29. The moving object detection apparatus according to claim 28, wherein said weighted distance calculation unit includes a threshold receiving unit configured to receive a stationary measure threshold, and is configured to compare the stationary measure of the trajectory with the stationary measure threshold received by said threshold receiving unit, and to determine that if the stationary measure is smaller than or equal to the stationary measure threshold, the trajectory belongs to the stationary object, and that if the stationary measure is greater than the stationary measure threshold, the trajectory belongs to the moving object, and said region detection unit is configured to cause a display unit to display the detected moving object region.

30. The moving object detection apparatus according to claim 1, wherein said stationary measure calculation unit is further configured to cause a display unit to display each of the blocks included in the picture as to reflect the calculated stationary measure.

31. A moving object detection method for detecting a moving object region using trajectories which correspond to a region included in a video, said moving object detection method comprising:

calculating, for each of the trajectories, a stationary measure representing likelihood that the trajectory belongs to a stationary object, the trajectory indicating a motion of blocks between two or more pictures included in the video, and each of the blocks being included in a picture and having one or more pixels;

calculating a distance between each pair of trajectories, the distance representing similarity between the trajectories; and (i) performing a transformation based on the stationary measures of the trajectories, and the distances between the trajectories, so that a ratio of a distance between a trajectory on stationary object and another on moving object, to a distance between trajectories both belonging to stationary object becomes greater than the ratio obtained before the transformation and (ii) detecting the trajectories on the moving object as the moving object region corresponding to the trajectory belonging to the moving object by separating the trajectory on the moving object from the trajectory on the stationary object, based on each of the transformed distances between pairs of trajectories.

32. A non-transitory computer-readable recording medium for use in a computer, said recording medium having a computer program recorded thereon for causing the computer to execute the moving object detection method according to claim 31 to detect a moving object region using trajectories which correspond to a region included in a video.

\* \* \* \* \*